United States Patent [19]

Saadeh

[11] Patent Number: 5,751,797
[45] Date of Patent: May 12, 1998

[54] AUTOMATIC METER READING SYSTEM WITH MULTITASKING CONTROL

[75] Inventor: Theresa Saadeh, West Allis, Wis.

[73] Assignee: Badger Meter, Inc., Milwaukee, Wis.

[21] Appl. No.: 509,504

[22] Filed: Apr. 13, 1990

[51] Int. Cl.$^6$ .................................................. H04M 11/00
[52] U.S. Cl. ............................................................ 379/106.03
[58] Field of Search ......................................... 379/107, 106, 379/102, 106.01, 106.03–106.11

[56] References Cited

U.S. PATENT DOCUMENTS

| | | | |
|---|---|---|---|
| 4,804,957 | 2/1989 | Selph et al. | 379/107 |
| 4,866,761 | 9/1989 | Thornborough | 379/107 |
| 5,031,209 | 7/1991 | Thornborough | 379/107 |

OTHER PUBLICATIONS

ACCESSplus Brochure, Badger Meter, Inc., 1986, 8 pages.

*Primary Examiner*—Wing F. Chan
*Attorney, Agent, or Firm*—Quarles & Brady

[57] ABSTRACT

A meter reading system is provided in which a plurality of modems are connected to telephone lines and to a single computer which is operated through a stored program to sequentially perform portions of communication activities and portions of servicing activities in time-interleaved relation and in rapid sequence. The communication activities include receiving meter data from and sending of control data to automatic meter readers. The servicing activities include maintenance of customer account records storage of received meter data and various other activities. The system further includes provisions for sending wake-up tone signals to automatic meter readers.

27 Claims, 12 Drawing Sheets

Fig. 3

Type Account Number [          ]Press ENTER    Call For a Demand Reading

```
┌─ Account ──────────┐
│ Name:     ──────── │
│ Address:  ──────── │
│ City, State: ──────,── │
│ Zip Code: ─────    │
└────────────────────┘
```

```
┌─ Information ──────┐
│                    │
│   ** Dialing **    │
│                    │
│    Please Wait     │
│                    │
│    Hangup=ESC      │
└────────────────────┘
```

Fig. 4

```
Type Account Number [        ]Press ENTER      Call For a Demand Reading

┌──Account ────────┐
        │                  │
        │ Name:    ──────── │
        │ Address: ──────── │
        │ City, State: ─────,── │
        │ Zip Code: ──── │
        └──────────────────┘

┌─── Information ───┐
                │ *Pick up your phone │
                │  receiver and wait for │
                │  someone to answer │
                │ *Tell the customer to stay │
                │  on the phone until the │
                │  wake-up tone is done. │
                │ *Press the ENTER key to │
                │  send wake-up tone. │
                │           Hangup=ESC │
                └────────────────────┘
```

Fig.5

Type Account Number [         ]Press ENTER     Call For a Demand Reading

```
 ┌─ Account ──────┐
 │ Name:          │
 │ Address:       │
 │ City, State:   │
 │ Zip Code:      │
 └────────────────┘

┌─ Information ──────────┐
 │ *Tell the customer to  │
 │  hang up the phone.    │
 │                        │
 │ *Press the ENTER key   │
 │  within [    ] seconds │
 │  to begin sending data.│
 │           Hangup=ESC   │
 └────────────────────────┘
```

Fig. 6

```
┌ACCESSplus-Automatic Meter Reading─┐  ┌─────────────Account Information─────────────┐
│ Add, Change, Delete or Install    │  │ Billing #: [            ]                    │
│                                   │  │ Name:      [                              ]  │
├──────Function Menu────────────────┤  │ Address:   [                              ]  │
│   Change/Install                  │  │ City, State:[                ] [  ]          │
│   Add/Install                     │  │ Zip Code:  [          ]                      │
│   Delete                          │  │ Phone:     [              ]                  │
│   Field Defaults                  │  │                         ────Meter────        │
│   Sort by Acct #                  │  │ Mfg & Model:[                  ]             │
│                                   │  │ Pulse/TC:  [    ]                            │
│ Scroll=   Select=ENTER,TAB        │  │ Serial #:  [              ]                  │
├───────Account Number──────────────┤  │              ─ACCESSplus Module─             │
│         [              ]          │  │ ACCESSplus Serial #:  [              ]       │
│                                   │  │ Battery Pack Code:    [    ]                 │
├──────────Messages─────────────────┤  │ Utility Phone #:      [              ]       │
│                                   │  │ Present Meter Reading:[              ]       │
│                                   │  │ Account Status:       [    ]                 │
│                                   │  │            ────Call Back────                 │
│                                   │  │ Frequency: [        ]                        │
│                                   │  │ Date:      [        ]                        │
│                                   │  │ Time:      [        ]                        │
└───────────────────────────────────┘  └──────────────────────────────────────────────┘
 03-16-1990  15:21:31                                              Main Menu=ESC
```

AUTOMATIC METER READING SYSTEM WITH MULTITASKING CONTROL

REFERENCE TO RELATED APPLICATION

The Thornborough et al. application Ser. No. 472,612, filed Jan. 29, 1990, discloses automatic meter reading units with which the system of this invention is usable, the disclosure of said application being incorporated by reference.

COPYRIGHT NOTICE

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to an automatic meter reading system and more particularly to an automatic meter reading system in which a computer controls telephone communications with automatic meter reader units in a highly efficient and reliable manner. The system is readily constructed using standard components and is otherwise relatively inexpensive.

2. Background of the Prior Art

Reviews of prior art disclosures are contained in introductory portions of the specifications of the Thornborough et al U.S. Pat. No. 4,817,131, issued Mar. 28, 1989, and the Thornborough U.S. Pat. No. 4,866,761, issued Jul. 12, 1989. The Thornborough et al. patents disclose improved systems which are particularly designed for use by public utilities and in which a large number of automatic meter readers (AMRs) are connected to customers' telephone lines. A utility control center (UCC) sends count data to each AMR, so computed by the UCC as to effect a call by the AMR to a utility telephone number at a certain time, e.g., at 1:12:20 AM on the 9th day of the following month. One or more call collection modules (CCMs) are associated with the UCC, each being connected to plurality of telephone lines to receive and respond to calls from AMRs. Each CCM has a memory for temporary storage of meter data and, in response to a call from a AMR, may immediately send control data back to the AMR including, for example, count data to control the next subsequent call-back time data and data which controls time-of-day (TOD) and peak rate (PR) metering.

In the system as disclosed in the Thornborough et al. patents, each CCM is arranged for bi-directional communication with a computer of the UCC, the computer having one or more disc drives and including a keyboard and being connected to a printer and other peripherals or a network. An operator of the UCC may enter control data of a "global" nature, appropriate for all AMRs and may also enter control data specifically applicable to an AMR as well as the customer's name and address and other identification or status data desired by a utility. Control data entered by the operator or generated by the UCC is sent to the CCM to be processed by the CCM and sent to an AMR for control thereof.

Each CCM of such a system acts as a buffer and as an intermediate processor with respect to transmission of control data between the control data entry point at the UCC and an AMR. It also acts as a buffer and as an intermediate processor with respect to transmission of meter data between the AMR and the data storage, display and printing equipment of the UCC.

As disclosed in the Thornborough et al. patents, the provision of CCMs with buffering and processing capabilities makes it possible to reduce the processing to be performed at the AMR and to use simpler reporting and processing components in the AMR. It thereby reduces the unit cost of manufacture of the AMR which is very important in a system which has a very large number of AMRs. In addition, it permits a great deal of flexibility and versatility with respect to the meter data which is reported and with respect to the mode of reporting thereof.

Another important feature of the system as disclosed in the Thornborough et al. patents is that each CCM may be equipped to simultaneously receive and handle calls on a plurality of telephone lines and to take advantage of a roll-over feature in which only one number is assigned to all lines and in which, if one or more lines are "busy", the call is directed by the exchange to the first non-busy line of the group. This feature increases the reliability of the system, minimizing the possible blocking of a call from one AMR when a call from another is being processed. It is particularly advantageous when using WATS type lines which are economical to use when a large number of calls are received over one line and which have the advantage of avoiding any toll charges on the customer's line.

Additional features of the systems as disclosed in the Thornborough et al. patents relate to the operation of the UCC. It is programmed in a manner such that control data are readily entered with a number of operations being automated to permit a very large number of AMRs to be operated from one station. For example, in developing control data for the AMR of a new customer, the program will, if desired, automatically set a date and time for call-in by the unit, a number of options being available. The UCC is also programmed to facilitate control of the days and daily time periods or "windows" in which time-of-day and peak rate accumulations are performed and it has many features relating to displaying and printing data which relate to various aspects of reported data and various aspects of the control data used in operation of the system. The UCC is also designed to facilitate an installation transaction in which a telephone call may be made to a customer to send control data for initialization of the customer's AMR.

In an AMR embodiment as disclosed in the aforesaid Thornborough et al. U.S. Pat. No. 4,866,761, a demand signal detector circuit is provided which is operative to detect a demand signal of a certain form on the telephone line, such as a tone burst having a certain frequency and duration. In that embodiment, a modem need not be energized in response to each call on the line, but only in response to an actual demand call from the utility or when making scheduled reports at monthly or other intervals. As a result, the modem may be battery operated and it is not necessary to draw power from the line to obtain a long battery life. The use of a demand signal detector is also advantageous especially in combination with an isolation transformer and protection circuitry and special features for transmission of signals from the line to the detector.

Various other features of the UCC, CCM and AMR portions of the systems of the Thornborough et al. patents are disclosed in detail therein. The aforementioned related application of Thornborough et al. Ser. No. 472,612, filed Jan. 29, 1990, discloses an improved AMR in which a conventional type of modem is not used. Instead, a microcomputer of the reader is used in conjunction with inexpensive components to perform the functions performed by the conventional modem circuit of the prior meter readers. This arrangement has substantial cost-savings and operational advantages, including lower energy consumption and improved reliability.

SUMMARY OF THE INVENTION

This invention was evolved with the general object of providing a system which retains advantageous features of the aforementioned Thornborough patents and which provides further improvements particularly with regard to control of communications between a utility control center (UCC) and automatic meter readers (AMRs) which are to be monitored and controlled.

Important aspects of the invention relate to the recognition and discovery of problems with prior arrangements and their causes and to an analysis of what is necessary to overcome such problems and otherwise provide an improved system. One problem area relates to the cost of the CCM in systems as disclosed in the Thornborough et al. patent. Each CCM includes a plurality of modems, a separate microprocessor and associated memory and other circuitry and must be specially constructed and carefully installed and periodically serviced by trained persons in order to insure reliable operation, so as to be quite expensive. As a result, the CCMs represent a substantial portion of the cost of a complete system. In the case of systems such as designed for use by smaller utilities in which there are a relatively smaller number of AMRs to be monitored, the cost share per customer of equipment at the UCC may be substantial. At the same time, the functions performed by the CCMs, as described hereinbefore, are very important to the successful operation of systems such as disclosed in the Thornborough et al. patents.

In accordance with this invention, call collection modules are implemented without requiring a separate microprocessor and associated memory and other circuitry. With the system of this invention, the computer of the utility control center is used for performing the various control functions as disclosed in the Thornborough et al. patents and is also used as a call collection module to act as a buffer and as an intermediate processor with respect to transmission of control data for processing by the computer in the manner as disclosed in the Thornborough et al. patents. It also acts as a buffer and as an intermediate processor with respect to transmission of meter data between the AMR and the data storage, display and printing equipment coupled to the UCC computer.

For communication with the AMRs, the computer is connectable to at least one and preferably to a plurality of modems are which are preferably of standard inexpensive types. For example, the computer may be a standard type of computer such as an IBM computer or an IBM compatible computer, and the modems may be internal types of modems which are simply installed in slots of such a computer in conventional fashion.

Specific features of the invention relate to the programming of the computer for performance of all of the required functions in a highly efficient and reliable manner. The computer is so operated as to insure against loss of data transmitted from the AMRs while also being operative to reliably perform the monitoring, control and other functions performed by the UCC in the prior Thornborough et al. systems. The CCM functions are so performed as to be invisible to an operator and, for example, they have minimal effect on the speed of response to keyboard, display, printing and data storage operations.

In accordance with specific features of the invention, a program is provided for operation of the processor of the computer to effect processing operations including communication operations to store data received through one or more modems from AMRs and servicing operations which involve processing of data stored through the communication operations. The operating program is such that portions of the communication and service operations are performed by the processor of the computer in a time-interleaved relation such as to insure against loss of data during the communication operations while performing the servicing operations rapidly and without substantial interruptions.

The communication and service operations, in accordance with the invention, may be performed by a multi-tasking computer with a certain fraction of a multi-tasking cycle being assigned to a program for performing service operations and the remaining fraction of the cycle being assigned to a program for performing communication operations, for example. However, in accordance with important features of the invention, communication and servicing tasks are performed through sequential execution of instructions of a single program. This feature provides a number of important advantages, including use of the capabilities of a computer to obtain higher efficiency and higher speeds of operation, and less dependency on particular hardware for operation of the program.

In accordance with further specific features, communication activities are broken down into portions defined by communication blocks of instructions of the program, service activities are similarly broken down into portions defined by service blocks of instructions of the program, and portions defined by the service blocks of instructions are executed in serial relation to execution of the portions defined by the communication blocks of instructions. In an illustrative system of the invention, the instructions include a wait-for-key repeat loop of instructions which includes an instruction operative to effect repeated execution of a communication block of instructions and an instruction operative to exit said loop for execution of a service block of instructions in response to entry of control data through a keyboard connected to the computer.

In a system wherein communication operations are required periodically with a certain minimum time between initiations thereof, each service block of instructions is such as to require less than said certain minimum time for execution. For this purpose, each service operation which might require an excessive amount of time includes a number of communication checks to intimate a communication operation if required and a timer setting operation.

A further important feature is that the execution time required for each action taken is short enough to avoid undue delay in responding to requests for other actions. As a result, the system is highly reliable. Each execution time is also short enough to give the outward impression that the actions are being performed simultaneously even though performed serially. The handling of communications with the modems is essentially invisible to the operator of the system.

Additional features of the invention relate to provisions for using a modem in control of the sending wake-up signals to AMRs to facilitate installation and reprogramming of AMRS.

This invention contemplates other objects, features and advantages which will become more fully apparent from the following detailed description taken in conjunction with the accompanying drawings.

BRIEF DESCRIPTION OF THE DRAWINGS

FIG. 3 illustrates a first demand reading display which is initially produced on the monitor screen when a demand reading program is selected;

FIG. 4 illustrates a second demand reading display which may be produced on the monitor screen in response to a selection from the initial demand reading display of FIG. 3;

FIG. 5 illustrates a third demand reading display which may be produced on the monitor screen following the screen of FIG. 4;

FIG. 6 illustrates a display produced on the monitor screen when a program is selected from the main menu to add, change, delete or install an AMR;

DESCRIPTION OF PREFERRED EMBODIMENTS

Figure 1:
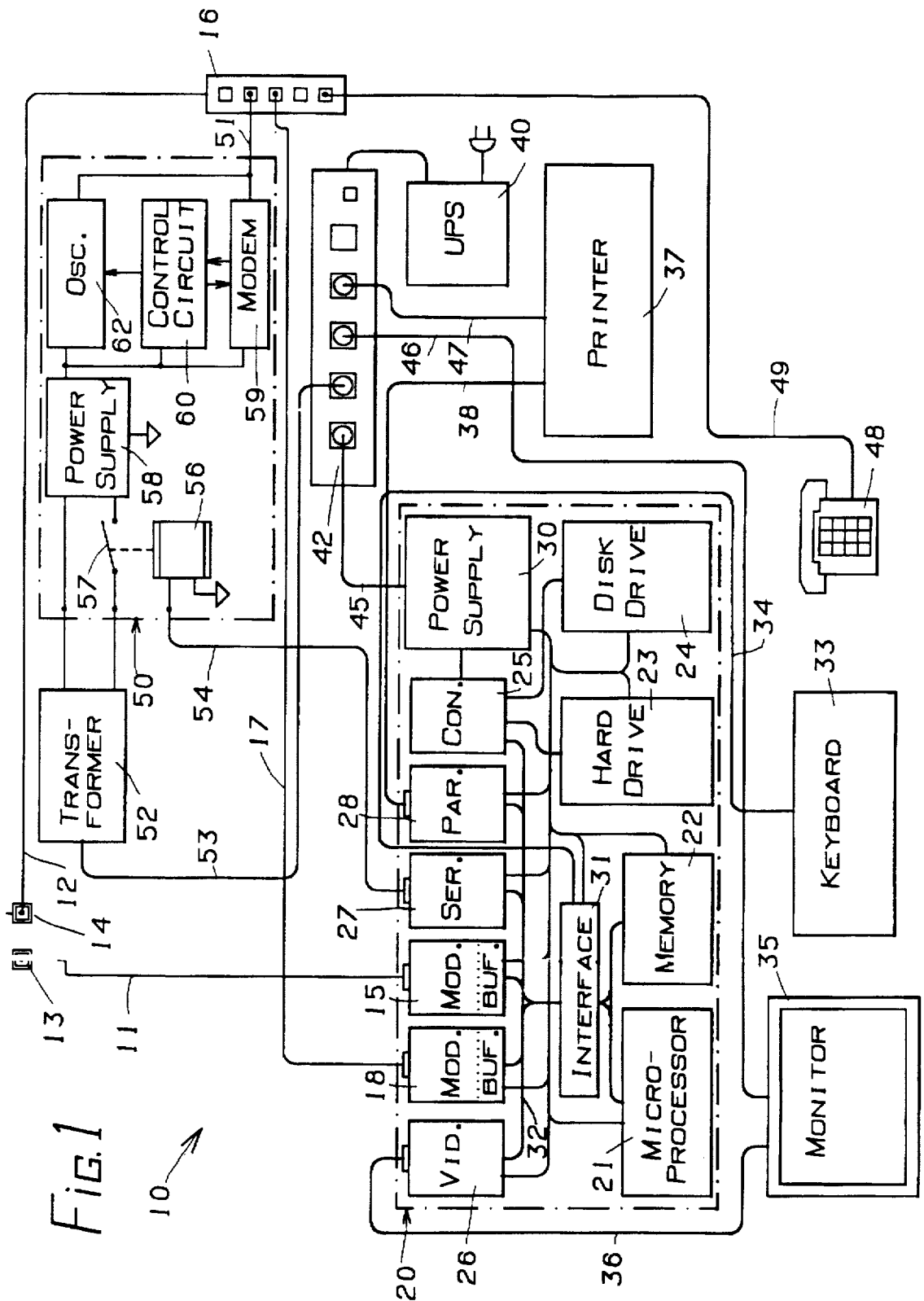
FIG. 1 is a schematic block diagram of equipment at a utility control center of a meter reading system of the invention.

Reference numeral 10 generally designates equipment at a utility control center or "UCC" of a meter reading system which is constructed in accordance with the principles of this invention. The UCC equipment of the invention is designed for receiving calls from automatic meter readers or "AMRs", each of which is connected to a non-dedicated telephone line of a customer and each of which is connected to meter such as a water or gas meter. The illustrated equipment is connectable through conventional telephone lines 11 and 12 to modular wall jacks 13 and 14 for connection through two external telephone lines to a central telephone exchange, to receive calls from the AMRs and to send control data to the AMRs. The equipment is usable with only one external telephone line and may be readily modified for use with more than two lines, if desired.

Important features of the invention relate to the performance of communication operations by a single computer of the equipment 10 for transfer of meter reading and control data between AMRs and the equipment 10 while also allowing the same computer to perform any of a number of servicing operations on a time sharing or time interleaved basis, such servicing operations including a main menu operation or any of a plurality of servicing operations which are selectable from the main menu. Additional features relate to the servicing operations which are available, particularly including the control of AMR wake-up operations. These features will be clarified by first considering features of the equipment 10 and the overall operation of the system from an operator's standpoint.

As shown, line 11 is connected directly to a modem 15 while line 12 is connected to a multi-line phone jack unit 16, one jack being connected through a line 17 to a second modem 18. Modems 15 and 18 may be standard modems, each having a buffer as is standard and as is diagrammatically indicated in the drawing. As shown, also indicated, the modems 15 and 18 are internal modems which may be installed in slots of a computer 20, each being assigned to an input/output port. Alternatively, external modems may be used connected to serial ports.

The computer 20 is preferably a standard type of computer such as an IBM PC or an IBM PC compatible computer. As shown diagrammatically, computer 20 may include a microprocessor 21, a memory 22, a hard drive 23, a disk drive 24 for a 5.25 or 3.5 inch disk, drive and video controllers 25 and 26 and parallel and serial output ports 27 and 28, all connected to a power supply 30.

The microprocessor 21 and memory 22 are connected through interface circuitry 31 to a bus 32 which may be implemented by a motherboard having slots into which cards are installed having circuitry to form the modems 15 and 18, the controllers 27 and 28 and the ports 27 and 28. A keyboard 33 is connected to the computer 20 through a cable 34, a monitor 35 is connected to the video controller 26 through a cable 36 and a printer 37 is connected to the parallel port 28 through a cable 38. As also shown, an uninterruptible power supply 40 is connected to an outlet strip 42 which is connected to through power cords 45, 46 and 47 to the computer power supply 30, the monitor 35 and the printer 37.

A telephone 48 is connected through a line 49 to the multi-line phone jack 16 and is usable to for voice communications with customers, or others, as desired. It might also be used to effect installation or demand calls to a customer to establish a connection to permit sending of control data during installation of an AMR or obtaining data as to current meter usage and status. However, the illustrated system is designed for automatic tone or pulse dialing which may use circuitry of the modem 18 to dial a customer's telephone number stored in memory after entry through the keyboard 33.

One type of AMR with which the system might be used includes circuitry to go off-hook in response each call on a customer's line and to energize a modem to effect a checking operation to determine whether a "demand" call is being made from the utility, which may be made for the purpose of effecting an installation transaction or to obtain data from the AMR. In each such checking operation, the modem and other circuits are energized and over a period of time considerable energy is expended. However, the system as disclosed is designed for operation with another type of AMR in which a detector circuit is provided which is operative to detect a demand signal or wake-up tone of a certain form on the telephone line, such as a tone burst having a certain frequency and duration. In this embodiment, circuits need not be energized in response to every off-hook condition the line, but only in response to an actual demand call from the utility or when making scheduled reports at monthly or other intervals.

As shown in FIG. 1, a wakeup signal module 50 is provided which is coupled through a line 51 to the multi-line phone jack unit 16, through a transformer 52 and a power cord 53 to the power strip 42 and through a cable 54 to the serial port 27. To use the wakeup module, a signal is applied from serial port 28 and through line 54 to a relay 56 within the module, operative to close a contact 57 and apply AC power to a power supply 58 which applies a DC operating voltage to a modem 59, a control circuit 60 and an oscillator 62. The computer 20 then communicates with the control circuit 60 through the modem 18, lines 17 and 48 and modem 59 to cause the oscillator 62 to send a wakeup tone to an AMR, after which the AMR communicates with the modem 18 of the computer through lines 12 and 17.

Overall System Operation (FIGS. 2–6)

The overall operation of the system from an operator's standpoint is illustrated by displays produced on the screen of the monitor 35, certain of which are illustrated in FIGS. 2 through 6. After operation of the system is started, in a manner as described hereinafter in connection with a main flow diagram of FIG. 7, a main menu is produced on the screen of the monitor 35 to present eighteen servicing programs or operations for selection by the operator. If no selection is made by the operator within a certain length of time, e.g. 20 minutes, the system automatically chains to one of the selectable programs which is a meter read program by which incoming meter readings are displayed on the screen of monitor 35 as they occur. Any one of the eighteen selectable programs may be exited to return to the main menu program, as by pressing an "ESC" key of the keyboard 33.

Figure 2:
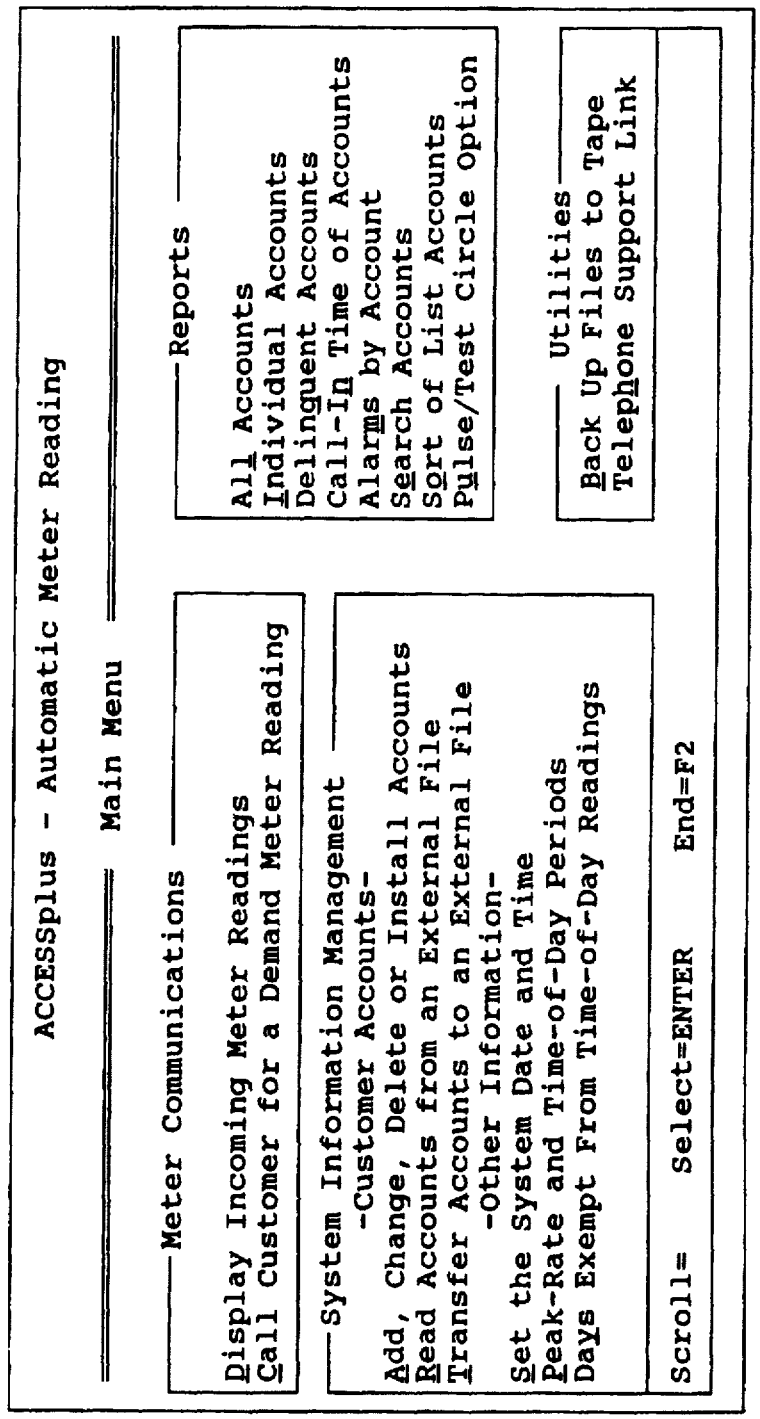
FIG. 2 illustrates a main menu display produced on the screen of a monitor of the system.

The servicing operations or programs are indicated in the main menu shown in FIG. 2, in which underlined letters are those highlighted on the screen of the monitor 35. The programs are selectable by using up and down arrow keys or highlighted letter keys to move a light bar to the desired program and then pressing the ENTER key. Then a display is produced on the screen of the monitor 35 for operation of the selected program. The programs are as follows:

1) Meter read program. This program operates to display incoming meter readings on the screen of monitor 35. In addition, it operates to store each reading in a customer account record, identified by a customer account number which is selected at the time of installation of an AMR for each customer. If another program is being run, incoming meter usage data is temporarily stored until this program is run to store the data in customer account records.

2) Call customer for a demand reading. This program permits a "final read" when a customer moves from one location to another and is usable to answer or verify customer usage questions, investigate alarm and leak conditions and change program parameters of a customer's AMR. When used, a display is produced on the screen of the monitor 35 which is blank except for a top line which requests that the operator enter an account number and then press ENTER. Then a screen is produced as shown in FIG. 3. As shown, an abbreviated customer account record is displayed including the name, address and telephone number of the customer and an information message is displayed indicating that the customer is being dialed.

When the customer answers, a screen is produced as shown in FIG. 4, including an information message which instructs the operator to press the ENTER key to send a wake-up tone. Then a screen is produced as shown in FIG. 5 including an information message to tell the customer to hang up, and to press ENTER within a certain number of seconds. Hanging up the phone by the customer facilitates noise-free communications with the AMR.

Next, the information message of FIG. 5 is replaced by a "Sending Data" message, not shown, followed by a "Resetting Modem" message, also not shown. Finally, the initial screen of the series is produced, permitting entry of the account number of another customer, if desired. The system is returned to the main menu after the elapse of a certain time or in response to pressing the ESC key of the keyboard 33.

3) Add, Change, Delete or Install Accounts. This program provides a means for maintaining all customer account records in the system. When the program is selected, a display is produced on the screen of the monitor 35 which as shown in FIG. 6 includes a function section or box and also section or boxes for entry of a customer account number, messages and account information. Initially, the function box is active and one of the indicated functions is selectable. If, for example, the Change/Install function is selected, the Account Number box will become active. After entering a number with the correct number of digits and pressing the ENTER key, the Account Information box will become active, and information may be entered as indicated. At this time, instructions appear below the Account Information box to indicate that up and down arrows may be used to change the line, that "Next Account-TAB", that "Install Meter=F2" and that "Main Menu=ESC". By pressing F2 the installation is completed and another installation procedure may be invoked, or the operator may return to the main menu by pressing the ESC key, or by waiting until a certain preset time has elapsed since the program was started.

4) Read Accounts From an External File. This program is optional and, for example, allows input of files from an external file on a diskette inserted in the disk drive 24.

5) Transfer Accounts to an External File. This program provides a means for transferring account information to a diskette. The information may, for example, be transferred to another computer for billing, data analysis, archival or other purposes. A display is produced with a format somewhat similar to that of FIG. 6, with "Instruction", "File Information" and "Transfer Items" boxes, for entry of a file name, drive letter, account numbers and items to be transferred.

6) Set System Date and Time. This program presents a display showing and permitting change of the current date and time registered by the system, to allow periodic checking and correction as necessary to maintain high accuracy.

7) Peak-Rate and Time-of-Day Periods. AMRs may be used with the system which have the capability of dividing daily meter readings into three separate time periods and storing such readings in separate registers. They may also have the capability of storing peak-rate usage for each time periods, peak-rate usage being the measurement of the highest average flow in a 5-minute segment within each time period. This program provides a display, not shown, which includes a "Instructions" box and a "Meter Reading Time Periods" box for entry of start and stop times for each of the three periods.

8) Days Exempt from Time-of-Day Readings. This program provides a display providing for entry of all days of a year in which it may be desired to provide for an exemption from time-of-day readings, such as weekend days and holidays, for example.

9) All Accounts. This program is one of eight report generating programs. A display is produced initially which provides for selection of a display mode in which reports are to be only displayed on the monitor screen, or a print mode in which the reports are to be both printed and displayed. If the display mode is selected, a display is produced showing the first account record and, upon pressing a key, the next account is shown, allowing the operator to scroll through the accounts. In the print mode the accounts are display sequentially as they are printed.

10) Individual Accounts. This program permits an individual account, identified by account number, to be either displayed or both displayed and printed.

11) Delinquent Accounts. This program provides a means for listing of all accounts in the system that are delinquent or have not called in at the time they were scheduled.

12) Call-In Time of Accounts. This program provides a list of accounts sorted by Call-Back Date and Call-Back time, starting with the oldest, with scrolling by screens. It also identifies delinquent AMRs and provides for selection of either a display mode or a print mode.

13) Alarms by Account. This program provides a list of all accounts in the system with AMRs which have called in with an alarm condition.

14) Search Accounts. This program provides for searching through all customer account records to find specific information such as all with zero consumption, all with a specific billing number or name or all having the same city, zip code, telephone exchange, street, call-in frequency or alarm condition. A report may the displayed or both displayed and printed.

15) Sort or List Accounts. This program provides a list of all accounts in the system and allows an operator to specify what account information is to be included in a report which can be displayed on the monitor screen or printed.

16) Pulse/Test Circle Options. This program displays Test Circle or Pulse Resolution Options which are available on the system.

17) Back-Up Files to Tape. This program provides means for activating a tape back-up system which copies information stored by the hard drive 23 onto a tape in an external back-up drive which is not shown in FIG. 1 but which may be provided.

18) Telephone Support Link. This program is provided for activation of communications software which may be stored by the hard drive 23 and which allows technical support personnel to link to the computer 20 for remote monitoring, diagnosis and correction of problems.

Figure 7:
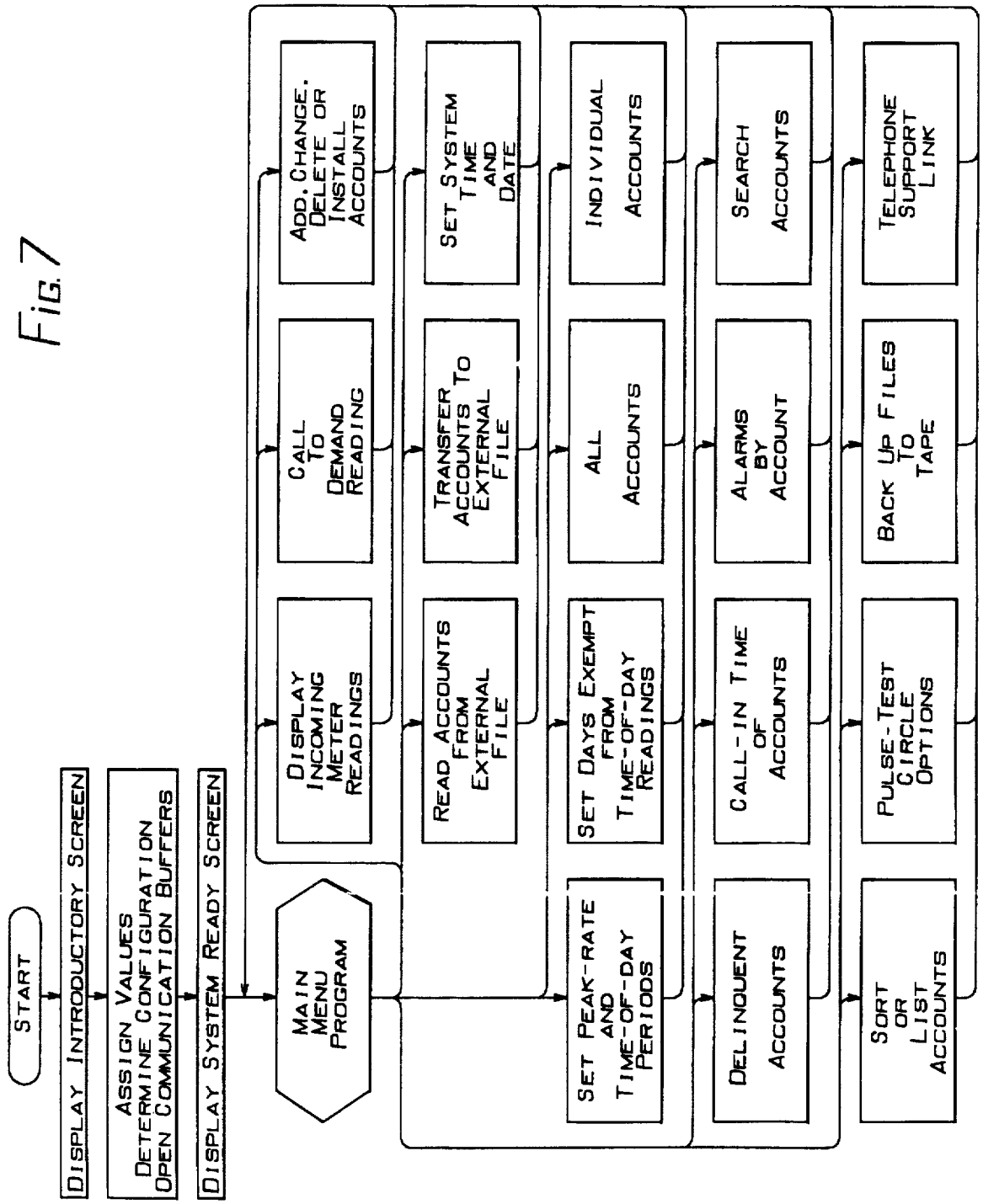
FIG. 7 is a flow diagram showing the general operation of the system of the invention.

Operating Program (FIG. 7)

FIG. 7 is a flow diagram for the operating program of the system of the invention. The operating program may be stored on transportable 5.25 or 3.5 inch discs for transfer to the hard drive 23, using the disk drive 24. The program of the illustrated system is obtained through compilation of a source code which is written in the BASIC language, to obtain a number of files which may be executed through the PCDOS or MSDOS operating systems and which may be chained during operation, each executable file corresponding to a separate program of the source code. It will be understood, of course, that the invention is not limited to the use of BASIC or any particular source language for generating an operating program and that operating systems and/or computers may be used other than PCDOS or MSDOS operating systems or types of computers associated therewith.

Listings of certain programs and files of the source code are contained in an attached Appendix A, to which explanatory references are made herein. The listings include communications processing subroutines in a "READCOMA.BAS" file (Appendix A, pages 1–11) and a 2 line system and common definitions file "AP.BI" together with an interrupt function file "QB.BI", both included in an "ARMCOMA.BAS" file (Appendix A, pages 11 and 12).

The initial executable file corresponds to an initialization program AMR1.BAS of the source code (Appendix A, starting at page 12, line 14). After installation of the system in the hard drive 23, operation is started as by using the keyboard 33 to enter a start command (AMR1.EXE). Alternatively, operation may be initiated automatically after a reset or reenergization of the computer 20, to invoke operation of an "AUTOEXEC.BAT" file which contains the start command. As indicated in FIG. 7, an introductory screen is initially displayed after which certain values are assigned, the configuration is determined and communication buffers are opened.

The configuration is determined from a "config.dat" file which may be set up for operation of either or both of the modems 15 and 18 for direct communication with AMRs and which may alternatively be set up for communication with a separate call collection module or CCM such as disclosed in the aforementioned Thornborough et al. patents. In the discussion of the illustrated system which follows, it is assumed that a separate CCM is not used that the two illustrated modems 15 and 18 are operative. Although the illustrated system has only two modems, it will be understood that the system can be designed for use with more than two modems if desired.

After the initialization program AMR1.BAS, the next program is a AMR2.BAS program (Appendix A, pages 16–17) by which a system ready screen is displayed until a key is pressed or until elapse of a certain delay time such as 10 seconds. This program is followed by a main menu program named "AMR00.BAS" (Appendix A, starting near end of page 17). As indicated in the foregoing general description of the operation, the operator may use the keyboard 33 to select any one of eighteen items from a menu displayed on the screen of the monitor 35 to obtain the operations as discussed above and as indicated by labelled blocks in FIG. 7. Selection of any one of sixteen of such items effects chaining to a corresponding one of sixteen separate programs named "AMR01.BAS" through "AMR0G.BAS". The remaining two items correspond to programs defined within the AMR00.BAS program, one being the "Back Up Files To Tape" program and the other being the "Telephone Support Link" program.

As has previously been indicated, if the operator makes no selection within a certain length of time, e.g. 20 minutes, the system automatically chains to one of the selectable programs which is the meter read program by which incoming meter readings are displayed on the screen of monitor 35 as they occur. As has also been indicated, any one of the eighteen selectable programs may be exited to return to the main menu program, as by pressing an "ESC" key of the keyboard 33.

As has also been indicated, important features of the invention relate to the performance of communication operations by the single computer 20 of the equipment 10 for transfer of meter reading and control data between AMRs and the equipment 10 while also allowing the same computer to perform any of a number of servicing operations on a time sharing or time interleaved basis, such servicing operations including the main menu program or operation and any of the eighteen servicing programs or operations which are selectable from the main menu. In accordance with the invention, these features are implemented in the disclosed system through the inclusion blocks of code within the AMR00.BAS program and each of the eighteen other programs AMR01.BAS through AMR0G.BAS for performance of communications operations during the servicing operations performed through such programs.

Figure 8:
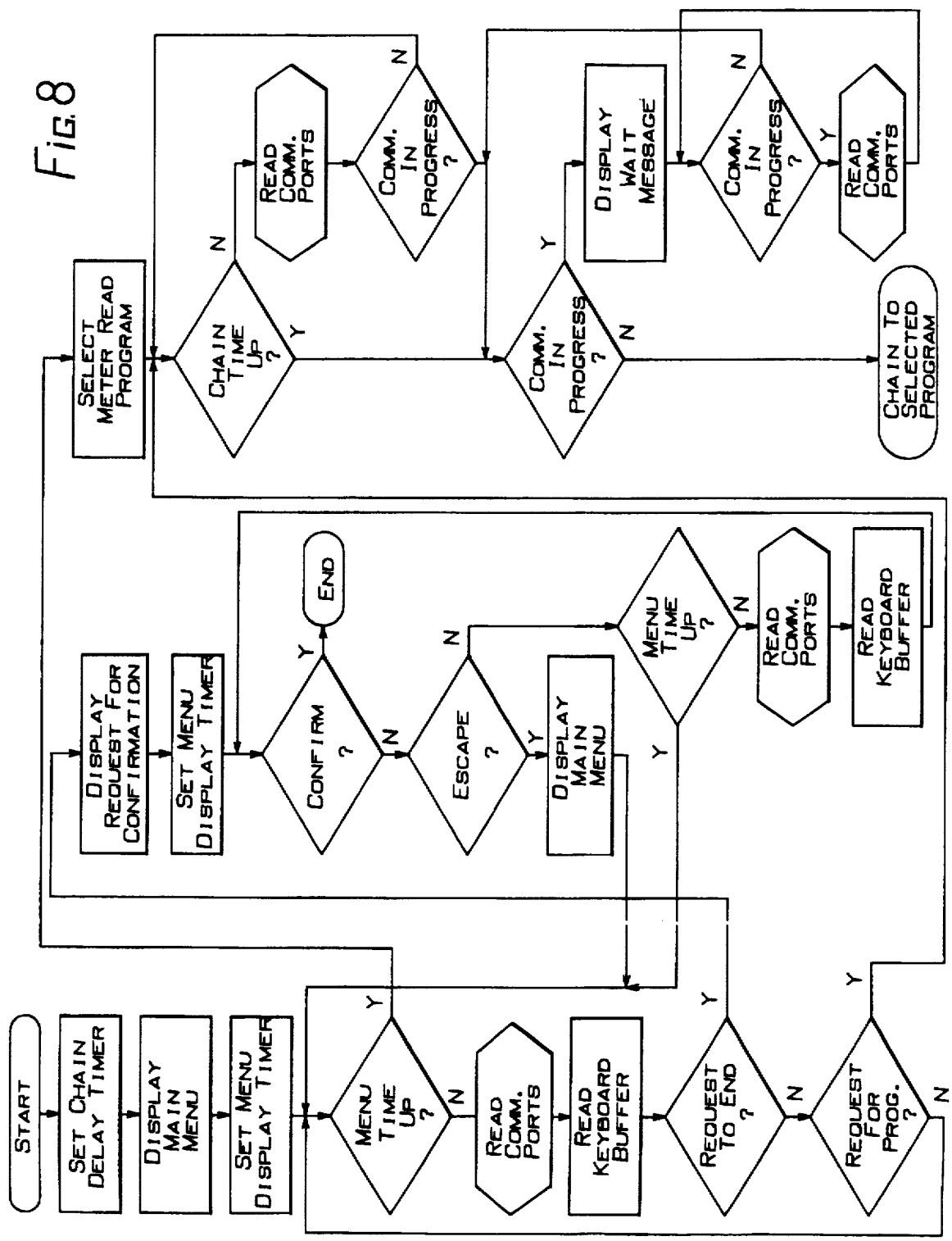
FIG. 8 is a flow diagram showing a the operation of a main menu program of the system.

Main Menu Program (FIG. 8)

FIG. 8 is a flow diagram of the main menu program which is compiled from the AMR00.BAS program (Appendix A, end of page 17). After setting a value "TimeUpChain" to insure a delay before starting a chaining operation, the main menu is displayed after which the aforementioned 20 minute time is set, indicated as a "MENU TIME" in FIG. 8, by setting "TimeUpReading" equal to 1200 seconds (Appendix A, page 18, line 50). Then a repeat loop is entered, which starts with a test to determine whether the delay time is up (Appendix A, page 18, line 53). If not a "ReadCom" communication subroutine of the loop is performed to effect a read of communication ports to which the modems 15 and 18 are connected.

Figure 9:
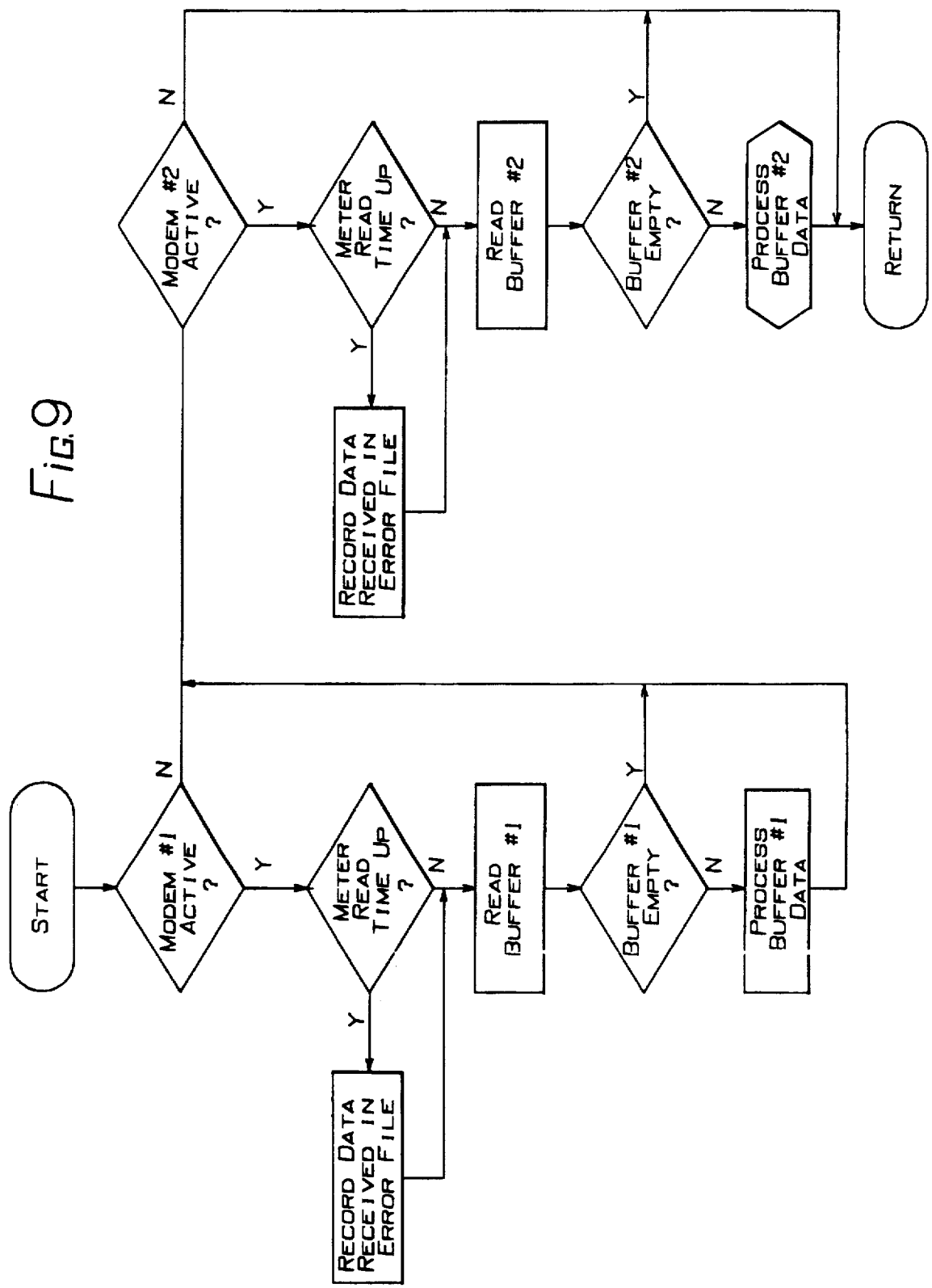
FIG. 9 is a flow diagram showing an operation for reading of communication ports in accordance with the invention.

Important features relate to the read of communication ports effected by the ReadCom subroutine is illustrated by a flow diagram of FIG. 9 with associated subroutines being illustrated by flow diagrams of FIGS. 10, 11, 12 and 13 are flow diagrams of subroutines associated with the "ReadCom" subroutine. These subroutines are discussed in detail hereinafter. In brief, a polling operation is performed as to communication ports #1 and #2 to which the modems are connected, each modem being serviced if active. In each servicing operation, any data is stored which has been received by the modem and stored in its buffer since the last servicing operation and, if any action is indicated, such as transmission of data to the modem, it is taken.

In the initial repeat loop shown in FIG. 8, the operation continues after reading the communication ports with a read of the key board buffer (Appendix A, page 18, line 57) and determinations as to whether there is a request to end the program, as by pressing the F2 key (Appendix A, page 19, line 10), or whether there has a request for a particular program, as by pressing the ENTER key when a selection has been highlighted on the monitor screen (Appendix A, page 19, line 32). If either request has been made, appropriate processing action is taken. If not, the loop is repeated. Thus the repeat loop provides a polling routine in which the two communication ports and the keyboard are checked sequentially to determine whether there has been in effect a request for action from any of the three sources and to take appropriate action in each case. As will be clarified, an important feature is the execution time required for each action taken is short enough to avoid undue delay in responding to requests for other actions. As a result, the system is highly reliable. Each execution time is also short enough to give the outward impression that the actions are being performed simultaneously even though performed serially. The handling of communications with the modems is essentially invisible to the operator of the system.

If there is a request to end in the initial repeat loop shown in FIG. 8, a request for confirmation is displayed on the monitor screen, the menu display timer is set and a second repeat loop is entered. The request for confirmation may be confirmed, as by pressing the ENTER key, to end the program. If the ESC key is pressed to exit the second repeat loop, the main menu is displayed and operation goes to the initial repeat loop. If neither the ENTER nor the ESC key is pressed and if the menu time is not up, the communication ports are read, followed by a read of the keyboard buffer, as in the intimal loop. Thus so long as operation is in the second repeat loop, a polling action is performed which is similar to that of the initial repeat loop of the main menu program depicted in FIG. 8. Here again, the two communication ports and the keyboard are checked sequentially to determine whether there has been in effect a request for action from any of the three sources and to take appropriate action in each case.

If the menu time expires while in the initial loop, the meter read program is selected and a "ChainTo" routine is called (Appendix A, page 18, line 53) to chain to a selected program, in this case the meter read program. The same operation occurs if the menu time expires while in the second repeat loop, since the operation then goes to start of the initial repeat loop. The "ChainTo" routine is also entered if while in the initial loop, a request for any program is made, as by pressing the ENTER key with a program name highlighted on the monitor screen (Appendix A, page 19, line 32).

A listing of the "ChainTo" subroutine appears in Appendix A, page 19, line 50 to page 22, line 7 and a simplified flow diagram is shown in the right hand portion of FIG. 8. This subroutine provides for repeated polling or reading of the communication ports when a time allowed for chaining is not up and, after the chain time is up, for display of a wait message so long a communication is in progress, again with repeated pollings or readings of the communication ports. It operates to insure proper handling of any AMRs which may call in during the process of chaining from the main menu program to a program which has been selected by the operator or to the meter read program which is automatically selected at the end of the menu time, when no selection is made by the operator.

Read of Communication Ports (FIG. 9)

FIG. 9 is a flow diagram of the aforementioned subroutine "ReadCom" which is included in the main menu program (Appendix A, page 23, lines 12–40) and in other programs such as the sort or list accounts program as hereinafter discussed. As aforementioned, a polling operation is performed as to communication ports #1 and #2 to which the modems are connected, each modem being serviced if active. Included in each servicing operation, is a communication port processing operation, indicated by the "PROCESS BUFFER #1 DATA" and "PROCESS BUFFER #2 DATA" blocks in FIG. 9. Each such communication port processing operation effects storage of any data which has been received by the modem and stored in its buffer since the last servicing operation and also effects such appropriate action as may be indicated, such as transmission of data to the modem, for example.

As aforementioned, subroutines similar to the "ReadCom" subroutine of FIG. 9 are incorporated in other servicing programs to which the operation may chain. An example is the "Sort or List Accounts" program, the source listing of which is included in Appendix A, page 31, line 11 to page 52, line 16. This program includes a "ReadCom" subroutine (Appendix A, page 51, lines 19 to 46) which is called in a "WaitForKey" subroutine (Appendix A, page 43, line 15) of that program. It is also called in a "ReadMeter" subroutine (Appendix A, page 42, line 57 to page 43, line 9), many calls being made to the "ReadMeter" subroutine The sort or list accounts program illustrates important features of the invention. A complete and time-consuming sorting activity is broken down into a series of small portions to be performed serially, each portion requiring no more than a short time to performed. A 3 second timer is set (Appendix A, page 39, line 41) and after performing each small portion, a check is made to determine whether the 3 second time is up. If not, the operation is continued to perform the next portion of the activity. If the time is up, a call is made to the "ReadMeter" subroutine (Appendix A, page 39, lines 46 and 51, page 40, lines 7 and 20 and page 41, line 57). The timer is again set in the "ReadMeter" subroutine (Appendix A, page 43, line 8), and upon return from the subroutine the operation is continued to perform the next portion of the sorting activity. This insures frequent performance of the communication activities to service incoming calls, and avoid overflows of the buffers of the modems.

Figure 10:
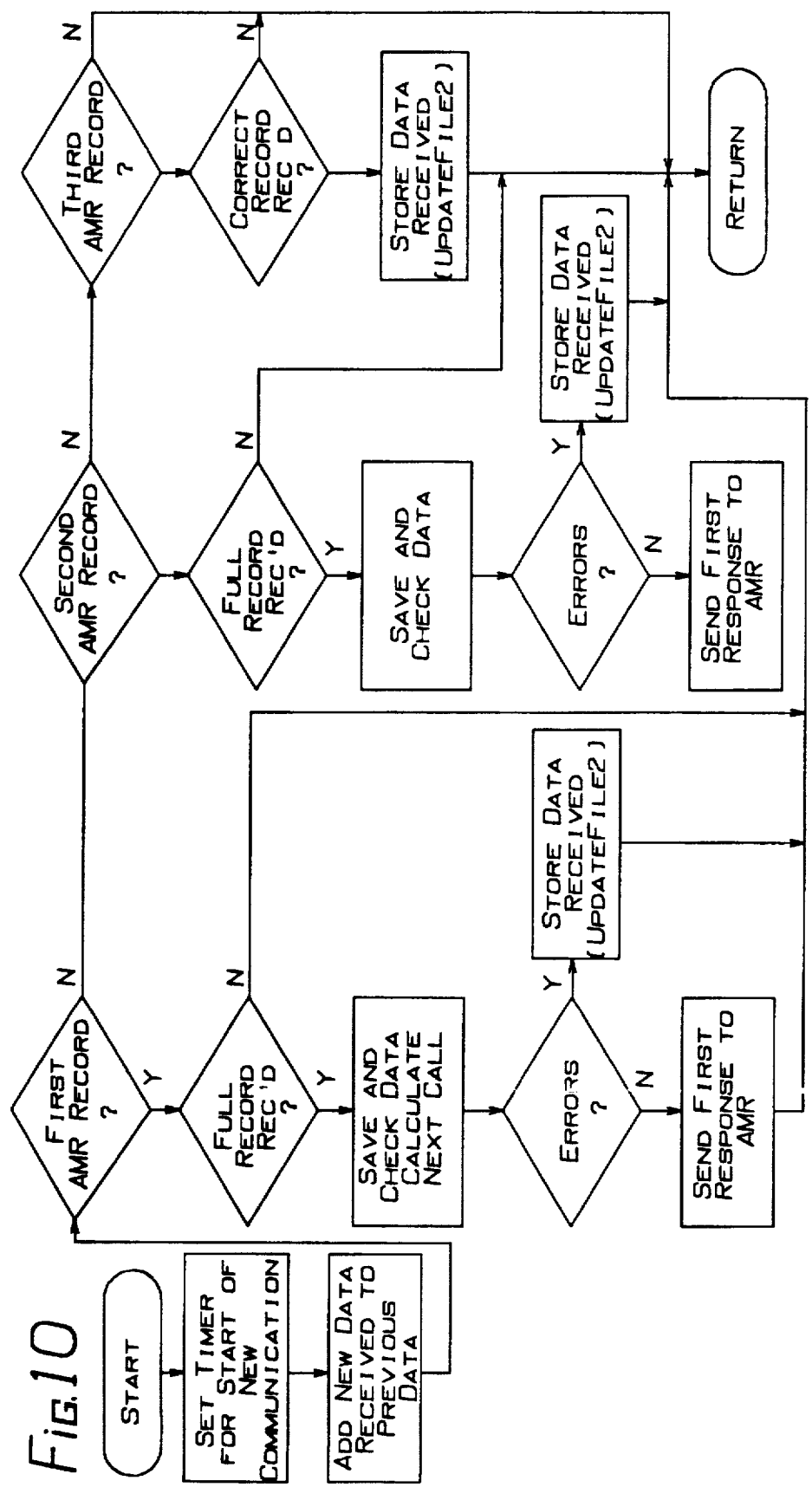
FIG. 10 is a flow diagram for a communication port processing operation for one port of the system.

Communication Port Processing (FIG. 10)

FIG. 10 is a flow diagram for the communication port processing operation for the second port. This routine will be best understood by considering the format of communications with the AMRs.

In the illustrated system, each communication from an AMR includes a first record of a certain length (36 bytes). Upon receiving a complete first record, a checksum is verified and, if not correct, a non-acknowledgement or NAK is sent to the AMR. If the checksum is correct and if an account number therein is on file, control data is formatted and sent to the AMR. Then the AMR sends a three byte second record which should start with an acknowledgement or "ACK" byte. If so, the second record is processed to format and send additional control data to the AMR. Then the AMR should send a third record in the form of a single ACK byte which provides a final acknowledgement and if such is received, the communication is completed.

The communication port processing operation are the same for both ports. (See ProcessCom1 and ProcessCom2 in Appendix A, page 1, line 20–48 and page 1, line 50 to page 2, line 21). With respect to port #2, illustrated in FIG. 10, the check for a start of a new communication in the flow diagram corresponds to the check of "TimeUpCom2 for a zero condition in the source code (Appendix A, page 1, line 51). The addition of a new block of data corresponds to setting of d$2=d$2+c$ (Appendix A, page 1, line 52).

If "AmrRecord2"=0, the record is the first record. If it is not a complete record, the processing of the port is ended. However if it is complete, ("IF LEN(d1$)=36" at Appendix A, page 1, line 54), it is saved, the data is checked and a next call is calculated as shown in FIG. 10. A "NextCall" subroutine is used (Appendix A, page 2, line 41 to page 6, line 13) which is operative to check the record data and if there is an error the received data is stored in a "UpdateFile2" file. Then a first response is sent to the AMR. A "Response1" subroutine (Appendix A, page 6, line 15 to page 7, line 45) is operative to format data and then send it to the AMR (Appendix A, page 7, line 44).

If AmrRecord2 is equal to 1 or 2, a corresponding second record or third record processing operation is effected. Such operations are depicted in FIG. 10 and are similar to the first record processing operation, except that no error check is needed for the single byte third record.

With the system of the invention, the activities are broken down into small size blocks or portions for execution, insuring that polling can continue at reasonable speed and that excessive amounts of time are not spent on any one block or portion. Any adverse interference between activities is avoided and a high degree of reliability is achieved. At the same time, the servicing activities are performed serially at a fast speed to give the impression that they are being performed simultaneously. The communications with the modems are essentially invisible to the operator of the system.

Figure 11:
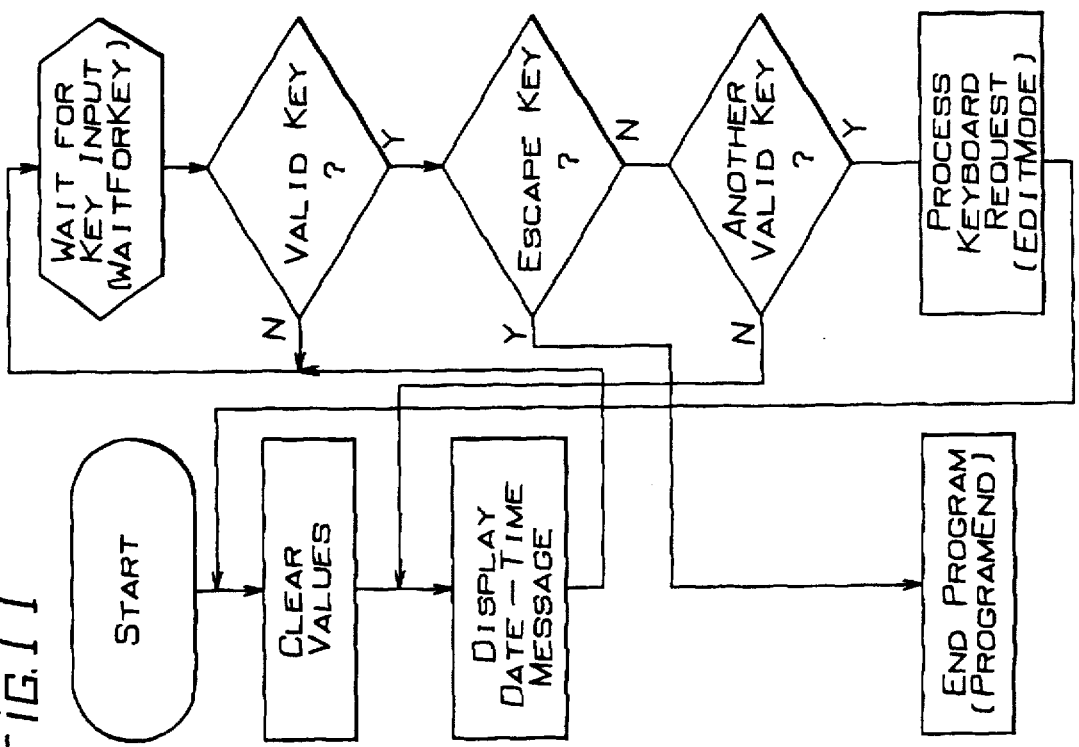
FIG. 11 is a flow diagram for a date and time entry program of the system, further illustrating application of the principles of the invention.

Date and Time Entry Program (FIG. 11)

As aforementioned, the date and time entry program presents a display showing and permitting change of the current date and time registered by the system, to allow periodic checking and correction as necessary to maintain high accuracy. This program illustrates an application of principles of the invention which are applied in other programs of the illustrated system. Upon selection of this program from the main menu, the operation is chained to a program which is labeled "AMR06.BAS" in the source code (See Appendix A, page 24, line 22 to page 31, line 8). After clearing values, a message box is displayed (Appendix A, page 25, line 40) and then a loop is entered which includes a call of a "WaitForKey" subroutine (Appendix A, page 25, line 44), the "WaitForKey" subroutine being illustrated in the flow diagram of FIG. 12.

After operation is returned from the "WaitForKey" subroutine, the date and time entry program of FIG. 11 then checks are made for entry of a valid key. If a valid key is entered and if it is the "ESC" key, the date and time program is ended to go back to the main menu; otherwise a check is made to see that it is a valid key other than the ESC key and, if so, an "EditMode" subroutine is called to process the keyboard request (Appendix A, page 26, line 1).

Figure 12:
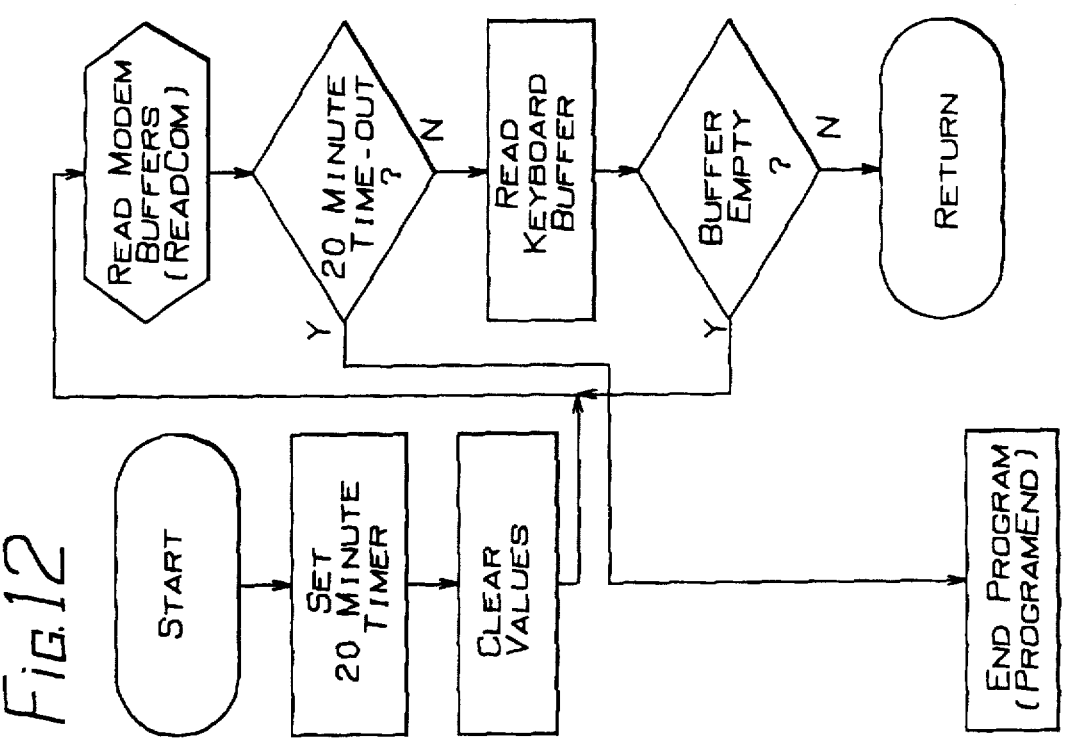
FIG. 12 is a flow diagram for a wait-for-key process used in the date and time entry program of FIG. 11, a similar process being incorporated in other programs of the system.

The details of processing of the keyboard request is not included in the flow diagram of FIG. 11 but the source code appears in Appendix A at page 26, line 23 to page 27, line 55. A main loop thereof (Appendix A, page 26, line 30 to page 27, line 34) includes a repeat "DO" loop with a call of the aforementioned "WaitForKey" subroutine (Appendix A, page 27, line 2) which is illustrated in FIG. 12 and which includes a call of the "ReadCom" subroutine to process the communication ports. If the main loop is exited by pressing either the ESC key or the ENTER key, a data check is made, followed by a process which is similar to that illustrated in the lower right portion of FIG. 8 and which includes a call of the "ReadCom" subroutine (Appendix A, page 27, line 40).

Wait for Key Input Operation (FIG. 12)

The source code of the "WaitForKey" subroutine appears in Appendix A, at lines 1–25 of page 28 and FIG. 12 is a flow diagram thereof. It includes an exit in response to a 20 minute time-out and also includes a serial polling operation similar to that discussed above in connection with FIG. 8 and have the same advantages, with a call of the "ReadCom" subroutine and with a read of the keyboard buffer. The "ReadCom" operation is described above in connection with FIGS. 9 and 10.

Figure 13:
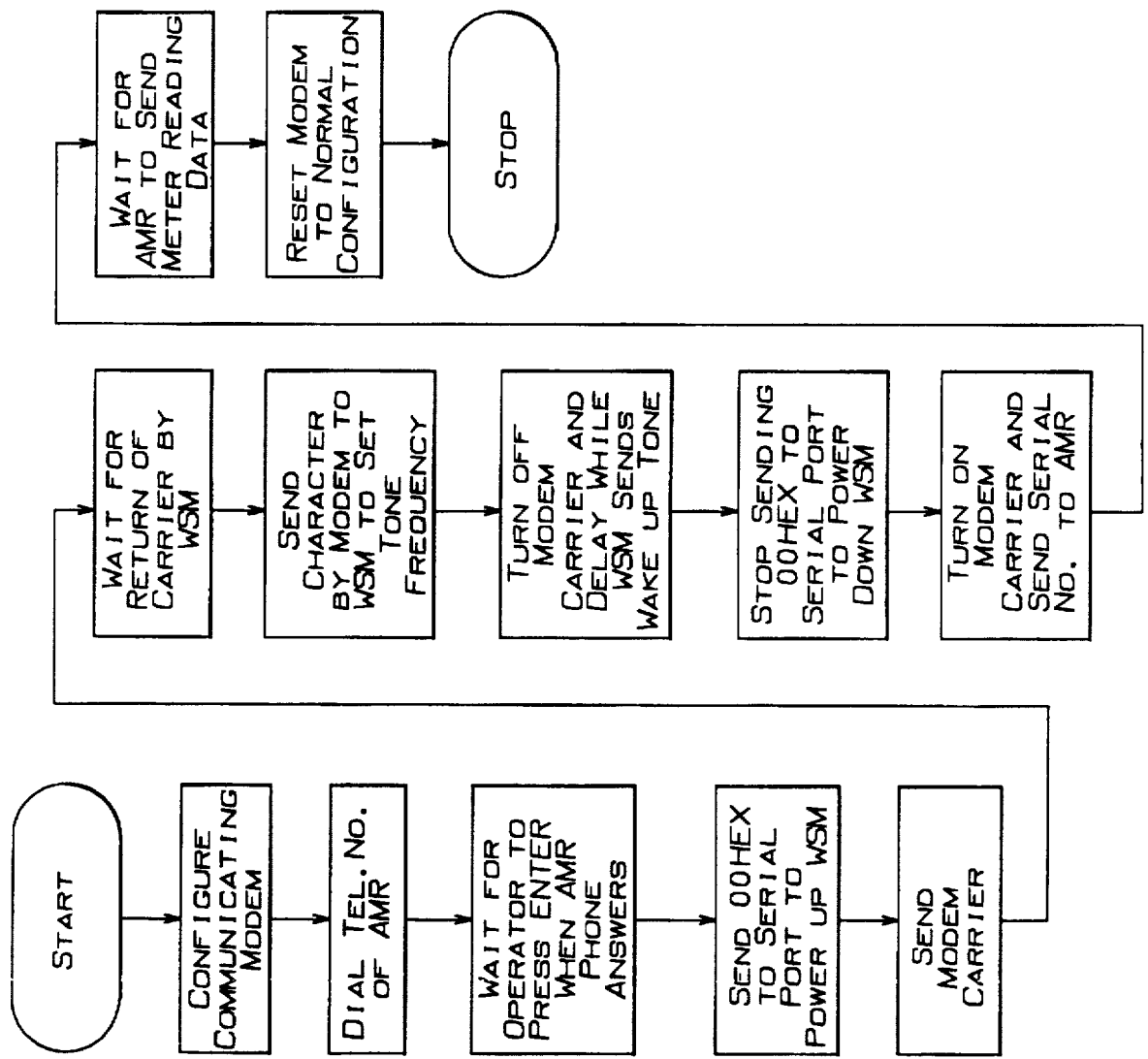
FIG. 13 is a flow diagram illustrating entry a wake-up signal module operation of a demand reading program of the system.

Wake-up Signal Module Operation (FIG. 13)

Source code is set forth in an attach Appendix B for the computer program for operation of the wake up signal module 50 is contained in a "AMR02.BAS" program for a "Demand Meter Reading" procedure which is discussed hereinbefore in connection with FIGS. 3, 4 and 5. FIG. 13 is a flow diagram illustrating its operation which uses one of the modems for sending a wake-up tone to an AMR while the other modem remains operative for receiving data from AMRs which may be calling in during the demand call procedure.

Each step in the procedure is indicated in the flow diagram of FIG. 13 which may the considered in relation to the procedure discussed hereinbefore in connection with FIGS. 3, 4 and 5. During the demand call procedure there are a number of loop operations, in which the program awaits operator key or other inputs and in which the "WaitForKey" or similar routines may be used with calls for reads of the communication ports, such as discussed in connection with FIGS. 11 and 12.

It will be understood that modifications and variations may be effected without departing from the spirit and scope of the novel concepts of this invention.

APPENDIX A

Patent Application of Theresa Saadeh
AUTOMATIC METER READING SYSTEM WITH
MULTITASKING CONTROL

© COPYRIGHT 1986, 1989, 1990 BADGER METER INC., ALL RIGHTS RESERVED

```
'Include File Name: READCOMA.BAS
'Programmer:       T. Saadeh
'Function:         Include file with communications processing subroutines
'                  for a 2 line system.

ProcessCom1:
    IF TimeUpCom1 = 0 THEN TimeUpCom1 = TIMER + 10
    d1$ = d1$ + c$
    IF AmrRecord1 = 0 THEN
        IF LEN(d1$) = 36 THEN
            FOR i = 1 TO 36: ChrAsc1(i) = ASC(MID$(d1$, i, 1)): ChrAsc(i) = ChrAsc1(i): NEXT i
            port = 1: GOSUB NextCall
            IF AcctError = 1 THEN ReadingError = 1: GOSUB UpdateFile1: RETURN
            GOSUB Response1
            d1$ = "": AmrRecord1 = 1
        END IF
        RETURN
    END IF
    IF AmrRecord1 = 1 THEN
        IF LEN(d1$) = 3 THEN
            FOR i = 37 TO 39: ChrAsc1(i) = ASC(MID$(d1$, i - 36, 1)): NEXT i
            AmrSecurityResponse = ChrAsc1(38)
            port = 1: GOSUB Response2
            IF ReadingError = 1 THEN GOSUB UpdateFile1: RETURN
            d1$ = "": AmrRecord1 = 2
        END IF
        RETURN
    END IF
    IF AmrRecord1 = 2 THEN
        ChrAsc1(40) = ASC(d1$)
        IF ChrAsc1(40) <> 6 THEN ReadingError = 1
        GOSUB UpdateFile1
    END IF
RETURN ProcessCom2:
    IF TimeUpCom2 = 0 THEN TimeUpCom2 = TIMER + 10
    d2$ = d2$ + c$
    IF AmrRecord2 = 0 THEN
        IF LEN(d2$) = 36 THEN
            FOR i = 1 TO 36: ChrAsc2(i) = ASC(MID$(d2$, i, 1)): ChrAsc(i) = ChrAsc2(i): NEXT i
            port = 2: GOSUB NextCall
            IF AcctError = 1 THEN ReadingError = 1: GOSUB UpdateFile2: RETURN
```

```
                GOSUB Response1
                d2$ = "": AmrRecord2 = 1
            END IF
            RETURN
5       END IF
        IF AmrRecord2 = 1 THEN
            IF LEN(d2$) = 3 THEN
                FOR i = 37 TO 39: ChrAsc2(i) = ASC(MID$(d2$, i - 36, 1)): NEXT i
                AmrSecurityResponse = ChrAsc2(38)
10              port = 2: GOSUB Response2
                IF ReadingError = 1 THEN GOSUB UpdateFile2: RETURN
                d2$ = "": AmrRecord2 = 2
            END IF
            RETURN
15      END IF
        IF AmrRecord2 = 2 THEN
            ChrAsc2(40) = ASC(d2$)
            IF ChrAsc2(40) <> 6 THEN ReadingError = 1
            GOSUB UpdateFile2
20      END IF
        RETURN VerifyChksm1:
            Checksum1 = 0: ValidChksm1 = 0
25          FOR j = 1 TO 35
                Checksum1 = Checksum1 + ChrAsc1(j)
            NEXT j
            Checksum1 = Checksum1 - (INT(Checksum1 / 256) * 256)
            IF Checksum1 = ChrAsc1(36) THEN ValidChksm1 = 1
30      RETURN VerifyChksm2:
            Checksum2 = 0: ValidChksm2 = 0
            FOR j = 1 TO 35
35              Checksum2 = Checksum2 + ChrAsc2(j)
            NEXT j
            Checksum2 = Checksum2 - (INT(Checksum2 / 256) * 256)
            IF Checksum2 = ChrAsc2(36) THEN ValidChksm2 = 1
        RETURN
40
        NextCall:
            AcctError = 0
            REM Determine account number and check
                byte1$ = LTRIM$(STR$(VAL(HEX$(ChrAsc(2)))))
45              byte2$ = LTRIM$(STR$(VAL(HEX$(ChrAsc(3)))))
                byte3$ = LTRIM$(STR$(VAL(HEX$(ChrAsc(4)))))
                byte4$ = LTRIM$(STR$(VAL(HEX$(ChrAsc(5)))))
                IF LEN(byte1$) = 1 THEN byte1$ = "0" + byte1$
                IF LEN(byte2$) = 1 THEN byte2$ = "0" + byte2$
50              IF LEN(byte3$) = 1 THEN byte3$ = "0" + byte3$
                IF LEN(byte4$) = 1 THEN byte4$ = "0" + byte4$
                acct1 = VAL(byte1$ + byte2$ + byte3$ + byte4$)
                IF acct1 <= 0 THEN AcctError = 1: RETURN 55          REM Open account index file and get record number
                OPEN "r", #3, "amrindx.dat", 2
                    FIELD #3, 2 AS filenum1$
```

3

```
            GET #3, acct1
            FileNumber1 = CVI(filenum1$)
        CLOSE #3
        IF FileNumber1 = 0 THEN AcctError = 1: RETURN REM Open customer account file and read data
        OPEN "R", #3, "amr1.dat", 304
            FIELD #3, 1 AS F2$, 158 AS Z1$, 14 AS Z2$, 1 AS CF$, 10 AS DT$, 8 AS TM$, 3 AS AS$, 52 A
    Z3$, 3 AS TD$, 25 AS Z4$, 3 AS PR$, 23 AS Z5$, 1 AS DA$, 2 AS SL$
            GET #3, FileNumber1
            IF ASC(F2$) <> 89 THEN AcctError = 1: CLOSE #3: RETURN
            callback.date$ = DT$
            CALLBACK.TIME$ = TM$
            call.freq = VAL(CF$)
            IF call.freq = 0 THEN call.freq = 1
            AcctStatus$ = AS$
            TODstatus$ = TD$
            PRstatus$ = PR$
            day = ASC(DA$)
            slot = ASC(MID$(SL$, 1, 1)) + ASC(MID$(SL$, 2, 1))
        CLOSE #3

REM Recall Day
        SELECT CASE call.freq
            CASE 1
                tIndex = 1
            CASE 2
                tIndex = 7
            CASE 3
                tIndex = 28
            CASE 4
                tIndex = 84
            CASE ELSE
                tIndex = 1
        END SELECT REM Current Date
        MM1 = VAL(MID$(DATE$, 1, 2))          'month
        DD1 = VAL(MID$(DATE$, 4, 2))          'day
        YY1 = VAL(MID$(DATE$, 7, 4))          'year MONTH = MM1: DAYY = DD1: YEAR = YY1
        GOSUB JulianConvert                   'convert to Julian
        JJ1# = JULIAN#

REM Call Back Date
        MM2 = VAL(MID$(callback.date$, 1, 2))
        DD2 = VAL(MID$(callback.date$, 4, 2))
        YY2 = VAL(MID$(callback.date$, 7, 4))

MONTH = MM2: DAYY = DD2: YEAR = YY2
        GOSUB JulianConvert                   'convert to Julian
        JJ2# = JULIAN#

REM Current Time
        HH1 = VAL(MID$(TIME$, 1, 2))          'hour
        MN1 = VAL(MID$(TIME$, 4, 2))          'minute
```

```
                                                    4
        SS1 = VAL(MID$(TIME$, 7, 2))           'second REM Call Back Time
        HH2 = VAL(MID$(CALLBACK.TIME$, 1, 2))   'hour
 5      MN2 = VAL(MID$(CALLBACK.TIME$, 4, 2))   'minute
        SS2 = VAL(MID$(CALLBACK.TIME$, 7, 2))   'second REM Determine if new call back time is needed
        SkipSelect = 0
10      JJ3 = JJ2# - JJ1#
        IF JJ3 > 0 THEN SkipSelect = 1                         'call back date has not passed
        IF JJ3 = 0 THEN                                        'call back date is today
          Seconds1# = (3600 * HH1) + (60 * MN1) + SS1
          Seconds2# = (3600 * HH2) + (60 * MN2) + SS2
15        IF Seconds2# > Seconds1# + 1200 THEN SkipSelect = 1  'call back time has not passed
        END IF DO WHILE SkipSelect = 0
        MM = MM1: DD = DD1: YY = YY1
20
        SELECT CASE call.freq
          CASE 2                                               'weekly
            REM find current day of week
              InRegs.ax = &H2A00
25            CALL INTERRUPT(&H21, InRegs, OutRegs)
              axReg = OutRegs.ax
              weekday = INT(axReg / 2 ^ 8)        'ah  (high byte)
              DayofWeek1 = axReg - (weekday * 2 ^ 8)   'al  (low byte)

30          REM find call back day of week
              DayofWeek2 = day

SELECT CASE DayofWeek2 - DayofWeek1
              CASE 0
35              DD2 = DD + 7
              CASE IS < 0
                DD2 = DD + ((7 - DayofWeek1) + DayofWeek2)
              CASE IS > 0
                DD2 = DD + (DayofWeek2 - DayofWeek1)
40          END SELECT MM2 = MM1: YY2 = YY1
            IF DD2 > DaysInMonth(MM2) THEN
              DD2 = DD2 - DaysInMonth(MM2): MM2 = MM2 + 1
45          END IF
            IF MM2 > 12 THEN
              MM2 = 1: YY2 = YY2 + 1
            END IF 50        CASE 3                                               'monthly
            IF day > DD THEN
              MM2 = MM: DD2 = day: YY2 = YY
            ELSE
              DD2 = day: MM2 = MM + 1: YY2 = YY
55            IF MM2 > 12 THEN MM2 = 1: YY2 = YY + 1
            END IF
```

```
                    5
        CASE 4                                          'quarterly
           SELECT CASE day
              CASE 1 TO 28
                 M = 1                                  '1st month
              CASE 29 TO 56
                 M = 2                                  '2nd month
              CASE 57 TO 84
                 M = 3                                  '3rd month
           END SELECT
           INC = 0
           DO WHILE INC <= 3
              IF M <= MM THEN M = M + 3: INC = INC + 1 ELSE EXIT DO
           LOOP
           IF M > 12 THEN M = M - (3 * INC): YY = YY + 1
           DD2 = DD: MM2 = M: YY2 = YY CASE ELSE                                       'daily
           MM2 = MM: DD2 = DD + 1: YY2 = YY
           IF DD2 > DaysInMonth(MM2) THEN
              DD2 = 1: MM2 = MM2 + 1
           END IF
           IF MM2 > 12 THEN
              MM2 = 1: YY2 = YY2 + 1
           END IF
     END SELECT MONTH = MM2: DAYY = DD2: YEAR = YY2
     GOSUB JulianConvert                                'convert to Julian
     JJ2# = JULIAN#
     JJ3 = JJ2# - JJ1#                                  'days till call

EXIT DO

LOOP

REM Ticks till wakeup
     temp = VAL(MID$(TIME$, 5, 1)) + 1                  'LSD of minute
     IF temp <= 4 THEN minutes = 5 - temp               'LSD=0,1,2,3,4
     IF temp >= 6 THEN minutes = 10 - temp              'LSD=6,7,8,9
     IF temp = 5 THEN minutes = 0                       'LSD=5
     seconds = (60 - SS1) + (60 * minutes)              'seconds till 5 minute
     TicksTillWakeup(port) = INT(seconds / 2)           '1 tick = 2 seconds REM Wakeups till call
     Seconds1# = (3600 * HH1) + (60 * MN1) + SS1
     Seconds2# = (3600 * HH2) + (60 * MN2) + SS2
     Wakeups1 = INT(Seconds1# / 300)
     Wakeups2 = INT(Seconds2# / 300)
     IF Wakeups2 < Wakeups1 AND JJ3 > 0 THEN
        JJ3 = JJ3 - 1
        Wakeups2 = Wakeups2 + 288
     END IF
     WAKEUPS3 = Wakeups2 - Wakeups1
     WakeupsTillCall = (JJ3 * 288) + WAKEUPS3 - 1
     WakeupsTillCall1(port) = INT(WakeupsTillCall / 256)
     WakeupsTillCall2(port) = WakeupsTillCall - (WakeupsTillCall1(port) * 256)
```

6

```
        REM Ticks from wakeup till call
            temp$ = STR$(MN2)
            temp$ = MID$(temp$, LEN(temp$), 1)
            temp = VAL(temp$) * 60 + SS2
 5          IF temp >= 300 THEN temp = temp - 300
            TicksTillCall(port) = INT(temp / 2)

REM Number of 5 minute intervals till next hour
            WakeupsTillHour(port) = INT((60 - (MN1 + 1)) / 5) + 1
10
        REM Number of hours till next day
            HoursTillDay(port) = 24 - (HH1 + 1)
        RETURN 15      Response1:
            REM Clear Meter Data Array
                FOR j = 1 TO 15: Meter1(j) = 0: NEXT j REM Acknowledge
20              Meter1(1) = 6

REM Security Key
                OldIndex = ChrAsc(6)
                IF OldIndex > 15 THEN OldIndex = 0
25              x = INT(15 * RND + -1) + 1                          'random number between 0 and 15 a
        the new key index
                t = 5
                FOR i = 1 TO 4
                    Meter1(t) = EncKey(OldIndex, i) XOR EncKey(x, i)  'new key XOR'ed with old key
30                  t = t - 1
                NEXT i
                SecurityIndex(port) = x REM CCM Bookkeeping Data                                'pass back as it was recieved
35              REM byte 1
                    SELECT CASE call.freq
                        CASE 1                                      '--'daily
                            Meter1(6) = 0
                        CASE 2                                      '--'weekly
40                          today$ = DATE$                          'save current date
                            DATE$ = callback.date$                  'substitute with call back date
                            InRegs.ax = &H2A00                      'function 2Ah
                            CALL INTERRUPT(&H21, InRegs, OutRegs)   'interrupt 21h
                            axReg = OutRegs.ax                      'day in al
45                          weekday = INT(axReg / 2 ^ 8)            'ah
                            Meter1(6) = axReg - (weekday * 2 ^ 8)   'al
                            DATE$ = today$                          'restore current date
                        CASE 3, 4                                   '--'monthly and quarterly
                            Meter1(6) = VAL(MID$(callback.date$, 4, 2))
50                      CASE ELSE
                            Meter1(6) = 0
                    END SELECT REM bytes 2 and 3
55                  TotalMinutes = (HH2 * 60) + MN2
                    Meter1(8) = INT(TotalMinutes / 2 ^ 8)
                    Meter1(7) = TotalMinutes - (Meter1(8) * 2 ^ 8)
```

7

```
            REM byte 4
                Meter1(9) = SS2

5          REM byte 5
                Meter1(10) = call.freq + 1

REM Peak Rate Width
                Meter1(11) = 5
10
            REM Status Flags
                IF AcctStatus$ = "On " THEN Meter1(12) = 7 ELSE Meter1(12) = 0

REM Security Data
15              SecurityData = INT(65536 * RND + 0)                'security data  / random numbe
            between 0 and 65535
                Meter1(13) = INT(SecurityData / 256)               '1st byte
                Meter1(14) = SecurityData - (Meter1(13) * 256)     '2nd byte 20          REM Calculate Security Response
                c = 1
                FOR i = 4 TO 1 STEP -1
                    x(c) = INT(EncKey(x, i) / 16)                  '1st nibble ¦ seperate for
                    x(c + 1) = EncKey(x, i) - (x(c) * 16)          '2nd nibble ¦ security response
25                  c = c + 2                                      'next byte
                NEXT i SD = SecurityData
                CODE = 0: b = 7
30              FOR i = 1 TO 8
                    IF ((2 ^ x(i)) AND SD) = (2 ^ x(i)) THEN CODE = CODE OR (2 ^ b)
                    b = b - 1
                NEXT i
                SecurityResponse(port) = CODE
35
            REM Checksum
                SUM# = 0
                FOR j = 2 TO 14
                    SUM# = SUM# + Meter1(j)
40              NEXT j
                Meter1(15) = SUM# - (INT(SUM# / 256) * 256)

REM Send Data
                FOR j = 1 TO 15: PRINT #port, CHR$(Meter1(j)); : NEXT j
45          RETURN JulianConvert:
            IF MONTH > 2 THEN
                M8 = MONTH - 3: Y8 = YEAR
50          ELSE
                M8 = MONTH + 9: Y8 = YEAR - 1
            END IF C8 = INT(Y8 / 100)
55          D8 = Y8 - 100 * C8
            JULIAN# = INT(146097! * C8 / 4) + DAYY + INT(1461 * D8 / 4) + 1721119! + INT((153 * M8 + 2) / 5)
            RETURN
```

8

```
     Response2:
        REM Clear Meter Data Array
           FOR j = 1 TO 21: Meter2(j) = 0: NEXT j
 5
        REM Acknowledgement
           Meter2(1) = 6

REM Security Key Index
10         'LPRINT AmrSecurityResponse; SecurityResponse(port)
           Meter2(2) = SecurityIndex(port)

REM TOD Exemption Schedule
           REM find the day of year
15            eMonth = VAL(MID$(DATE$, 1, 2))
              eDay = VAL(MID$(DATE$, 4, 2))
              eTotal = 0
              FOR i = 1 TO eMonth - 1
                 eTotal = eTotal + DaysInMonth(i)
20            NEXT i
              eTotal = eTotal + eDay REM parse out 64 days starting with current day of year
              OPEN "mask2.dat" FOR INPUT AS #4
25               INPUT #4, mask2$
              CLOSE #4
              mask2$ = MID$(mask2$, eTotal, LEN(mask2$)) + MID$(mask2$, 1, eTotal - 1)
              eMask$ = MID$(mask2$, 1, 64)

30         REM convert to 8 bytes
              eCount = 1
              FOR j = 1 TO 63 STEP 8
                 eByte(eCount) = 0
                 eByte$ = MID$(eMask$, j, 8)
35               ePower = 7
                 FOR i = 1 TO 8
                    ebit$ = MID$(eByte$, i, 1)
                    IF ebit$ = "1" THEN eByte(eCount) = eByte(eCount) OR 2 ^ ePower
                    ePower = ePower - 1
40               NEXT i
                 eCount = eCount + 1
              NEXT j FOR i = 3 TO 10
45               Meter2(i) = eByte(i - 2)
              NEXT i REM PR/TOD Mask
           FOR j = 1 TO 3: mask(j) = 0: NEXT j
50         CLOSE #3
           OPEN "MASK.DAT" FOR INPUT AS #3
              INPUT #3, PR$
              INPUT #3, PER$
              INPUT #3, INDX$
55         CLOSE #3
           CurrentHour = VAL(MID$(TIME$, 1, 2)) + 1
           TO.END = LEN(PR$) - CurrentHour + 1
```

```
                    mask$ = MID$(PR$, CurrentHour, TO.END) + MID$(PR$, 1, CurrentHour - 1)
                    mask$(1) = MID$(mask$, 1, 8)
                    mask$(2) = MID$(mask$, 9, 8)
                    mask$(3) = MID$(mask$, 17, 8)
 5                  FOR j = 1 TO 3
                       MULT = 128
                       FOR K = 1 TO 8
                          IF MID$(mask$(j), K, 1) = "1" THEN mask(j) = mask(j) + MULT
                          MULT = MULT / 2
10                     NEXT K
                    NEXT j
                    Meter2(11) = mask(1)
                    Meter2(12) = mask(2)
                    Meter2(13) = mask(3)
15
               REM PR/TOD Index
                    Meter2(14) = VAL(MID$(INDX$, CurrentHour, 1))

REM Recall Day Number
20                  Meter2(15) = tIndex

REM Next Call In Ticks
                    Meter2(16) = TicksTillWakeup(port)
                    Meter2(17) = WakeupsTillCall1(port)
25                  Meter2(18) = WakeupsTillCall2(port)
                    Meter2(19) = TicksTillCall(port)
                    Meter2(20) = WakeupsTillHour(port)
                    Meter2(21) = HoursTillDay(port)

30             REM Checksum
                    SUM# = 0
                    FOR j = 2 TO 21
                       SUM# = SUM# + Meter2(j)
                    NEXT j
35                  Meter2(22) = SUM# - (INT(SUM# / 256) * 256)

REM Send Meter Data
                    tER = 0
                    FOR j = 1 TO 22
40                     IF Meter2(j) < 0 OR Meter2(j) > 255 THEN ReadingError = 1
                    NEXT j
                    IF ReadingError = 1 THEN RETURN
                    FOR j = 1 TO 22: PRINT #port, CHR$(Meter2(j)); : NEXT j
               RETURN
45
               UpdateFile1:
                    TimeUpCom1 = 0
                    d1$ = "": AmrRecord1 = 0
                    CLOSE #1: OPEN "com1:300,n,8,1" FOR RANDOM AS #1
50
                    IF ReadingError = 0 THEN
                       temp$ = DATE$ + " " + TIME$
                       FOR j = 1 TO 40
                          temp$ = temp$ + STR$(ChrAsc1(j))
55                     NEXT j temp$ = temp$ + STR$(MM2) + STR$(DD2) + STR$(YY2) + STR$(HH2) + STR$(MN2) + STR$(SS2)
```

```
                                                10
        STR$(SecurityIndex(1))

IF demand = 1 THEN
                    amr.data$ = temp$
 5              ELSE
                    OPEN "mod1.dat" FOR APPEND AS #3
                        PRINT #3, temp$
                    CLOSE #3
                END IF
10          ELSE
                IF AcctError = 1 THEN
                    OPEN "mod1.dat" FOR APPEND AS #3
                        PRINT #3, DATE$; " "; TIME$; " not on file"; acct1
                    CLOSE #3
15              ELSE
                    IF message = 1 THEN
                        OPEN "msg.dat" FOR APPEND AS #3
                            PRINT #3, DATE$; " "; TIME$; " time out";
                            FOR j = 1 TO 40: PRINT #3, ChrAsc1(j); : NEXT j
20                          PRINT #3,
                        CLOSE #3
                    END IF
                END IF
            END IF
25          ReadingError = 0: AcctError = 0
            FOR j = 1 TO 40: ChrAsc1(j) = 0: NEXT j
            IF demand = 1 THEN TimeEndCom1 = TIMER + 4 ELSE TimeEndCom1 = TIMER + 3
        RETURN 30      UpdateFile2:
            TimeUpCom2 = 0
            d2$ = "": AmrRecord2 = 0
            CLOSE #2: OPEN "com2:300,n,8,1" FOR RANDOM AS #2

35          IF ReadingError = 0 THEN
                temp$ = DATE$ + " " + TIME$
                FOR j = 1 TO 40
                    temp$ = temp$ + STR$(ChrAsc2(j))
                NEXT j
40
                temp$ = temp$ + STR$(MM2) + STR$(DD2) + STR$(YY2) + STR$(HH2) + STR$(MN2) + STR$(SS2)
        STR$(SecurityIndex(2))

OPEN "mod1.dat" FOR APPEND AS #3
45                  PRINT #3, temp$
                CLOSE #3
            ELSE
                IF AcctError = 1 THEN
                    OPEN "mod1.dat" FOR APPEND AS #3
50                      PRINT #3, DATE$; " "; TIME$; " not on file"; acct1
                    CLOSE #3
                ELSE
                    IF message = 1 THEN
                        OPEN "msg.dat" FOR APPEND AS #3
55                          PRINT #3, DATE$; " "; TIME$; " time out";
                            FOR j = 1 TO 40: PRINT #3, ChrAsc2(j); : NEXT j
                            PRINT #3,
```

11

```
              CLOSE #3
            END IF
          END IF
        END IF
5       ReadingError = 0: AcctError = 0
        FOR j = 1 TO 40: ChrAsc2(j) = 0: NEXT j
        TimeEndCom2 = TIMER + 3
      RETURN 10    '--------------------------------------------------------------------------------
      'Include File Name: AP.BI
      'Programmer:       T. Saadeh
      'Function:         ACCESSplus 2 line system dimension and common definitions 15        DIM SHARED InRegs AS RegType, OutRegs AS RegType
          DIM ChrAsc1(40), ChrAsc2(40), ChrAsc(40), METER1(15), METER2(22)
          DIM DaysInMonth(12), TransID(4), mask$(3), mask(3), EncKey(16, 4)
          DIM TicksTillWakeup(2), WakeupsTillCall1(2), WakeupsTillCall2(2)
          DIM TicksTillCall(2), WakeupsTillHour(2), HoursTillDay(2), x(8), t(4)
20        DIM SecurityResponse(2), SecurityIndex(2), eByte(8)

COMMON SHARED ChrAsc1(), ChrAsc2(), DaysInMonth(), TransID(), AmrRecord1
          COMMON SHARED AmrRecord2, d1$, d2$, comm1, comm2, EncKey(), CCM
          COMMON SHARED laptop, printer, address, history, message, import, export
25
      '--------------------------------------------------------------------------------
      'Include File Name: QB.BI
      'Programmer:       T. Saadeh
      'Function:         Include file for use with INTERRUPT function
30
      REM Define the type needed for INTERRUPT TYPE RegType
              ax     AS INTEGER
35            bx     AS INTEGER
              cx     AS INTEGER
              dx     AS INTEGER
              bp     AS INTEGER
              si     AS INTEGER
40            di     AS INTEGER
              flags  AS INTEGER
          END TYPE REM Generate a software interrupt, loading all but the segment registers
45
          DECLARE SUB INTERRUPT (intnum AS INTEGER, inreg AS RegType, outreg AS RegType)

50
      'Include File Name: AMRCOMA.BAS
      'Programmer:       T. Saadeh
      'Function:         Include file containing 2 more include files. One for the
55    '                  type definition for parameters in the INTERRUPT function
      '                  and one with common definitions for a 2 communication
      '                  line system.
```

12

```
   '----------------------------------------------------------------------------
   ' $INCLUDE: 'qb.bi'       'type definition for INTERRUPT function parameters
   '----------------------------------------------------------------------------
5  ' $INCLUDE: 'ap.bi'       'ACCESSplus 2 line system dimension and common definitions 'Program Name:    AMR1.BAS
   'Programmer:      T. Saadeh
10 'Program Function: This is the first program in the ACCESSplus series version
   '                  3.1 supporting 2 communications lines or CCM. It displays
   '                  an introductory screen and assigns values to the variables
   '                  defined in the $INCLUDE file (AMRCOMA.BAS) for common
   '                  storage. It will then chain to a CCM initilization
15 '                  program if a CCM is being use and then go to the system
   '                  ready screen or just go to the system ready screen (AMR2.BAS).

'-------- Introductory Screen ---------'

20 'Initialize

'$INCLUDE: 'qb.bi'
   DIM SHARED InRegs AS RegType, OutRegs AS RegType
   DIM ChrAsc1(40), ChrAsc2(40), ChrAsc(40), METER1(15), METER2(22)
25 DIM DaysInMonth(12), TransID(4), mask$(3), mask(3), EncKey(16, 4)
   DIM TicksTillWakeup(2), WakeupsTillCall1(2), WakeupsTillCall2(2)
   DIM TicksTillCall(2), WakeupsTillHour(2), HoursTillDay(2), x(8), t(4)
   DIM SecurityResponse(2), SecurityIndex(2)

30 COMMON SHARED ChrAsc1(), ChrAsc2(), DaysInMonth(), TransID(), AmrRecord1
   COMMON SHARED AmrRecord2, d1$, d2$, comm1, comm2, EncKey(), CCM
   COMMON SHARED laptop, printer, address, history, message, import, export ON ERROR GOTO ErrorRecovery
35 KEY OFF: SCREEN 1: CLS : WIDTH 40: COLOR 9, 3
   DRAW "BM0,0C1R319D199L319U199BM3,3R313D193L313U193": PAINT (1, 1), 1

REM Border
       LOCATE 2, 2: PRINT CHR$(218)         'top left corner
40     LOCATE 2, 3: PRINT STRING$(37, 196)  'top border
       LOCATE 2, 39: PRINT CHR$(191)        'top right corner
       FOR i = 3 TO 23                      'side borders
          LOCATE i, 2: PRINT CHR$(179);     '  ...
          LOCATE i, 39: PRINT CHR$(179);    '  ...
45     NEXT i                               '  ...
       LOCATE 24, 2: PRINT CHR$(192);       'bottom left corner
       LOCATE 24, 3: PRINT STRING$(37, 196);'bottom border
       LOCATE 24, 39: PRINT CHR$(217);      'bottom right corner
   REM End Border
50
   REM Badger Meter,Inc.

DRAW "BM56,60C3R11E1L12U1R12U1L12R3U14R1D14U11L4U1R12U1L12U1R11D13R1U4BU2U6D6G1L6"
       DRAW "BM70,60BR1R4BR3R1U1L9U3D2R9L2U3L6R6U4D1L7D1U2R7H1L5"
55     DRAW "BM81,60BU1U8E1R4F1L5D1R6U1OR2D1L2D1R2L2D14R2L9D1R9D1L1BL3L4"
       DRAW "BM92,60BU1U8E1R3BR2R1D1L6D1R6D7L6D1R4L4U2R6D7G1L5H1R6U1L6U1"
       DRAW "BM101,60BU1U8E1R5F1L6D1R6D2G1L6D4F1R5E1L6U1R6U1"
```

13

```
        DRAW "BM110,60U2BU6U2R1D2BD6D2R1U10BR2R3F1D3U3L5D1R4L5D6R2D1L2D1R2"
                                                                        D    R    A
"BM122,60U4R1D4R1U17L2R5D1L5D1R5D1L5R3D14R2U1L2U1R2U1L3U1R3L3U8R2D2R1D2R1D1R1G1R1D1R1G1R1D1R1D2R1U2
1U2F1U3F1U2R1U2R1U2R2U5R2L5D1R5D1L5D1R5L2D14L3R5U1L5U1R5U1L5U1R5L3U1O"
5       DRAW "BM143,60BU1U8E1R5F1L6D1R6D2G1L6D4F1R5E1L6U1R6U1"
        DRAW "BM152,60BU8U2R5D2L4U1R3L2U4D12F1R2U2L2D1R1"
        DRAW "BM159,60BU1U8E1R5F1L6D1R6D2G1L6D4F1R5E1L6U1R6U1"
        DRAW "BM168,60U2BU6U2R1D2BD6D2R1U10BR2R3F1D3U3L5D1R4L5D6R2D1L2D1R2"
        DRAW "BM176,60U2R2D1L1D1R1D1G2"
10      DRAW "BM181,60U4R5D1L4D1R4D1L4D1R4L2U17R2L5D1R5D1L5D1R5L3D1O"
        DRAW "BM188,60U2R4D1L3D1R3L2U1OL2D2R8U1L7R2E1R3F1D9L2U2R4D1L3F1R2"
        DRAW "BM200,60BU1U8E1R4F1L5D1R5D1L2BD4R2D1L6D1R6G1L4"
        DRAW "BM208,60U2R2D1L2D1R2"
        LOCATE 10, 8: PRINT "Utility Products Division"
15
        REM Flowing 'B'

DRAW "BM56,90R20D1R2L22D1R22F1L23D1R23F1L24D1R24D1L24D1R24D1L24D1R24F1L3F1R2D1L1F1R1D1L1F1R1G1R3"
        DRAW "F1R2L6BL7L19D1R21BR5R29F1R1L31BL4L22D1R23BR3R33F1R1L35BL3L23D1R24BR3R35F1L36BL3L24"
20      DRAW "D1R24BR3R37D1L36BL4L24D1R24BR5R36D1L34BL7L24"
        DRAW "R2DF1R4BR8R32D1L12BL28L3F1R2BR30R10D1L9BL30L2D1R2BR3R0R9D1L9BL28L2D1R4BR25R9"
        DRAW "D1L11BL20L7BL6L20D1R22BR4R37D1L37BL3L23D1R23BR3R36G1L35BL3L23D1R24BR3R32L1G1L30BL3L24"
        DRAW "D1R24BR3R32F1R1L33BL4L24D1R24BR6R32F1L31BL8L24"
                                                                        D    R    A
25  "R21F1R3BR8R31D1L11BL27L3F1R2BR29R10D1L9BL29L2D1R2BR29R9D1L9BL28L2D1R3BR26R10D1L12BL21L6D1R39"
        DRAW "D1L39D1R39G1L38F1R37G1L36D1R35G1L33F1R3OL1G1L26R1F1R21CD"
        CIRCLE (61, 151), 5: DRAW "BM60,153U4R1F1G1F1D1"
        LOCATE 15, 24: PRINT "Presents"

30
        REM ACCESS plus
                                                                        D    R    A
"BM150,148C3U3R5D3L4U2R3D1L2U4R1D1U2R1U2R1U2R1D2U4R1U5L2D3R1U3R4D3L1U2L1D4R1D4L2R3U2D2R1D2R1D1R1D2R
35  D3L5U3R2U1D2L1R3D1L3"
        DRAW "BM169,148H1U15E1R7F1D4L1U4L7D1R6D1L6D14R7E1U4L1D4L6U1R5U1L5"
        DRAW "BM181,148H1U15E1R7F1D4L1U4L7D1R6D1L6D14R7E1U4L1D4L6U1R5U1L5"
        DRAW "BM192,148U3R10U2R1D5L1OU1R9U1L9R1U7R6D1L5D4U13L3D1R2D1L2D1R2D4U7R9D5L1U4L6D1R5D1L5"
        DRAW "BM207,148H1U4R1D5R7E1L7U1R7U1L7R7U5H1D5U4L7H1R7L6U5R7D2R1U3L9D5U6R9H1L7"
40      DRAW "BM219,148H1U4R1D5R7E1L7U1R7U1L7R7U5H1D5U4L7H1R7L6U5R7D2R1U3L9D5U6R9H1L7"
        DRAW "BM150,152R77G1L75"
        DRAW "BM233,156U2R4D2L3U1R2L1U6R1F1R3E1L4H1R5U6L9U1R9H1L4G1H1L2D2R3D6"
        DRAW "BM244,150U2R5D2L4U1R3L2U15L2D1R1D1L1"
        DRAW "BM253,150H1U9L2D1R1D1L1R2D6F2R2E1F1R2U1L7U1R7L2U8L2D1R1D1L1"
45      DRAW "BM264,150H1U2F1D2R4E1L4U1R4U2H1L4H1U3E1R4F1L5D1R5D1"
        DRAW "BM152,156R117G1L115"
        DRAW "BM270,138U4L1R2": DRAW "BM273,138U4F1F1D1U1E1E1D4"

'Assign values to common variables
50      d1$ = "": d2$ = ""
        AmrRecord1 = 0: AmrRecord2 = 0

DATA 31,28,31,30,31,30,31,31,30,31,30,31
        FOR i = 1 TO 12: READ DaysInMonth(i): NEXT i
55      YEAR = VAL(MID$(DATE$, 7, 4))
        IF YEAR / 4 = INT(YEAR / 4) THEN DaysInMonth(2) = 29
```

14

```
        DATA 128,129,64,65
        FOR i = 1 TO 4: READ TransID(i): NEXT i

DATA 66,65,68,71,69,82,32,77,69,84,69,82,32,73,78,67
5       DATA 65,67,67,69,83,83,32,80,76,85,83,32,83,89,83,84
        DATA 42,77,69,84,69,82,32,82,69,65,68,73,78,71,32,42
        DATA 67,81,80,89,87,82,73,71,72,84,32,32,49,57,56,54

FOR i = 0 TO 15
10         FOR j = 1 TO 4
              READ EncKey(i, j)
           NEXT j
        NEXT i

15      'Determine Configuration
        OPEN "config.dat" FOR INPUT AS #3
           INPUT #3, comm1$
           INPUT #3, comm2$
           INPUT #3, CCM$
20         INPUT #3, laptop$
           INPUT #3, printer$
           INPUT #3, address$
           INPUT #3, history$
           INPUT #3, message$
25         INPUT #3, import$
           INPUT #3, export$
        CLOSE #3
        IF INSTR(comm1$, "on") <> 0 THEN comm1 = 1
        IF INSTR(comm2$, "on") <> 0 THEN comm2 = 1
30      IF INSTR(CCM$, "on") <> 0 THEN CCM = 1
        IF INSTR(laptop$, "yes") <> 0 THEN laptop = 1
        IF INSTR(printer$, "yes") <> 0 THEN printer = 1
        address = VAL(MID$(address$, 11, LEN(address$)))
        IF INSTR(history$, "yes") <> 0 THEN history = 1
35      IF INSTR(message$, "yes") <> 0 THEN message = 1
        IF INSTR(import$, "yes") <> 0 THEN import = 1
        IF INSTR(export$, "yes") <> 0 THEN export = 1 cmd$ = COMMAND$
40      IF INSTR(cmd$, "CC") <> 0 THEN comm2 = 0

'Open Communications Buffers
        IF comm1 = 1 THEN
           OPEN "com1:300,n,8,1" FOR RANDOM AS #1
45         PRINT #1, "ATZ" + CHR$(13); : GOSUB delay
           PRINT #1, "ATMEQ1SO=1" + CHR$(13)
           CLOSE #1: OPEN "com1:300,n,8,1" FOR RANDOM AS #1
        END IF
        IF comm2 = 1 THEN
50         OPEN "com2:300,n,8,1" FOR RANDOM AS #2
           PRINT #2, "ATZ" + CHR$(13); : GOSUB delay
           PRINT #2, "ATEQ1SO=1" + CHR$(13)
           CLOSE #2: OPEN "com2:300,n,8,1" FOR RANDOM AS #2
        END IF
55      IF CCM = 1 THEN
           LOCATE 22, 15: PRINT "Please Wait";
           OPEN "com1:9600,n,8,1" FOR RANDOM AS #1
```

```
            CHAIN "accessp"
        ELSE
            CHAIN "AMR2"
        END IF
5   END delay:
        ON TIMER(1) GOSUB TimeUp
        TimeUp = 0: TIMER ON
10      DO WHILE TimeUp = 0: LOOP
    RETURN TimeUp:
        TIMER OFF: TimeUp = 1
15  RETURN ErrorRecovery:
        SCREEN 0: WIDTH 80
        COLOR 15, 12
20      LOCATE 8, 10: PRINT CHR$(213); STRING$(60, 205); CHR$(184)
        FOR i = 9 TO 12
            LOCATE i, 10: PRINT CHR$(179); SPACE$(60); CHR$(179)
        NEXT i
        LOCATE 13, 10: PRINT CHR$(212); STRING$(60, 205); CHR$(190)
25
        IF ERR = 68 THEN
            COLOR 15, 12: LOCATE 9, 11: PRINT "                              "; DATE$; " "; TIME$; "            "
            COLOR 15, 12: LOCATE 10, 11: PRINT "    The Telephone Support Link Program must be deactivated    "
30
            COLOR 15, 12: LOCATE 11, 11: PRINT "    Type Y for yes when asked to remove it from memory.       "

COLOR 15, 12: LOCATE 12, 11: PRINT "    Press ENTER to deactivate or ESC to end this program.     "
35      ELSE
            COLOR 15, 12: LOCATE 9, 11: PRINT "                              "; DATE$; " "; TIME$; "            "

COLOR 15, 12: LOCATE 10, 11: PRINT "              The system is not configured correctly.         "
40          COLOR 15, 12: LOCATE 11, 11: PRINT "                    Contact ACCESSplus Support.               "

COLOR 15, 12: LOCATE 12, 11: PRINT "                   Press ESC to end this program.             "
        END IF
45
        n$ = "": COLOR 3, 0
        TimeUp = TIMER + 120
        SOUND 200, 5: SOUND 400, 2: SOUND 200, 5
        DO
50          DO WHILE n$ <> CHR$(13) AND n$ <> CHR$(27)
                COLOR 11, 0: LOCATE 25, 3: PRINT DATE$; " "; TIME$;
                n$ = INKEY$
                IF TimeUp < TIMER THEN
                    SOUND 200, 5: SOUND 400, 2: SOUND 200, 5
55                  TimeUp = TIMER + 120
                END IF
            LOOP
```

```
        IF n$ = CHR$(27) THEN END
        IF ERR = 68 AND n$ = CHR$(13) THEN
           OPEN "cc.dat" FOR OUTPUT AS #3: CLOSE #3
           OPEN "ccremove.dat" FOR OUTPUT AS #3: CLOSE #3
           END
        END IF
        n$ = ""
     LOOP ' Program Name:      AMR2.BAS
' Programmer:        T. Saadeh
' Program Function:  System ready screen for ACCESSplus series version
'                    3.01 supporting 2 communications lines or CCM. It chains
'                    to the main menu AMROO.BAS.

'--------- System Ready Screen -----------'

' $INCLUDE: 'amrcoma'

SCREEN 1: KEY OFF: COLOR 9, 3: CLS : LOCATE , , 0
     DRAW "BM0,0C1R319D199L319U199BM3,3R313D193L313U193": PAINT (1, 1), 1

LOCATE 2, 19: PRINT CHR$(218); STRING$(19, 196); CHR$(191)
     FOR i = 3 TO 6: LOCATE i, 19: PRINT CHR$(179); SPACE$(19); CHR$(179): NEXT i
     LOCATE 7, 19: PRINT CHR$(192); STRING$(19, 196); CHR$(217)

LOCATE 8, 2: PRINT CHR$(218); STRING$(36, 196); CHR$(191)
     FOR i = 9 TO 19: LOCATE i, 2: PRINT CHR$(179); SPACE$(36); CHR$(179): NEXT i
     LOCATE 20, 2: PRINT CHR$(192); STRING$(36, 196); CHR$(217)

LOCATE 22, 2: PRINT CHR$(218); STRING$(36, 196); CHR$(191)
     LOCATE 23, 2: PRINT CHR$(179); SPACE$(36); CHR$(179);
     LOCATE 24, 2: PRINT CHR$(192); STRING$(36, 196); CHR$(217);

'    ACCESS plus

D     R     A
"BM15,30C3U3R5D3L4U2R3D1L2U4R1D1U2R1U2R1U2R1D2U4R1U5L2D3R1U3R4D3L1U2L1D4R1D4L2R3U2D2R1D2R1D1R1D2R2D
L5U3R2U1D2L1R3D1L3"
        DRAW "BM34,30H1U15E1R7F1D4L1U4L7D1R6D1L6D14R7E1U4L1D4L6U1R5U1L5"
        DRAW "BM46,30H1U15E1R7F1D4L1U4L7D1R6D1L6D14R7E1U4L1D4L6U1R5U1L5"
        DRAW "BM57,30U3R1OU2R1D5L1OU1R9U1L9R1U7R6D1L5D4U13L3D1R2D1L2D1R2D4U7R9D5L1U4L6D1R5D1L5"
        DRAW "BM72,30H1U4R1D5R7E1L7U1R7U1L7R7U5H1D5U4L7H1R7L6U5R7D2R1U3L9D5U6R9H1L7"
        DRAW "BM84,30H1U4R1D5R7E1L7U1R7U1L7R7U5H1D5U4L7H1R7L6U5R7D2R1U3L9D5U6R9H1L7"
        DRAW "BM15,34R77G1L75"
        DRAW "BM98,38U2R4D2L3U1R2L1U6R1F1R3E1L4H1R5U6L9U1R9H1L4G1H1L2D2R3D6"
        DRAW "BM109,32U2R5D2L4U1R3L2U15L2D1R1D1L1"
        DRAW "BM118,32H1U9L2D1R1D1L1R2D6F2R2E1F1R2U1L7U1R7L2U8L2D1R1D1L1"
        DRAW "BM129,32H1U2F1D2R4E1L4U1R4U2H1L4H1U3E1R4F1L5D1R5D1"
        DRAW "BM17,38R117G1L115"
        DRAW "BM135,20U4L1R2": DRAW "BM138,20U4F1F1D1U1E1E1D4"

OPEN "R", #3, "serno.dat", 10
        FIELD #3, 10 AS sn$
        GET #3, 1
        so$ = sn$
```

17

```
        CLOSE #3

OPEN "r", #3, "max.dat", 8
           FIELD #3, 8 AS ma$
 5         GET #3, 1
           mx = CVSMBF(ma$)
        CLOSE #3

LOCATE 3, 20: PRINT "US Pat.# 4817131"
10      LOCATE 4, 20: PRINT "Release  3.1"
        LOCATE 5, 20: PRINT "Ser.#     "; so$
        LOCATE 6, 20: PRINT "Accounts"; mx LOCATE 9, 5: PRINT "Copyright (C) Badger Meter Inc. "
15      LOCATE 10, 5: PRINT "as an unpublished work first    "
        LOCATE 11, 5: PRINT "licensed in 1986. This computer "
        LOCATE 12, 5: PRINT "program, created in 1986, is a  "
        LOCATE 13, 5: PRINT "proprietary trade secret which  "
        LOCATE 14, 5: PRINT "is the property of Badger Meter,"
20      LOCATE 15, 5: PRINT "Inc. ALL USE, DISCLOSURE AND/OR "
        LOCATE 16, 5: PRINT "REPRODUCTION NOT SPECIFICALLY   "
        LOCATE 17, 5: PRINT "AUTHORIZED BY BADGER METER,INC. "
        LOCATE 18, 5: PRINT "IS PROHIBITED. All rights       "
        LOCATE 19, 5: PRINT "reserved.                       "
25
        LOCATE 23, 6: PRINT " ** Press Any Key To Start! ** "

ON TIMER(2) GOSUB TimeUp
        TimeUp = 0: TIMER ON
30      DO WHILE TimeUp = 0: LOOP ON TIMER(20) GOSUB TimeUp
        TimeUp = 0: TIMER ON: n$ = ""
        DO WHILE n$ = "" AND TimeUp = 0
35         n$ = INKEY$
        LOOP SCREEN 0: WIDTH 80
        CHAIN "amr00"
40      END TimeUp:
           TIMER OFF: TimeUp = 1
        RETURN
45
        'Program Name:      AMR00.BAS
        'Programmer:        T. Saadeh
        'Program Function: This the main program in a series that performs funcional tests
        '                  on ACCESSplus automatic meter reading electronics using
50      '                  2 communications lines.
        '
        '         ---------------- Initialize ----------------

'$INCLUDE: 'amrcoma'
55      DIM screen$(18), h(18), v(18), menu(18), L(100), R(100), ndxx$(18), v1(18)
        ON ERROR GOTO ErrorRecovery
```

18

```
        screen$(1)  = " Display Incoming Meter Readings      "
        screen$(2)  = " Call Customer for a Demand Meter Reading"
        screen$(3)  = " Add, Change, Delete or Install Accounts "
        screen$(4)  = " Read Accounts From an External File   "
 5      screen$(5)  = " Transfer Accounts to An External File "
        screen$(6)  = " Set the System Date and Time          "
        screen$(7)  = " Peak-Rate and Time-of-Day Periods     "
        screen$(8)  = " Days Exempt From Time-of-Day Readings "
        screen$(9)  = " All Accounts          "
10      screen$(10) = " Individual Accounts       "
        screen$(11) = " Delinquent Accounts       "
        screen$(12) = " Call-In Time of Accounts  "
        screen$(13) = " Alarms by Account         "
        screen$(14) = " Search Accounts           "
15      screen$(15) = " Sort or List Accounts     "
        screen$(16) = " Pulse/Test Circle Options"
        screen$(17) = " Back Up Files to Tape     "
        screen$(18) = " Telephone Support Link    "

20      DATA 7,8,12,13,14,16,17,18,7,8,9,10,11,12,13,14,18,19
        FOR i = 1 TO 18: READ h(i): NEXT i

DATA 5,5,5,5,5,5,5,5,50,50,50,50,50,50,50,50,50,50
        FOR i = 1 TO 18: READ v(i): NEXT i
25
        DATA "D","C","A","R","T","S","P","y","l","I","q","n","m","e","o","u","B","h"
        FOR i = 1 TO 18: READ ndxx$(i): NEXT i DATA 6,6,6,6,6,6,6,8,53,51,56,57,55,52,52,52,51,56
30      FOR i = 1 TO 18: READ vl(i): NEXT i DATA 68,67,65,82,84,83,80,89,76,73,81,78,77,69,79,85,66,72
        FOR i = 1 TO 18: READ menu(i): NEXT i 35      KEY 15, CHR$(128) + CHR$(72)
        ON KEY(2) GOSUB KeyF2: KEY(2) ON
        ON KEY(11) GOSUB KeyUp: KEY(11) ON
        ON KEY(15) GOSUB KeyUp: KEY(15) ON 40      TimeUpChain = TIMER + 2

Begin:

'---------------- Wait for Input -------------'
45
        GOSUB PrintMenu
        n$ = "": UP.KEY = 0: F2 = 0
        DO
            FOR j1 = 1 TO 18
50              TimeUpReading = TIMER + 1200
                COLOR 0, 3: LOCATE h(j1), v(j1): PRINT screen$(j1)
                DO
                    IF TimeUpReading < TIMER THEN j1 = 1: GOSUB ChainTo 55                  GOSUB ReadCom n$ = INKEY$
```

```
            IF n$ <> "" OR UP.KEY = 1 OR F2 = 1 THEN
                COLOR 3, 0: LOCATE 23, 1: PRINT SPACE$(80);
                TimeUpReading = TIMER + 1200
                IF n$ = CHR$(8) OR UP.KEY = 1 THEN
5                   COLOR 3, 0: LOCATE h(j1), v(j1): PRINT screen$(j1)
                    COLOR 11, 0: LOCATE h(j1), v1(j1): PRINT ndxx$(j1)
                    IF j1 = 1 THEN j1 = 17 ELSE IF j1 = 2 THEN j1 = 18 ELSE j1 = j1 - 2
                    UP.KEY = 0: EXIT DO
                END IF
10              IF F2 = 1 THEN
                    COLOR 3, 0: LOCATE h(j1), v(j1): PRINT screen$(j1)
                    COLOR 11, 0: LOCATE h(j1), v1(j1): PRINT ndxx$(j1)
                    GOSUB PrintMsgBox
                    SOUND 200, 2: SOUND 100, 2: COLOR 0, 7
15                  LOCATE 10, 10: PRINT "          The ACCESSplus program will now end.           "
                    LOCATE 11, 10: PRINT "     You will return to the PCDOS operating system.      "
                    n$ = ""
                    TimeUpReading = TIMER + 1200
                    DO WHILE n$ <> CHR$(13) AND n$ <> CHR$(27) AND TimeUpReading > TIMER
20                      GOSUB ReadCom: n$ = INKEY$
                    LOOP
                    F2 = 0
                    IF n$ = CHR$(27) THEN GOSUB PrintMenu: EXIT DO
                    IF n$ = CHR$(13) THEN
25                      OPEN "link.dat" FOR RANDOM AS #6
                            FIELD #6, 1 AS link$
                            LSET link$ = CHR$(1): PUT #6, 1
                        CLOSE #6
                        GOTO ProgramEnd
30                  END IF
                END IF
                IF ASC(n$) = 13 THEN GOSUB ChainTo
                n$ = UCASE$(n$)
                FOR i = 1 TO 18
35                  IF ASC(n$) = menu(i) THEN
                        COLOR 3, 0: LOCATE h(j1), v(j1): PRINT screen$(j1)
                        COLOR 11, 0: LOCATE h(j1), v1(j1): PRINT ndxx$(j1)
                        IF i = 1 THEN j1 = 18 ELSE j1 = i - 1
                        EXIT DO
40                  END IF
                NEXT i
                EXIT DO
            END IF
        LOOP
45      COLOR 3, 0: LOCATE h(j1), v(j1): PRINT screen$(j1)
        COLOR 11, 0: LOCATE h(j1), v1(j1): PRINT ndxx$(j1)
    NEXT j1
LOOP 50 ChainTo:
    IF j1 <> 4 THEN
        DO WHILE TimeUpChain > TIMER
            GOSUB ReadCom
            IF TimeUpCom1 <> 0 OR TimeUpCom2 <> 0 THEN EXIT DO
55      LOOP
        IF TimeUpCom1 <> 0 OR TimeUpCom2 <> 0 THEN
            COLOR 14, 0: LOCATE 25, 25: PRINT "Processing call. Please wait.";
```

20

```
              DO WHILE TimeUpCom1 <> 0 OR TimeUpCom2 <> 0
                  GOSUB ReadCom
              LOOP
            END IF
5       END IF SELECT CASE j1
            CASE 1
                CHAIN "amr01"
10          CASE 2
                CHAIN "amr02"
            CASE 3
                CHAIN "amr03"
            CASE 4
15              IF import = 1 THEN
                    CHAIN "amr04"
                ELSE
                    COLOR 0, 7: LOCATE 23, 22
                    PRINT " This program has not been included "
20                  j1 = j1 - 1
                END IF
            CASE 5
                IF export = 1 THEN
                    CHAIN "amr05"
25              ELSE
                    COLOR 0, 7: LOCATE 23, 22
                    PRINT " This program has not been included "
                    j1 = j1 - 1
                END IF
30          CASE 6
                CHAIN "amr06"
            CASE 7
                CHAIN "amr07"
            CASE 8
35              CHAIN "amr08"
            CASE 9
                CHAIN "amr09"
            CASE 10
                CHAIN "amr0A"
40          CASE 11
                CHAIN "amr0B"
            CASE 12
                CHAIN "amr0C"
            CASE 13
45              CHAIN "amr0D"
            CASE 14
                CHAIN "amr0E"
            CASE 15
                CHAIN "amr0F"
50          CASE 16
                CHAIN "amr0G"
            CASE 17
                GOSUB PrintMsgBox
                SOUND 200, 2: SOUND 100, 2: COLOR 0, 7
55              LOCATE 10, 10: PRINT "     The Tape Backup program will now be activated.    "
                LOCATE 11, 10: PRINT " When you exit that program, the ACCESSplus program will "
                LOCATE 12, 10: PRINT "                  automatically restart.                "
```

21

```
        n$ = ""
        TimeUpReading = TIMER + 1200
        DO WHILE n$ <> CHR$(13) AND n$ <> CHR$(27) AND TimeUpReading > TIMER
           GOSUB ReadCom: n$ = INKEY$
5       LOOP
        IF n$ = CHR$(27) THEN GOSUB PrintMenu: j1 = j1 - 1: RETURN
        IF n$ = CHR$(13) THEN
           OPEN "link.dat" FOR RANDOM AS #6
              FIELD #6, 1 AS link$
10            LSET link$ = CHR$(1): PUT #6, 1
           CLOSE #6
           OPEN "tape.dat" FOR OUTPUT AS #3: CLOSE #3
           GOTO ProgramEnd
        END IF
15      CASE 18
           OPEN "link.dat" FOR RANDOM AS #6
           FIELD #6, 1 AS link$
           GET #6, 1
           link = ASC(link$)
20
           SOUND 200, 2: SOUND 100, 2
           IF comm2 = 0 AND link = 1 THEN
              msg = 1: GOSUB PrintMsgBox: msg = 0
              LOCATE 10, 10: PRINT " The system is not configured correctly to activate the "
25            LOCATE 11, 10: PRINT "              Telephone Support Link program.             "
              LOCATE 12, 10: PRINT "                                                           "
              LOCATE 13, 10: PRINT "                    Press any key to continue              "
              n$ = "": TimeUpReading = TIMER + 1200
              DO WHILE n$ = "" AND TimeUpReading > TIMER
30               GOSUB ReadCom: n$ = INKEY$
              LOOP
              GOSUB PrintMenu: j1 = j1 - 1: CLOSE #6: RETURN
           ELSE
              GOSUB PrintMsgBox
35            IF link = 2 THEN
                 LOCATE 10, 10: PRINT " The Telephone Support Link program will be deactivated. "
                 LOCATE 11, 10: PRINT "    After this is done, the ACCESSplus program will     "
                 LOCATE 12, 10: PRINT "                   automatically restart.                "
              ELSE
40               LOCATE 10, 10: PRINT "The Telephone Support Link program will now be activated."
                 LOCATE 11, 10: PRINT "After a short initialization, the ACCESSplus program will"
                 LOCATE 12, 10: PRINT "                   automatically restart.                "
              END IF
           END IF
45
           n$ = ""
           TimeUpReading = TIMER + 1200
           DO WHILE n$ <> CHR$(13) AND n$ <> CHR$(27) AND TimeUpReading > TIMER
              GOSUB ReadCom: n$ = INKEY$
50         LOOP
           IF n$ = CHR$(27) THEN GOSUB PrintMenu: j1 = j1 - 1: CLOSE #6: RETURN
           IF n$ = CHR$(13) THEN
              OPEN "cc.dat" FOR OUTPUT AS #3: CLOSE #3
              IF link = 2 THEN
55               OPEN "ccremove.dat" FOR OUTPUT AS #3: CLOSE #3
                 link = 1
              ELSE
```

```
                    link = 2
                END IF
                LSET link$ = CHR$(link): PUT #6, 1: CLOSE #6
                GOTO ProgramEnd
            END IF
        END SELECT
    RETURN PrintMenu:
        COLOR 11, 0: CLS : LOCATE , , 0
        COLOR 11, 0: LOCATE 1, 21: PRINT " ACCESSplus - Automatic Meter Reading "
        COLOR 9, 0: LOCATE 3, 3: PRINT STRING$(74, 205)
        COLOR 14, 0: LOCATE 3, 34: PRINT " Main Menu "

COLOR 9, 0
        LOCATE 6, 3: PRINT CHR$(218); STRING$(43, 196); CHR$(191)
        LOCATE 7, 3: PRINT CHR$(179): LOCATE 7, 47: PRINT CHR$(179)
        LOCATE 8, 3: PRINT CHR$(179): LOCATE 8, 47: PRINT CHR$(179)
        LOCATE 9, 3: PRINT CHR$(192); STRING$(43, 196); CHR$(217)
        COLOR 7, 9: LOCATE 6, 14: PRINT " Meter Communications "

COLOR 9, 0
        LOCATE 10, 3: PRINT CHR$(218); STRING$(43, 196); CHR$(191)
        FOR i = 11 TO 19: LOCATE i, 3: PRINT CHR$(179): LOCATE i, 47: PRINT CHR$(179): NEXT i
        LOCATE 20, 3: PRINT CHR$(192); STRING$(43, 196); CHR$(217)
        COLOR 7, 9: LOCATE 10, 10: PRINT " System Information Management "

COLOR 9, 0
        LOCATE 6, 48: PRINT CHR$(218); STRING$(27, 196); CHR$(191)
        FOR i = 7 TO 15: LOCATE i, 48: PRINT CHR$(179): LOCATE i, 76: PRINT CHR$(179): NEXT i
        LOCATE 16, 48: PRINT CHR$(192); STRING$(27, 196); CHR$(217)
        COLOR 7, 9: LOCATE 6, 57: PRINT " Reports "

COLOR 9, 0
        LOCATE 17, 48: PRINT CHR$(218); STRING$(27, 196); CHR$(191)
        FOR i = 18 TO 19: LOCATE i, 48: PRINT CHR$(179): LOCATE i, 76: PRINT CHR$(179): NEXT i
        LOCATE 20, 48: PRINT CHR$(192); STRING$(27, 196); CHR$(217)
        COLOR 7, 9: LOCATE 17, 56: PRINT " Utilities "

COLOR 7, 9: LOCATE 21, 3
        PRINT " Scroll=      Select=        End=    "; SPACE$(38)
        COLOR 14, 9: LOCATE 21, 12: PRINT CHR$(24); CHR$(25);
        LOCATE 21, 24: PRINT "ENTER"; : LOCATE 21, 36: PRINT "F2"

COLOR 11, 0
        LOCATE 11, 4: PRINT "            - Customer Accounts -             "
        LOCATE 15, 4: PRINT "            - Other Information -             "

FOR i = 1 TO 18
            COLOR 3, 0: LOCATE h(i), v(i): PRINT screen$(i)
            COLOR 11, 0: LOCATE h(i), vl(i): PRINT ndxx$(i)
        NEXT i
        IF comm2 = 0 THEN LOCATE 25, 1: COLOR 20, 0: PRINT CHR$(219);
    RETURN PrintMsgBox:
        COLOR 15, 7
```

23

```
        LOCATE 8, 8: PRINT CHR$(218); STRING$(60, 196); CHR$(191)
        FOR i = 9 TO 14: LOCATE i, 8: PRINT CHR$(179); SPACE$(60); CHR$(179): NEXT i
        LOCATE 15, 8: PRINT CHR$(192); STRING$(60, 196); CHR$(217)
        IF msg = 0 THEN
5           COLOR 0, 7
            LOCATE 14, 10: PRINT "        Press ENTER to confirm or ESC to cancel.        "
            COLOR 14, 0: LOCATE 14, 25: PRINT "ENTER": LOCATE 14, 45: PRINT "ESC"
        END IF
        COLOR 0, 7
10      RETURN ReadCom:
        IF comm1 = 1 THEN
            IF TimeEndCom1 <> 0 AND TimeEndCom1 < TIMER THEN TimeEndCom1 = 0
15          IF TimeUpCom1 <> 0 AND TimeUpCom1 < TIMER THEN
                ReadingError = 1: GOSUB UpdateFile1: TimeEndCom1 = 0
            END IF
            a$ = "": c$ = ""
            WHILE NOT EOF(1)
20              a$ = INPUT$(LOC(1), #1)
                c$ = c$ + a$
            WEND
            IF c$ <> "" AND TimeEndCom1 = 0 THEN GOSUB ProcessCom1
        END IF
25
        IF comm2 = 1 THEN
            IF TimeEndCom2 <> 0 AND TimeEndCom2 < TIMER THEN TimeEndCom2 = 0
            IF TimeUpCom2 <> 0 AND TimeUpCom2 < TIMER THEN
                ReadingError = 1: GOSUB UpdateFile2: TimeEndCom2 = 0
30          END IF
            a$ = "": c$ = ""
            WHILE NOT EOF(2)
                a$ = INPUT$(LOC(2), #2)
                c$ = c$ + a$
35          WEND
            IF c$ <> "" AND TimeEndCom2 = 0 THEN GOSUB ProcessCom2
        END IF

COLOR 3, 0: LOCATE 25, 2: PRINT " "; DATE$; " "; TIME$;
40      RETURN

Delay:
        ON TIMER(1) GOSUB TimeUp
        time.up = 0: TIMER ON
45      DO WHILE time.up = 0: LOOP
        RETURN TimeUp:
        TIMER OFF: time.up = 1
50      RETURN KeyUp:
        UP.KEY = 1: RETURN
    KeyF2:
55      F2 = 1: RETURN ErrorRecovery:
```

```
            IF ERR = 57 THEN RESUME NEXT
            IF ERR = 53 THEN RESUME Begin
            COLOR 12, 0: LOCATE 1, 1: PRINT "error ="; ERR
        STOP: RESUME NEXT
 5
        ProgramEnd:
            IF TimeUpCom1 <> 0 OR TimeUpCom2 <> 0 THEN
                COLOR 14, 0: LOCATE 25, 25: PRINT "Processing call. Please wait.";
                DO WHILE TimeUpCom1 <> 0 OR TimeUpCom2 <> 0
10                  GOSUB ReadCom
                LOOP
            END IF
            IF com1 = 1 THEN PRINT #1, "ATZ" + CHR$(13); : GOSUB Delay: CLOSE #1
            IF com2 = 1 THEN PRINT #2, "ATZ" + CHR$(13); : GOSUB Delay: CLOSE #2
15          CLS
        END '$INCLUDE: 'readcoma'

20      END

'$INCLUDE: 'readcoma'
        'Program Name:      AMR06.BAS
        'Programmer:        T. Saadeh
25      'Program Function: Set the System Date and Time '-------------- Initialize ------------'

'$INCLUDE: 'amrcoma'
30          DIM screen$(2), ScreenData$(2), ErrMsg$(10)

ON ERROR GOTO ErrorRecovery

DATA 31,28,31,30,31,30,31,31,30,31,30,31
35          FOR i = 1 TO 12: READ DaysInMonth(i): NEXT i
            YEAR = VAL(MID$(DATE$, 7, 4))
            IF YEAR / 4 = INT(YEAR / 4) THEN DaysInMonth(2) = 29 screen$(1) = "Date: [  -  -   ]"
40          screen$(2) = "Time: [  :  :   ]"

KEY 15, CHR$(128) + CHR$(72)                        'up key
            KEY 16, CHR$(128) + CHR$(75)                        'left key
            KEY 17, CHR$(128) + CHR$(77)                        'right key
45          KEY 18, CHR$(128) + CHR$(80)                        'down key
            ON KEY(1) GOSUB KeyF1                               'F1
            ON KEY(11) GOSUB KeyUp: ON KEY(15) GOSUB KeyUp      'up
            ON KEY(12) GOSUB KeyLeft: ON KEY(16) GOSUB KeyLeft  'left
            ON KEY(13) GOSUB KeyRight: ON KEY(17) GOSUB KeyRight 'right
50          ON KEY(14) GOSUB KeyDown: ON KEY(18) GOSUB KeyDown  'down
            KEY(1) ON
            KEY(11) ON: KEY(12) ON: KEY(13) ON: KEY(14) ON
            KEY(15) ON: KEY(16) ON: KEY(17) ON: KEY(18) ON 55      REM Print Screen
            COLOR 11, 0: LOCATE , , 0: CLS
```

25

```
        COLOR 11, 0: LOCATE 1, 22: PRINT "ACCESSplus - Automatic Meter Reading"
        COLOR 9, 0: LOCATE 3, 3: PRINT STRING$(74, 205)
        COLOR 14, 0: LOCATE 3, 25: PRINT " Set the System Date and Time "
        COLOR 11, 0: LOCATE 25, 3: PRINT DATE$; " "; TIME$;
 5
        COLOR 9, 0
        LOCATE 8, 18: PRINT CHR$(218); STRING$(42, 196); CHR$(191)
        FOR i = 9 TO 12: LOCATE i, 18: PRINT CHR$(179); SPACE$(42); CHR$(179): NEXT i
        LOCATE 13, 18: PRINT CHR$(192); STRING$(42, 196); CHR$(217);
10      COLOR 7, 9: LOCATE 8, 29: PRINT " System Date and Time "

COLOR 11, 0
        LOCATE 10, 31: PRINT screen$(1)
        LOCATE 11, 31: PRINT screen$(2)
15
        COLOR 7, 9
        LOCATE 13, 18: PRINT " Next Field=  ,          Main Menu=              ";
        COLOR 14, 9
        LOCATE 13, 30: PRINT CHR$(24); CHR$(25);
20      LOCATE 13, 33: PRINT "ENTER";
        LOCATE 13, 50: PRINT "ESC";

COLOR 3, 0
        ScreenData$(1) = DATE$
25      ScreenData$(2) = TIME$
        LOCATE 10, 38: PRINT ScreenData$(1)
        LOCATE 11, 38: PRINT ScreenData$(2)

COLOR 9, 0: GOSUB PrintMsgBox
30      IF comm2 = 0 THEN COLOR 20, 0: LOCATE 25, 1: PRINT CHR$(219);

'------------ Scan Lines and Wait for an Edit Request -----------'

TimeUpChain = TIMER + 2
35      DO
           DO
              FOR j1 = 1 TO 2
                 UpKey = 0: DownKey = 0: LeftKey = 0: RightKey = 0: F1 = 0
                 COLOR 0, 7: LOCATE j1 + 9, 38
40               PRINT ScreenData$(j1)

DO
                    DO
                       GOSUB WaitForKey
45                     IF n$ = "" THEN EXIT DO                                    'fuction or arrow keys
                       IF ASC(n$) = 27 OR ASC(n$) = 32 OR ASC(n$) = 13 THEN EXIT DO  'ESC,SPACE,CR
                       IF ASC(n$) > 47 AND ASC(n$) < 58 THEN EXIT DO              'numbers
                       SOUND 300, 2
                    LOOP
50
                    IF n$ = CHR$(27) THEN GOTO ProgramEnd
                    IF F1 = 1 OR DownKey = 1 THEN n$ = CHR$(13): EXIT DO
                    IF RightKey = 1 THEN n$ = MID$(ScreenData$(j1), 1, 1): EXIT DO
                    IF LeftKey = 0 THEN EXIT DO
55                  SOUND 100, 2
                 LOOP
```

26

```
              IF n$ <> CHR$(13) AND n$ <> "" THEN GOSUB EditMode
              IF ER <> 0 THEN
                 IF j1 = 1 THEN j1 = 2 ELSE j1 = 1
                 SOUND 300, 2
 5            END IF curser = 0
              IF n$ = CHR$(27) THEN
                 COLOR 3, 0: LOCATE j1 + 9, 38
10               IF j1 = 1 THEN PRINT DATE$ ELSE PRINT TIME$
                 GOSUB CheckData
                 IF ER = 0 THEN GOTO ProgramEnd
              END IF 15            COLOR 3, 0: LOCATE j1 + 9, 38
              PRINT ScreenData$(j1)
           NEXT j1
         LOOP
      LOOP
20
              '-------------- Edit Mode ------------'

EditMode:
        change$ = ""
25      C1$ = ScreenData$(j1)
        IF j1 = 1 THEN L = 10: t$ = "-"
        IF j1 = 2 THEN L = 8: t$ = ":"
        UpKey = 0: DownKey = 0: RightKey = 0: LeftKey = 0: F1 = 0

30      DO WHILE ASC(n$) <> 13 AND ASC(n$) <> 27
           IF (curser < L AND ((ASC(n$) > 47 AND ASC(n$) < 58) OR ASC(n$) = 32)) OR ASC(n$) = 8 OR ASC(n$
     = 27 THEN
              IF ASC(n$) = 8 THEN
                 IF curser = 0 THEN EXIT DO
35               curser = curser - 1
                 IF curser = 2 OR curser = 5 THEN
                    curser = curser - 1
                 END IF
                 MID$(C1$, curser + 1, 1) = " "
40               change$ = MID$(change$, 1, curser)
              ELSE
                 curser = curser + 1
                 change$ = change$ + n$
                 IF curser = 2 OR curser = 5 THEN
45                  curser = curser + 1
                    change$ = change$ + t$
                 END IF
              END IF
              C1$ = change$ + MID$(C1$, curser + 1, L - curser + 1)
50            IF L > LEN(C1$) THEN C1$ = C1$ + " "
              COLOR 0, 7: LOCATE j1 + 9, 38: PRINT C1$
           ELSE
              SOUND 300, 2
           END IF
55
           n$ = ""
           WHILE n$ = ""
```

27

```
       DO
          GOSUB WaitForKey
          IF n$ = "" THEN EXIT DO
          IF ASC(n$) = 27 OR ASC(n$) = 32 OR ASC(n$) = 13 THEN EXIT DO
 5        IF ASC(n$) > 47 AND ASC(n$) < 58 THEN EXIT DO
          IF ASC(n$) = 8 AND curser > 0 THEN EXIT DO
          SOUND 300, 2
       LOOP 10     IF n$ = CHR$(13) THEN EXIT DO
       IF n$ = CHR$(27) THEN EXIT DO
       IF UpKey = 1 THEN n$ = CHR$(8): EXIT DO            'same as backspace key
       IF DownKey = 1 THEN n$ = CHR$(13): EXIT DO         'same as carriage return
       IF RightKey = 1 OR LeftKey = 1 THEN
15        IF RightKey = 1 THEN
             IF curser < L THEN
                n$ = MID$(C1$, curser + 1, 1): RightKey = 0
             ELSE
                SOUND 100, 2: RightKey = 0
20           END IF
          END IF
          IF LeftKey = 1 THEN
             IF curser = 0 THEN
                SOUND 100, 2
25           ELSE
                curser = curser - 1: LeftKey = 0
                IF curser = 2 OR curser = 5 THEN curser = curser - 1
                IF curser > 0 THEN change$ = MID$(change$, 1, curser) ELSE change$ = ""
             END IF
30        END IF
       END IF
       COLOR 10, 7: LOCATE j1 + 9, curser + 38, 1, 7
    WEND
    LOOP
35  GOSUB CheckData
    IF ER = 0 THEN
       COLOR 9, 0: GOSUB PrintMsgBox
       IF TimeUpCom1 <> 0 OR TimeUpCom2 <> 0 THEN
          COLOR 14, 0: LOCATE 24, 23: PRINT "Processing call. Please wait.";
40        DO WHILE TimeUpCom1 <> 0 OR TimeUpCom2 <> 0
             GOSUB ReadCom
          LOOP
       END IF
       IF j1 = 1 THEN DATE$ = C1$ ELSE TIME$ = C1$
45  ELSE
       SOUND 300, 2
       COLOR 9, 0: GOSUB PrintMsgBox
       COLOR 14, 12
       FOR i = 1 TO ER
50        LOCATE 16 + i, 19: PRINT SPACE$(42)
          LOCATE 16 + i, 20: PRINT ErrMsg$(i)
       NEXT i
    END IF
    ScreenData$(j1) = C1$
55  RETURN '---------- Wait for Key Input ---------'
```

28

```
       WaitForKey:
          TimeUpReading = TIMER + 1200
          UpKey = 0: DownKey = 0: LeftKey = 0: RightKey = 0: n$ = "": F1 = 0
 5        DO
             GOSUB ReadCom IF TimeUpReading < TIMER THEN
                DO WHILE TimeUpCom1 <> 0 OR TimeUpCom2 <> 0
10                 GOSUB ReadCom
                LOOP
                CHAIN "amr01"
             END IF 15           n$ = INKEY$
             IF n$ <> "" THEN RETURN
             IF UpKey = 1 OR DownKey = 1 OR LeftKey = 1 OR RightKey = 1 THEN RETURN
             IF F1 = 1 THEN RETURN 20           COLOR 0, 7: LOCATE j1 + 9, curser + 38, 1, 7           'locate curser at 1st positio
       in field
             FOR i = 1 TO 50: NEXT i                                'delay so curser has time t
       display
          LOOP
25     RETURN '-------------- Check Data ----------------'

CheckData:
30        ER = 0
          d$ = C1$
          IF j1 = 1 THEN                                            'date
             REM look for blanks
             blanks = 0
35           FOR i = 1 TO 10
                IF MID$(d$, i, 1) = " " THEN blanks = 1
             NEXT i
             IF blanks = 1 THEN
                ER = ER + 1
40              ErrMsg$(ER) = "*Error in date. Fill in blanks with 0."
             END IF REM month
             M = VAL(MID$(d$, 1, 2))
45           IF M < 1 OR M > 12 THEN
                ER = ER + 1
                ErrMsg$(ER) = "*Error in month. Type (01-12)."
             END IF 50           REM day
             d = VAL(MID$(d$, 4, 2))
             IF d > 31 THEN
                ER = ER + 1
                ErrMsg$(ER) = "*Error in day. Type (01-31)."
55           END IF
             IF ER = 0 THEN
                max = DaysInMonth(M)                                'max days in month
```

29

```
            IF d < 1 OR d > max THEN
                ER = ER + 1
                max$ = LTRIM$(STR$(max))
                ErrMsg$(ER) = "*Error in day. Type (01-" + max$ + ")."
            END IF
        END IF REM year
            y1 = VAL(MID$(d$, 7, 4))                          'year entered
            y2 = VAL(MID$(DATE$, 7, 4))                       'current year
            IF (y1 > y2 + 1) OR (y1 < y2 - 1) THEN
                y1$ = LTRIM$(STR$(y2 - 1))
                y2$ = LTRIM$(STR$(y2 + 1))
                ER = ER + 1
                ErrMsg$(ER) = "*Error in year. Type (" + y1$ + " to " + y2$ + ")."
            END IF
        END IF IF j1 = 2 THEN
            REM look for blanks
                blanks = 0
                FOR i = 1 TO 10
                    IF MID$(d$, i, 1) = " " THEN blanks = 1
                NEXT i
                IF blanks = 1 THEN
                    ER = ER + 1
                    ErrMsg$(ER) = "*Error in time. Fill in blanks with 0."
                END IF REM hour
                h = VAL(MID$(d$, 1, 2))
                IF h > 23 THEN
                    ER = ER + 1
                    ErrMsg$(ER) = "*Error in hour. Type (00-23)."
                END IF REM minutes
                M = VAL(MID$(d$, 4, 2))
                IF M > 59 THEN
                    ER = ER + 1
                    ErrMsg$(ER) = "*Error in minutes. Type (00-59)."
                END IF REM second
                s = VAL(MID$(d$, 7, 2))
                IF s > 59 THEN
                    ER = ER + 1
                    ErrMsg$(ER) = "*Error in seconds. Type (00-59)."
                END IF
        END IF
    RETURN ReadCom:
        IF comm1 = 1 THEN
            IF TimeEndCom1 <> 0 AND TimeEndCom1 < TIMER THEN TimeEndCom1 = 0
            IF TimeUpCom1 <> 0 AND TimeUpCom1 < TIMER THEN
                ReadingError = 1: GOSUB UpdateFile1: TimeEndCom1 = 0
```

```
        END IF
        a$ = "": c$ = ""
        WHILE NOT EOF(1)
           a$ = INPUT$(LOC(1), #1)
           c$ = c$ + a$
        WEND
        IF c$ <> "" AND TimeEndCom1 = 0 THEN GOSUB ProcessCom1
     END IF IF comm2 = 1 THEN
        IF TimeEndCom2 <> 0 AND TimeEndCom2 < TIMER THEN TimeEndCom2 = 0
        IF TimeUpCom2 <> 0 AND TimeUpCom2 < TIMER THEN
           ReadingError = 1: GOSUB UpdateFile2: TimeEndCom2 = 0
        END IF
        a$ = "": c$ = ""
        WHILE NOT EOF(2)
           a$ = INPUT$(LOC(2), #2)
           c$ = c$ + a$
        WEND
        IF c$ <> "" AND TimeEndCom2 = 0 THEN GOSUB ProcessCom2
     END IF

COLOR 11, 0: LOCATE 25, 3, 0: PRINT DATE$; " "; TIME$;
  RETURN

'------------ Key Trapping Routines -----------'

KeyUp:
     UpKey = 1: RETURN
  KeyLeft:
     LeftKey = 1: RETURN
  KeyRight:
     RightKey = 1: RETURN
  KeyDown:
     DownKey = 1: RETURN
  KeyF1:
     F1 = 1: RETURN PrintMsgBox:
     LOCATE 16, 18: PRINT CHR$(218); STRING$(42, 196); CHR$(191)
     FOR i = 17 TO 19: LOCATE i, 18: PRINT CHR$(179); SPACE$(42); CHR$(179): NEXT i
     LOCATE 20, 18: PRINT CHR$(192); STRING$(42, 196); CHR$(217);
     COLOR 7, 9: LOCATE 16, 34: PRINT " Messages "
  RETURN ErrorRecovery:
     IF ERR = 57 THEN RESUME NEXT
     COLOR 12, 0: LOCATE 1, 1: PRINT "error ="; ERR
     STOP: RESUME NEXT
  END ProgramEnd:
     IF TimeUpChain > TIMER + 3 THEN TimeUpChain = 0
     DO WHILE TimeUpChain > TIMER
        GOSUB ReadCom
        IF TimeUpCom1 <> 0 OR TimeUpCom2 <> 0 THEN EXIT DO
     LOOP
```

```
         IF TimeUpCom1 <> 0 OR TimeUpCom2 <> 0 THEN
            COLOR 14, 0: LOCATE 24, 23: PRINT "Processing call. Please wait.";
            DO WHILE TimeUpCom1 <> 0 OR TimeUpCom2 <> 0
               GOSUB ReadCom
 5          LOOP
         END IF
         CHAIN "AMROO"
      END 10
      'Program Name:    AMROF.BAS
      'Programmer:      T. Saadeh
      'Program Function: Sort or List Accounts Report 15                   '----------- Initialize -----------'

'$INCLUDE: 'amrcoma'
      DIM FileField(38), screen$(34), CallFreq$(5), FileToScreen(34)
      DIM h(34), v(34), ScreenField(34), selection(20), errr$(5)
20    DIM screen1$(14), ScreenData$(14), Alarms$(7), FileData$(38), NewData$(38)
      DIM screen2$(34, 2), SelectedData$(14), L(100), R(100), menu$(2)
      DIM TOD#(4), PR#(3)

ON ERROR GOTO ErrorRecovery
25
                    '------ Define program variables ------'

DATA 25,25,25,10,11,20,20,2,10,10,8,2,2,2,1,10,8,3
      DATA 10,10,8,8,8,8,3,6,6,6,7,3,5,5,5,0,2,6,1,2
30    FOR i = 1 TO 38: READ FileField(i): NEXT i DATA 6,20,25,25,25,10,11,20,26,10,10,8,12,1,2,2,8,10
      DATA 9,10,8,10,8,8,10,8,8,8,8,8,8,6,6,6
      FOR i = 1 TO 34: READ ScreenField(i): NEXT i
35
      DATA "Daily    "
      DATA "Weekly   "
      DATA "Monthly  "
      DATA "Quarterly"
40    DATA "Hourly   "
      FOR i = 1 TO 5: READ CallFreq$(i): NEXT i errr$(1) = "  The maximum selection # is 34    "
      errr$(2) = " These won't all fit on the screen"
45    errr$(3) = "   You have duplicate selections   "
      errr$(4) = "   These won't all fit on a page   "
      errr$(5) = "   Type in some selection numbers  "

screen$(1) = " 1. Account #    "
50    screen$(2) = " 2. Billing #    "
      screen$(3) = " 3. Name         "
      screen$(4) = " 4. Address      "
      screen$(5) = " 5. City, State "
      screen$(6) = " 6. Zip Code     "
55    screen$(7) = " 7. Phone #      "
      screen$(8) = " 8. Mfg & Model "
      screen$(9) = " 9. Pulse/TC     "
```

32

```
           screen$(10) = "10. Serial #       "
           screen$(11) = "11. ACCESSplus Serial #"
           screen$(12) = "12. Battery Pack Code  "
           screen$(13) = "13. *Utility Phone #   "
 5         screen$(14) = "14. Call In Attempts   "
           screen$(15) = "15. Account Status     "
           screen$(16) = "16. *Call in Status    "
           screen$(17) = "17. *Alarms            "
           screen$(18) = "18. Meter Consumption  "
10         screen$(19) = "19. Frequency"
           screen$(20) = "20. Date       "
           screen$(21) = "21. Time       "
           screen$(22) = "22. Reading    "
           screen$(23) = "23. Date       "
15         screen$(24) = "24. Time       "
           screen$(25) = "25. Reading    "
           screen$(26) = "26. Date       "
           screen$(27) = "27. Time       "
           screen$(28) = "28. Period 1 "
20         screen$(29) = "29. Period 2 "
           screen$(30) = "30. Period 3 "
           screen$(31) = "31. Remaining"
           screen$(32) = "32. Period 1 "
           screen$(33) = "33. Period 2 "
25         screen$(34) = "34. Period 3 "

screen1$(1)  = " 1: [   ]"
           screen1$(2)  = " 2: [   ]"
           screen1$(3)  = " 3: [   ]"
30         screen1$(4)  = " 4: [   ]"
           screen1$(5)  = " 5: [   ]"
           screen1$(6)  = " 6: [   ]"
           screen1$(7)  = " 7: [   ]"
           screen1$(8)  = " 8: [   ]"
35         screen1$(9)  = " 9: [   ]"
           screen1$(10) = "10: [   ]"
           screen1$(11) = "11: [   ]"
           screen1$(12) = "12: [   ]"
           screen1$(13) = "13: [   ]"
40         screen1$(14) = "14: [   ]"

screen2$(1, 1) = "                  "
           screen2$(1, 2) = "Acct #"
           screen2$(2, 1) = "                  "
45         screen2$(2, 2) = "   Billing Number    "
           screen2$(3, 1) = "                  "
           screen2$(3, 2) = "    Customer Name    "
           screen2$(4, 1) = "                  "
           screen2$(4, 2) = "   Customer Address  "
50         screen2$(5, 1) = "                  "
           screen2$(5, 2) = "     City, State     "
           screen2$(6, 1) = "                  "
           screen2$(6, 2) = " Zip Code "
           screen2$(7, 1) = " Customer "
55         screen2$(7, 2) = " Phone # "
           screen2$(8, 1) = "     Meter        "
           screen2$(8, 2) = "    Mfg & Model   "
```

33

```
      screen2$(9, 1) = "    Meter Pulse/TC    "
      screen2$(9, 2) = "     Configuration    "
      screen2$(10, 1) = "   Meter   "
      screen2$(10, 2) = " Serial # "
 5    screen2$(11, 1) = "ACCESSplus"
      screen2$(11, 2) = " Serial # "
      screen2$(12, 1) = " Battery"
      screen2$(12, 2) = "   Code   "
      screen2$(13, 1) = "  Utility  "
10    screen2$(13, 2) = "  Phone #  "
      screen2$(14, 1) = "A"
      screen2$(14, 2) = "T"
      screen2$(15, 1) = "Ac"
      screen2$(15, 2) = "St"
15    screen2$(16, 1) = "Ca"
      screen2$(16, 2) = "St"
      screen2$(17, 1) = "          "
      screen2$(17, 2) = "  Alarms  "
      screen2$(18, 1) = "   Meter   "
20    screen2$(18, 2) = " Consumpt "
      screen2$(19, 1) = "   Call   "
      screen2$(19, 2) = "Frequency"
      screen2$(20, 1) = "   Call   "
      screen2$(20, 2) = " Back Dt  "
25    screen2$(21, 1) = "   Call   "
      screen2$(21, 2) = "Back Tm"
      screen2$(22, 1) = " Previous "
      screen2$(22, 2) = " Reading  "
      screen2$(23, 1) = "Date of "
30    screen2$(23, 2) = "Prev Rdg"
      screen2$(24, 1) = "Time of "
      screen2$(24, 2) = "Prev Rdg"
      screen2$(25, 1) = " Present  "
      screen2$(25, 2) = " Reading  "
35    screen2$(26, 1) = "Date of "
      screen2$(26, 2) = "Pres Rdg"
      screen2$(27, 1) = "Time of "
      screen2$(27, 2) = "Pres Rdg"
      screen2$(28, 1) = "  Usage  "
40    screen2$(28, 2) = "   # 1   "
      screen2$(29, 1) = "  Usage  "
      screen2$(29, 2) = "   # 2   "
      screen2$(30, 1) = "  Usage  "
      screen2$(30, 2) = "   # 3   "
45    screen2$(31, 1) = " Remaing"
      screen2$(31, 2) = "  Usage  "
      screen2$(32, 1) = "  Peak  "
      screen2$(32, 2) = "   # 1   "
      screen2$(33, 1) = "  Peak  "
50    screen2$(33, 2) = "   # 2   "
      screen2$(34, 1) = "  Peak  "
      screen2$(34, 2) = "   # 3   "

DATA 38,38,38,38,38,38,38,38,38,38,38,38,38,38,38,38,38
55    DATA 64,64,64,64,64,64,64,64,64,64,64,64,64,64,64,64
      FOR i = 1 TO 34: READ v(i): NEXT i
```

34

```
       DATA 3,4,5,6,7,8,9,11,12,13,15,16,17,18,19,20,21,22
       DATA 3,4,5,7,8,9,11,12,13,15,16,17,18,20,21,22
       FOR i = 1 TO 34: READ h(i): NEXT i

5      DATA 0,7,1,2,3,4,5,6,8,9,10,11,36,14,18,0,12,0,15,16,17
       DATA 19,21,23,20,22,24,26,27,28,29,31,32,33
       FOR i = 1 TO 34: READ FileToScreen(i): NEXT i REM Maximum Customer Accounts
10        OPEN "r", #3, "max.dat", 8
             FIELD #3, 8 AS ma$
             GET #3, 1
             MaxAcct = CVSMBF(ma$)
          CLOSE #3
15
       REM Number of Accounts
          OPEN "r", #3, "cntr.dat", 8
             FIELD #3, 8 AS cnt$
             GET #3, 1: counter = CVSMBF(cnt$)
20        CLOSE #3

REM read last saved data
          OPEN "list.dat" FOR RANDOM AS #3
             FIELD #3, 2 AS list$
25           FOR i = 1 TO 14
                GET #3, i
                ScreenData$(i) = list$
             NEXT i
          CLOSE #3
30
       REM Selections Menu
          menu$(1) = "1. Display Only       "
          menu$(2) = "2. Print and Display"

35     REM Define Arrow Keys
          KEY 15, CHR$(128) + CHR$(72)                           'up key
          KEY 16, CHR$(128) + CHR$(75)                           'left key
          KEY 17, CHR$(128) + CHR$(77)                           'right key
          KEY 18, CHR$(128) + CHR$(80)                           'down key
40        ON KEY(2) GOSUB KeyF2                                  'F2, F3
          ON KEY(3) GOSUB KeyF3
          ON KEY(11) GOSUB KeyUp: ON KEY(15) GOSUB KeyUp         'up key
          ON KEY(12) GOSUB KeyLeft: ON KEY(16) GOSUB KeyLeft     'left key
          ON KEY(13) GOSUB KeyRight: ON KEY(17) GOSUB KeyRight   'right key
45        ON KEY(14) GOSUB KeyDown: ON KEY(18) GOSUB KeyDown     'down key
          KEY(2) ON: KEY(3) ON
          KEY(11) ON: KEY(12) ON: KEY(13) ON: KEY(14) ON
          KEY(15) ON: KEY(16) ON: KEY(17) ON: KEY(18) ON 50     REM Print Screen
          GOSUB PrintScreen COLOR 9, 0
          LOCATE 11, 25: PRINT CHR$(213); STRING$(30, 205); CHR$(184)
55        FOR i = 12 TO 17
             LOCATE i, 25: PRINT CHR$(179); SPACE$(30); CHR$(179)
          NEXT i
```

35

```
         LOCATE 18, 25: PRINT CHR$(212); STRING$(30, 205); CHR$(190)
         IF comm2 = 0 THEN COLOR 20, 0: LOCATE 25, 1: PRINT CHR$(219);

COLOR 15, 0: LOCATE 13, 27: PRINT "Select one of these options."
 5       COLOR 11, 0
         LOCATE 15, 30: PRINT menu$(1)
         LOCATE 16, 30: PRINT menu$(2)

COLOR 7, 9: LOCATE 25, 39: PRINT " Select=         Scroll=   ";
10       COLOR 14, 9: LOCATE 25, 47: PRINT "ENTER";
         LOCATE 25, 61: PRINT CHR$(24); CHR$(25);
         IF comm2 = 0 THEN COLOR 20, 0: LOCATE 25, 1: PRINT CHR$(219);

15              '---------------- Select Menu Function --------------'

TimeUpChain = TIMER + 2
         DO
            FOR j1 = 1 TO 2
20             UpKey = 0: F1 = 0: DownKey = 0
               COLOR 0, 3: LOCATE j1 + 14, 30
               PRINT menu$(j1);

menu = 1: GOSUB WaitForKey: menu = 0               'wait for key input
25             IF n$ = CHR$(27) THEN GOTO ProgramEnd
               IF n$ = CHR$(13) THEN EXIT DO COLOR 11, 0: LOCATE j1 + 14, 30
               PRINT menu$(j1);
30             IF n$ = "1" THEN j1 = 2
               IF n$ = "2" THEN j1 = 1
            NEXT j1
         LOOP
         CLS
35       IF j1 = 1 THEN MaxLength = 78 ELSE MaxLength = 132
         IF j1 = 1 THEN mmode$ = " Display " ELSE mmode$ = "  Print  "
         COLOR 0, 7: LOCATE 25, 22: PRINT mmode$;
         IF comm2 = 0 THEN COLOR 20, 0: LOCATE 25, 1: PRINT CHR$(219);

40              '-------------- Select Account Information ---------------'

COLOR 11, 0: LOCATE 1, 1: PRINT "ACCESSplus - Automatic Meter Reading"
         COLOR 14, 0: LOCATE 2, 5: PRINT "Sort or List Accounts Report"

45       COLOR 9, 0: LOCATE 1, 37: PRINT CHR$(218); STRING$(42, 196); CHR$(191)
         FOR i = 2 TO 23: LOCATE i, 37: PRINT CHR$(179); SPACE$(42); CHR$(179): NEXT i
         LOCATE 24, 37: PRINT CHR$(192); STRING$(42, 196); CHR$(217);
         COLOR 7, 9: LOCATE 1, 54: PRINT " Selections "

50       FOR i = 1 TO 34
            COLOR 11, 0: LOCATE h(i), v(i): PRINT screen$(i);
            IF i < 19 THEN LOCATE h(i), 60 ELSE LOCATE h(i), 78
            COLOR 7, 0: PRINT USING "##"; ScreenField(i);
         NEXT i
55
         COLOR 15, 0
         LOCATE 2, 38: PRINT "        Customer         "
```

36

```
        LOCATE 10, 38: PRINT "        Meter          "
        LOCATE 14, 38: PRINT "   ACCESSplus Module "
        LOCATE 2, 64: PRINT "   Call-Back  "
        LOCATE 6, 64: PRINT "Previous Reading"
5       LOCATE 10, 64: PRINT "Present Reading"
        LOCATE 14, 64: PRINT "  Time-of-Day  "
        LOCATE 19, 64: PRINT "  Peak-Rates "

COLOR 3, 0
10      LOCATE 23, 50: PRINT " * listed only    "

COLOR 9, 0
        LOCATE 3, 1: PRINT CHR$(218); STRING$(34, 196); CHR$(191)
        FOR i = 4 TO 9: LOCATE i, 1: PRINT CHR$(179); SPACE$(34); CHR$(179): NEXT i
15      LOCATE 10, 1: PRINT CHR$(192); STRING$(34, 196); CHR$(217)
        COLOR 7, 9: LOCATE 3, 12: PRINT " Instructions "

COLOR 7, 0
        LOCATE 4, 2: PRINT "- Make your selections from the  "
20      LOCATE 5, 2: PRINT "  list on the right by typing the"
        LOCATE 6, 2: PRINT "  selection # in the box below.  "
        LOCATE 7, 2: PRINT "- You can keep selecting until   "
        LOCATE 8, 2: PRINT "  the total length reaches"; STR$(MaxLength); "."
        LOCATE 9, 2: PRINT "- Press F2 or F3 to start report."
25
        COLOR 9, 0
        LOCATE 11, 1: PRINT CHR$(218); STRING$(34, 196); CHR$(191)
        FOR i = 12 TO 19: LOCATE i, 1: PRINT CHR$(179); SPACE$(34); CHR$(179): NEXT i
        COLOR 7, 9: LOCATE 11, 9: PRINT " Selection Numbers "
30      COLOR 7, 9
        LOCATE 19, 1: PRINT " Next Line=...,ENTER   Start List=F3 "
        LOCATE 20, 1: PRINT " Start Sort=F2          Main Menu=ESC "
        COLOR 14, 9
        LOCATE 19, 12: PRINT CHR$(24); CHR$(25);
35      LOCATE 19, 15: PRINT "ENTER"
        LOCATE 19, 33: PRINT "F3"
        LOCATE 20, 13: PRINT "F2"
        LOCATE 20, 32: PRINT "ESC"

40      GOSUB CalculateTotal
        COLOR 14, 0: LOCATE 21, 10: PRINT "Total Length = "
        COLOR 0, 3: LOCATE 21, 24: PRINT USING "###"; eTotal COLOR 9, 0
45      LOCATE 22, 1: PRINT CHR$(218); STRING$(34, 196); CHR$(191)
        LOCATE 23, 1: PRINT CHR$(179); SPACE$(34); CHR$(179)
        LOCATE 24, 1: PRINT CHR$(192); STRING$(34, 196); CHR$(217);
        COLOR 7, 9: LOCATE 22, 14: PRINT " Messages "

50      COLOR 11, 0
        FOR i = 1 TO 14
            IF i < 8 THEN LOCATE 11 + i, 3 ELSE LOCATE 4 + i, 20
            PRINT screen1$(i)
        NEXT i
55
        '------------- Enter Selection Number ------------'
```

37

```
          FOR i = 1 TO 7
             COLOR 3, 0: LOCATE 11 + i, 8: PRINT ScreenData$(i)
             x = ScreenField(VAL(ScreenData$(i)))
             IF x <> 0 THEN COLOR 7, 0: LOCATE 11 + i, 12: PRINT USING "##"; x
 5        NEXT i
          FOR i = 8 TO 14
             COLOR 3, 0: LOCATE 4 + i, 25: PRINT ScreenData$(i)
             x = ScreenField(VAL(ScreenData$(i)))
             IF x <> 0 THEN COLOR 7, 0: LOCATE 4 + i, 29: PRINT USING "##"; x
10        NEXT i
          COLOR 0, 3: LOCATE 21, 24: PRINT USING "###"; eTotal HORIZONTAL = 12: VERTICAL = 8
          v = VERTICAL: h = HORIZONTAL
15        COLOR 0, 7: LOCATE h, v: PRINT ScreenData$(1)
          KEY(12) ON: KEY(13) ON: KEY(16) ON: KEY(17) ON
          DO
             n$ = ""
             DO
20             n$ = ""
               WHILE n$ = ""
                  selectt = 1: GOSUB WaitForKey: selectt = 0
                  IF UpKey = 1 OR DownKey = 1 OR F2 = 1 OR F3 = 1 THEN EXIT DO
                  IF n$ = CHR$(27) THEN EXIT DO
25                IF n$ = CHR$(13) THEN EXIT DO
                  IF n$ = CHR$(8) OR LeftKey = 1 THEN
                     IF v > VERTICAL THEN EXIT DO
                  END IF
                  IF RightKey = 1 AND v <= VERTICAL + 1 THEN EXIT DO
30                IF n$ <> "" THEN
                     IF (ASC(n$) > 47 AND ASC(n$) < 58) OR ASC(n$) = 32 THEN
                        IF v < VERTICAL + 2 THEN EXIT DO
                     END IF
                  END IF
35                SOUND 300, 2
               WEND
             LOOP IF n$ = CHR$(27) THEN GOTO ProgramEnd
40
             IF F2 = 1 OR F3 = 1 THEN
                COLOR 3, 0: LOCATE h, VERTICAL: PRINT ScreenData$(sub1)
                LOCATE 23, 2: PRINT SPACE$(34);
                GOSUB CheckData
45              IF errr1 = 0 THEN
                   IF F2 = 1 THEN GOSUB SortAccounts
                   GOSUB WriteReport
                   GOTO ProgramEnd
                ELSE
50                 SOUND 300, 2
                   COLOR 14, 12: LOCATE 23, 2: PRINT errr$(errr1);
                END IF
                F2 = 0: F3 = 0
             END IF
55
             sub1 = h - HORIZONTAL + 1
             IF VERTICAL = 25 THEN sub1 = sub1 + 7
```

```
          IF n$ <> CHR$(13) AND n$ <> CHR$(8) AND n$ <> "" THEN
            IF v = VERTICAL THEN ScreenData$(sub1) = n$ + MID$(ScreenData$(sub1), 2, 1)
            IF v = VERTICAL + 1 THEN ScreenData$(sub1) = MID$(ScreenData$(sub1), 1, 1) + n$
          END IF IF VAL(ScreenData$(sub1)) > 34 AND (UpKey = 1 OR DownKey = 1 OR n$ = CHR$(13)) THEN
            SOUND 300, 2
            COLOR 14, 12: LOCATE 23, 2: PRINT errr$(1);
          ELSE
            IF UpKey = 1 OR DownKey = 1 OR n$ = CHR$(13) THEN
              COLOR 3, 0: LOCATE h, VERTICAL: PRINT ScreenData$(sub1)
              LOCATE 23, 2: PRINT SPACE$(34);
              IF VAL(ScreenData$(sub1)) > 0 AND VAL(ScreenData$(sub1)) < 35 THEN
                COLOR 7, 0: LOCATE h, VERTICAL + 4: PRINT USING "##"; ScreenField(VAL(ScreenData$(sub1)))
              ELSE
                LOCATE h, VERTICAL + 4: PRINT "    "
              END IF
              GOSUB CalculateTotal
            END IF
            IF n$ = CHR$(13) OR DownKey = 1 THEN h = h + 1: v = VERTICAL
            IF n$ = CHR$(8) OR LeftKey = 1 THEN v = v - 1
            IF UpKey = 1 THEN h = h - 1
            IF RightKey = 1 THEN v = v + 1
            IF n$ <> "" AND n$ <> CHR$(13) AND n$ <> CHR$(8) THEN v = v + 1

IF VERTICAL = 8 THEN
              IF h < HORIZONTAL THEN h = 18: VERTICAL = 25: v = VERTICAL
              IF h > 18 THEN h = HORIZONTAL: VERTICAL = 25: v = VERTICAL
            ELSE
              IF h < HORIZONTAL THEN h = 18: VERTICAL = 8: v = VERTICAL
              IF h > 18 THEN h = HORIZONTAL: VERTICAL = 8: v = VERTICAL
            END IF sub1 = h - HORIZONTAL + 1
            IF VERTICAL = 25 THEN sub1 = sub1 + 7
            COLOR 0, 7: LOCATE h, VERTICAL: PRINT ScreenData$(sub1)
          END IF
        LOOP CalculateTotal:
        eTotal = 0: eFields = 0: Alarms = 0: CallStat = 0
        FOR i = 1 TO 14
          selection = VAL(ScreenData$(i))
          IF selection = 17 THEN Alarms = 1
          IF selection = 16 THEN CallStat = 1
          IF selection > 0 AND selection < 35 THEN
            eTotal = eTotal + ScreenField(selection)
            eFields = eFields + 1
          END IF
        NEXT i
        eTotal = eTotal + (eFields - 1)                          'account for spaces between fields
        IF eTotal < 0 THEN eTotal = 0
        COLOR 0, 3: LOCATE 21, 24: PRINT USING "###"; eTotal
RETURN '--------------- Check Data ----------------'
```

```
        CheckData:
          GOSUB CalculateTotal
          errr1 = 0
          IF eTotal > MaxLength THEN
 5           IF j1 = 1 THEN errr1 = 2 ELSE errr1 = 4
             RETURN
          END IF
          IF eTotal <= 0 THEN errr1 = 5: RETURN
          Margin1 = 78 - eTotal + 1                              'screen margin
10        IF Margin1 < 0 AND j1 = 1 THEN errr1 = 2: RETURN
          Margin1 = INT(Margin1 / 2)
          IF Margin1 < 2 THEN Margin1 = 2
          Margin2 = INT((132 - eTotal + 1) / 2) + 1              'page margin
        RETURN
15
                  '-------------- Start Sorting ---------------'

SortAccounts:
          COLOR 9, 0
20        LOCATE 19, 1: PRINT CHR$(192); STRING$(34, 196); CHR$(217)
          LOCATE 20, 1: PRINT SPACE$(36)
          COLOR 15, 7
          LOCATE 8, 20: PRINT CHR$(218); STRING$(42, 196); CHR$(191)
          FOR i = 9 TO 11
25            LOCATE i, 20: PRINT CHR$(179); SPACE$(42); CHR$(179)
          NEXT i
          LOCATE 12, 20: PRINT CHR$(192); STRING$(42, 196); CHR$(217)
          LOCATE 12, 37: PRINT " End=ESC "
          COLOR 7, 0: LOCATE 10, 36: PRINT " sorting"
30        COLOR 23, 0: LOCATE 10, 44: PRINT "... "

GOSUB OpenFile
          OPEN "r", #5, "index.dat", 8: FIELD #5, 8 AS ndx$
             OPEN "r", #6, "indexs.dat", 8: FIELD #6, 8 AS ndxs$
35           FOR i = 1 TO counter
                GET #5, i: accts = CVSMBF(ndx$)
                LSET ndxs$ = MKSMBF$(accts): PUT #6, i
             NEXT i
          CLOSE #5
40
          TimeToRead = TIMER + 3
          S1 = 1: S2 = 0
          L(1) = 1
          R(1) = counter
45        DO
             IF TimeToRead < TIMER THEN GOSUB ReadMeter
             L1 = L(S1)
             R1 = R(S1)
             S1 = S1 - 1
50           DO
                IF TimeToRead < TIMER THEN GOSUB ReadMeter
                L2 = L1
                R2 = R1
                GET #6, INT((L1 + R1) / 2): acct1 = CVSMBF(ndxs$)
55              IF acct1 = 0 THEN
                   SortString1$ = ""
                ELSE
```

```
                              acct = acct1: GOSUB ReadFile
                              GOSUB Format: SortString1$ = w$
                           END IF
                           DO
 5                            DO
                                 T1 = T1 + 1
                                 IF TimeToRead < TIMER THEN GOSUB ReadMeter
                                 GET #6, L2: acct2 = CVSMBF(ndxs$)
                                 IF acct2 = 0 THEN
10                                  SortString2$ = ""
                                 ELSE
                                    acct = acct2: GOSUB ReadFile
                                    GOSUB Format: SortString2$ = w$
                                 END IF
15                               IF SortString2$ >= SortString1$ THEN EXIT DO
                                 L2 = L2 + 1
                              LOOP
                              DO
                                 T1 = T1 + 1
20                               IF TimeToRead < TIMER THEN GOSUB ReadMeter
                                 GET #6, R2: acct3 = CVSMBF(ndxs$)
                                 IF acct3 = 0 THEN
                                    SortString3$ = ""
                                 ELSE
25                                  acct = acct3: GOSUB ReadFile
                                    GOSUB Format: SortString3$ = w$
                                 END IF
                                 IF SortString1$ >= SortString3$ THEN EXIT DO
                                 R2 = R2 - 1
30                            LOOP
                              IF L2 <= R2 THEN
                                 S2 = S2 + 1
                                 LSET ndxs$ = MKSMBF$(acct2): PUT #6, R2
                                 LSET ndxs$ = MKSMBF$(acct3): PUT #6, L2
35                               L2 = L2 + 1
                                 R2 = R2 - 1
                              END IF
                              IF L2 > R2 THEN EXIT DO
                           LOOP
40                         IF L2 < R1 THEN
                              S1 = S1 + 1
                              L(S1) = L2
                              R(S1) = R1
                           END IF
45                         R1 = R2
                           IF L1 >= R1 THEN EXIT DO
                        LOOP
                        IF S1 <= 0 THEN EXIT DO
                     LOOP
50                   CLOSE #3: CLOSE #4: CLOSE #6
                  RETURN WriteReport:
                     startline = 3
55                   GOSUB PrintScreen
                     COLOR 0, 7: LOCATE 25, 22: PRINT mmode$;
                     IF Alarms = 1 THEN
```

41

```
            COLOR 2, 0
            LOCATE 3, 4: PRINT "1 = Low Battery       4 = Unauthorized Usage    6 = Security Alarm   "
            LOCATE 4, 4: PRINT "2 = Lead Line Tamper   5 = Potential Leak        7 = Installation Error"
            LOCATE 5, 4: PRINT "3 = Meter Module Tamper                                                "
5           startline = 6
         END IF
         IF CallStat = 1 THEN
            COLOR 7, 0
            IF Alarms = 1 THEN LOCATE 6, 4 ELSE LOCATE 3, 4
10          PRINT "+ = On Schedule    R = On Retry   D = Delinquent   I = Installation Error"
            IF Alarms = 1 THEN startline = 8 ELSE startline = 4
         END IF
         COLOR 11, 0
         margin = Margin1
15       FOR i = 1 TO 14                                            '1st line of heading
            selection = VAL(ScreenData$(i))
            IF selection <> 0 AND margin + ScreenField(selection) + 1 < 80 THEN
               LOCATE startline, margin: PRINT screen2$(selection, 1)
               margin = margin + ScreenField(selection) + 1
20          END IF
         NEXT i
         margin = Margin1
         FOR i = 1 TO 14                                            '2nd line of heading
            selection = VAL(ScreenData$(i))
25          IF selection <> 0 AND margin + ScreenField(selection) + 1 < 80 THEN
               LOCATE startline + 1, margin: PRINT screen2$(selection, 2)
               margin = margin + ScreenField(selection) + 1
            END IF
         NEXT i
30       margin = Margin1
         FOR i = 1 TO 14                                            'underline
            selection = VAL(ScreenData$(i))
            IF selection <> 0 AND margin + ScreenField(selection) + 1 < 80 THEN
               LOCATE startline + 2, margin: PRINT STRING$(ScreenField(selection), 196)
35             margin = margin + ScreenField(selection) + 1
            END IF
         NEXT i IF F2 = 1 THEN file$ = "indexs.dat" ELSE file$ = "index.dat"
40       OPEN "r", #6, file$, 8
         FIELD #6, 8 AS ndxs$ ResumePrint1:

45       PageLength = 50
         IF j1 = 2 THEN
            GOSUB PrintHeading
            IF Alarms = 1 THEN PageLength = PageLength - 2
            IF CallStat = 1 THEN PageLength = PageLength - 4
50       END IF DO
            GOSUB OpenFile
            TimeToRead = TIMER + 3
55          lline = 0
            FOR j2 = 1 TO counter
               IF TimeToRead < TIMER THEN GOSUB ReadMeter
```

42

```
            GET #6, j2
            acct = CVSMBF(ndxs$)
            IF acct <> 0 THEN
                GOSUB ReadFile
5               IF errr = 0 THEN
                    GOSUB GetFileInfo
        ResumePrint:
                    lline = lline + 1
                    IF lline > (20 - startline) THEN
10                      IF j1 = 1 THEN
                            LOCATE lline + startline + 2, 30
                            COLOR 14, 0: PRINT "       ... more ...      ";
                            COLOR 7, 9: LOCATE 25, 52: PRINT " More=      ";
                            COLOR 14, 9: LOCATE 25, 58: PRINT "ENTER";
15                          CLOSE #3: CLOSE #4
                            more = 1: GOSUB WaitForKey: more = 0
                            IF n$ = CHR$(27) THEN EXIT DO
                            GOSUB OpenFile
                        END IF
20                      COLOR 3, 0: LOCATE 25, 51: PRINT SPACE$(13);
                        FOR i = startline + 3 TO 23: LOCATE i, 2: PRINT SPACE$(78); : NEXT i
                        lline = 1
                    END IF
                    GOSUB PrintToScreen
25                  IF j1 = 2 THEN
                        lline1 = lline1 + 1
                        IF lline1 > (PageLength - startline) THEN
                            lline1 = 0: GOSUB PrintHeading
                        END IF
30                      GOSUB PrintToPrinter
                    END IF
                    IF n$ = CHR$(27) THEN EXIT DO
                END IF
            END IF
35          NEXT j2
            LOCATE lline + startline + 3, 30: COLOR 14, 0: PRINT "..... End of Report ....."
            IF j1 = 1 THEN
                COLOR 7, 9: LOCATE 25, 52: PRINT " Again=     ";
                COLOR 14, 9: LOCATE 25, 59: PRINT "ENTER";
40          END IF
            IF j1 = 2 THEN
                WIDTH LPRINT 80: LPRINT CHR$(18);                       'cancel condensed
                LPRINT : LPRINT TAB(23); "    <<<<< End of Report >>>>>    "
                EXIT DO
45          END IF
            CLOSE #3: CLOSE #4
            more = 1: GOSUB WaitForKey: more = 0
            IF n$ = CHR$(27) THEN EXIT DO
            IF n$ = CHR$(13) THEN
50              COLOR 3, 0: LOCATE 25, 51: PRINT SPACE$(13);
                FOR i = startline + 3 TO 23: LOCATE i, 2: PRINT SPACE$(78); : NEXT i
            END IF
        LOOP
        CLOSE #6
55  RETURN ReadMeter:
```

43

```
              CLOSE #3: CLOSE #4
              GOSUB ReadCom
              DO WHILE TimeUpCom1 <> 0 OR TimeUpCom2 <> 0
                 GOSUB ReadCom
  5           LOOP
              n$ = INKEY$: IF n$ = CHR$(27) THEN GOTO ProgramEnd
              GOSUB OpenFile
              TimeToRead = TIMER + 3
           RETURN
 10
           WaitForKey:
              TimeUpReading = TIMER + 1200
              n$ = "": UpKey = 0: DownKey = 0: LeftKey = 0: RightKey = 0: F2 = 0: F3 = 0
              DO
 15              GOSUB ReadCom n$ = INKEY$
                 IF more = 1 AND n$ = CHR$(13) THEN RETURN
                 IF menu = 1 OR selectt = 1 THEN
 20                 IF n$ <> "" THEN RETURN
                    IF menu = 1 AND (UpKey = 1 OR DownKey = 1) THEN RETURN
                    IF selectt = 1 THEN
                       IF RightKey = 1 OR LeftKey = 1 THEN RETURN
                       IF UpKey = 1 OR DownKey = 1 OR F2 = 1 OR F3 = 1 THEN RETURN
 25                 END IF
                    IF F1 = 1 THEN RETURN
                 END IF IF PrintDelay = 1 AND TimeUpPrint < TIMER THEN RETURN
 30              IF TimeUpReading < TIMER THEN GOTO ProgramEnd            ' 20 minute timeout to meter readin
           mode
                 IF n$ = CHR$(27) THEN RETURN IF pprinter = 1 THEN
 35                 IF n$ = CHR$(27) THEN RETURN
                    IF n$ = CHR$(13) THEN
                       IF TimeUpCom1 <> 0 OR TimeUpCom2 <> 0 THEN         'wait till calls are done
                          COLOR 14, 0: LOCATE 25, 23                      '  processing before trying
                          PRINT "Processing Call - Please Wait"; n$ = ""  '  printer again
 40                    ELSE
                          RETURN
                       END IF
                    END IF
                 END IF
 45              IF selectt = 1 THEN LOCATE h, v, 1, 7: FOR i = 1 TO 50: NEXT i
              LOOP
           RETURN KeyUp:
 50           UpKey = 1: RETURN
           KeyLeft:
              LeftKey = 1: RETURN
           KeyRight:
              RightKey = 1: RETURN
 55        KeyDown:
              DownKey = 1: RETURN
           KeyF2:
```

```
            F2 = 1: RETURN
        KeyF3:
            F3 = 1: RETURN

5       OpenFile:
            REM open account index file
                OPEN "r", #3, "amrlndx.dat", 2
                FIELD #3, 2 AS filenum$ 10          REM open account data file
                OPEN "R", #4, "amrl.dat", 304                           'open account data base
                FIELD #4, 1 AS FL1$
                Z1 = 1: Z2 = 0
                FOR i = 1 TO 38
15                  Z = FileField(i)                                    'length of field
                    IF Z <> 0 THEN
                        FIELD #4, Z1 AS D$, Z2 AS D$, Z AS FileData$(i) 'D$ is a dummy field
                        IF Z1 + Z < 255 THEN Z1 = Z1 + Z ELSE Z2 = Z2 + Z
                    END IF
20              NEXT i
        RETURN ReadFile:
            errr = 0
25          REM get record number
                GET #3, acct
                FileNumber = CVI(filenum$)
                IF FileNumber = 0 THEN errr = 2: RETURN 30          REM get record
                GET #4, FileNumber
                IF FL1$ <> "Y" THEN errr = 3: RETURN
                FOR i = 1 TO 38: NewData$(i) = FileData$(i): NEXT i
        RETURN
35
        Format:
            FOR i = 1 TO 14
                selection = VAL(ScreenData$(i))
                IF selection <> 0 THEN
40                  IF selection <> 1 AND selection <> 18 AND selection <> 16 THEN
                        SelectedData$(i) = NewData$(FileToScreen(selection))
                    END IF
                END IF
            NEXT i
45
            w$ = ""
            FOR i = 1 TO 14
                s$ = ""
                selection = VAL(ScreenData$(i))
50              IF selection <> 0 THEN
                    SELECT CASE selection
                        CASE 1                                          'account #
                            s$ = LTRIM$(STR$(acct))
                            IF LEN(s$) < 6 THEN s$ = STRING$(6 - LEN(s$), "0") + s$
55                          w$ = w$ + s$
                        CASE 13                                         'utility phone #
                            'phone$ = ""
```

```
                    'UPhone$ = SelectedData$(i)
                    'FOR j = 1 TO 6
                    '    X1$ = HEX$(ASC(MID$(UPhone$, j, 1)))
                    '    IF LEN(X1$) = 1 THEN X1$ = "0" + X1$
                    '    phone$ = phone$ + X1$
                    'NEXT j
                    'Y = 0                       '1st non zero digit indicator
                    'FOR j = 1 TO 12
                    '    IF Y = 0 AND VAL(MID$(phone$, j, 1)) <> 0 THEN
                    '        phone$ = MID$(phone$, i, LEN(phone$))
                    '        Y = 1
                    '    END IF
                    'NEXT j
                    'IF LEN(phone$) < 11 THEN phone$ = phone$ + SPACE$(11 - LEN(phone$))
                    'SelectedData$(i) = phone$
                    'IF VAL(SelectedData$(i)) = 0 THEN SelectedData$(i) = SPACE$(12)
                    'w$ = w$ + SelectedData$(i)
                CASE 16                                          'call in status
                   'GOSUB CallinStatus
                   'w$ = w$ + s$
                CASE 17                                          'alarms
                   'GOSUB ProcessAlarms
                   's$ = NewData$(12)
                   'IF LEN(s$) < 8 THEN s$ = s$ + STRING$(8 - LEN(s$), " ")
                   'w$ = w$ + s$
                CASE 18                                          'consumption
                    s = CVDMBF(NewData$(20)) - CVDMBF(NewData$(19))
                    IF s < .001 THEN s = 0
                    s$ = LTRIM$(STR$(INT(s)))
                    IF LEN(s$) < 10 THEN s$ = STRING$(10 - LEN(s$), "0") + s$
                    w$ = w$ + s$
                CASE 20                                          'call back date
                    w$  =  w$  +  MID$(SelectedData$(i),  7,  4)  +  MID$(SelectedData$(i),  1,  2)
    MID$(SelectedData$(i), 4, 2)
                CASE 23, 26                                      'other dates
                    w$  =  w$  +  MID$(SelectedData$(i),  7,  2)  +  MID$(SelectedData$(i),  1,  2)
    MID$(SelectedData$(i), 4, 2)
                CASE 22, 25, 28, 29, 30, 31, 32, 33, 34          'readings
                    s$ = LTRIM$(STR$(INT(CVSMBF(SelectedData$(i)))))
                    IF LEN(s$) < ScreenField(selection) THEN s$ = STRING$(ScreenField(selection) - LEN(s$)
    "0") + s$
                    w$ = w$ + s$
                CASE ELSE
                    w$ = w$ + SelectedData$(i)
            END SELECT
        END IF
    NEXT i
RETURN GetFileInfo:
    REM Test Circle configuration
        tcl = VAL(NewData$(8))                                   'file record number
        OPEN "r", #5, "tc.dat"
        FIELD #5, 25 AS tc$, 4 AS tcMult$
        IF tcl = 0 THEN tcl = 2                                  'default 1 to 1
        GET #5, tcl                                              'get record
        NewData$(8) = tc$                                        'description
```

46

```
            Multiplier = CVSMBF(tcMult$)                    'meter reading multiplier
            CLOSE #5

PrintUsing1$ = "#########"
 5          PrintUsing2$ = "#######"
            PrintUsing3$ = "####.#"
            L = INSTR(STR$(Multiplier), ".")
            IF L <> 0 THEN
              length = LEN(STR$(Multiplier)) - 2
10            SELECT CASE length
              CASE 1
                 PrintUsing1$ = "########.#"
                 PrintUsing2$ = "######.#"
                 PrintUsing3$ = "###.##"
15            CASE 2
                 PrintUsing1$ = "#######.##"
                 PrintUsing2$ = "#####.##"
                 PrintUsing3$ = "##.###"
              CASE 3
20               PrintUsing1$ = "######.###"
                 PrintUsing2$ = "####.###"
                 PrintUsing3$ = "#.####"
              END SELECT
            END IF
25
         REM Call in frequency
            cf1 = VAL(NewData$(15))
            NewData$(15) = CallFreq$(cf1)

30       REM Utility phone number
            phone$ = ""
            UPhone$ = NewData$(36)
            IF UPhone$ <> "" AND UPhone$ <> SPACE$(6) THEN
              FOR i = 1 TO 6
35              X1$ = HEX$(ASC(MID$(UPhone$, i, 1)))
                IF LEN(X1$) = 1 THEN X1$ = "0" + X1$
                phone$ = phone$ + X1$
              NEXT i
            END IF
40          Y = 0                          '1st non zero digit indicator
            FOR i = 1 TO 12
              IF Y = 0 AND VAL(MID$(phone$, i, 1)) <> 0 THEN
                 phone$ = MID$(phone$, i, LEN(phone$))
                 Y = 1
45            END IF
            NEXT i
            IF LEN(phone$) < 11 THEN phone$ = phone$ + SPACE$(11 - LEN(phone$))
            NewData$(36) = phone$
            IF VAL(NewData$(36)) = 0 THEN NewData$(36) = SPACE$(12)
50
         REM Alarms
            GOSUB ProcessAlarms REM Call in status
55          GOSUB CallinStatus REM Meter Readings
```

47

```
            PREV# = CVDMBF(NewData$(19))
            TOTL# = CVDMBF(NewData$(20))
            TOD#(1) = CVSMBF(NewData$(26))
            TOD#(2) = CVSMBF(NewData$(27))
 5          TOD#(3) = CVSMBF(NewData$(28))
            TOD#(4) = CVSMBF(NewData$(29))
            PR#(1) = CVSMBF(NewData$(31))
            PR#(2) = CVSMBF(NewData$(32))
            PR#(3) = CVSMBF(NewData$(33))
10          consumption = TOTL# - PREV#
            IF consumption < 0 THEN consumption = 0

REM Assign selected file data to array for displaying
            FOR i = 1 TO 14
15             selection = VAL(ScreenData$(i))
               IF selection <> 0 THEN
                  IF selection <> 1 AND selection <> 16 AND selection <> 18 THEN
                     SelectedData$(i) = NewData$(FileToScreen(selection))
                  END IF
20             END IF
            NEXT i
        RETURN ProcessAlarms:
25         AL = 0
           AlarmsValue = ASC(NewData$(12))
           IF (AlarmsValue AND 2 ^ 4) <> 0 THEN AL = AL + 1: Alarms$(AL) = "1"
           IF (AlarmsValue AND 2 ^ 3) <> 0 THEN AL = AL + 1: Alarms$(AL) = "2"
           IF (AlarmsValue AND 2 ^ 2) <> 0 THEN AL = AL + 1: Alarms$(AL) = "3"
30         IF (AlarmsValue AND 2 ^ 6) <> 0 THEN AL = AL + 1: Alarms$(AL) = "4"
           IF (AlarmsValue AND 2 ^ 5) <> 0 THEN AL = AL + 1: Alarms$(AL) = "5"
           IF (AlarmsValue AND 2 ^ 7) <> 0 THEN AL = AL + 1: Alarms$(AL) = "6"
           IF (AlarmsValue AND 2 ^ 1) <> 0 THEN AL = AL + 1: Alarms$(AL) = "7"
           NewData$(12) = ""
35         FOR j = 1 TO AL
              NewData$(12) = NewData$(12) + Alarms$(j) + " "
           NEXT j
           NewData$(12) = RTRIM$(NewData$(12))
        RETURN
40
        '$INCLUDE: 'callsta'

PrintToPrinter:
           tabb = Margin2
45         FOR i = 1 TO 14
              LPRINT TAB(tabb);
              selection = VAL(ScreenData$(i))
              IF selection <> 0 THEN
                 SELECT CASE selection
50                  CASE 1                                              'account number
                       LPRINT USING "###### "; acct;
                    CASE 16
                       LPRINT " "; s$;
                    CASE 17                                             'alarms
55                     LPRINT NewData$(12);
                    CASE 18                                             'consumption
                       LPRINT USING PrintUsing1$; consumption;
```

48

```
                CASE 22                                             'previous reading
                    LPRINT USING PrintUsing1$; PREV#;
                CASE 25                                             'present reading
                    LPRINT USING PrintUsing1$; TOTL#;
 5              CASE 28, 29, 30, 31                                 'time of day readings
                    LPRINT USING PrintUsing2$; CVSMBF(NewData$(FileToScreen(selection)));
                CASE 32, 33, 34                                     'peak rate readings
                    LPRINT USING PrintUsing3$; CVSMBF(NewData$(FileToScreen(selection)));
                CASE ELSE
10                  LPRINT SelectedData$(i);
                END SELECT
                tabb = tabb + ScreenField(selection) + 1
            END IF
        NEXT i
15  RETURN PrintToScreen:
        clr = 3
        margin = Margin1
20      FOR i = 1 TO 14
            LOCATE lline + startline + 2, margin
            selection = VAL(ScreenData$(i))
            IF selection <> 0 AND margin + ScreenField(selection) + 1 < 80 THEN
                COLOR clr, 0
25              SELECT CASE selection
                    CASE 1                                          'account number
                        PRINT USING "###### "; acct;
                    CASE 16
                        PRINT s$
30                  CASE 17                                         'alarms
                        PRINT NewData$(12)
                    CASE 18                                         'consumption
                        PRINT USING PrintUsing1$; consumption;
                    CASE 22                                         'previous reading
35                      PRINT USING PrintUsing1$; PREV#;
                    CASE 25                                         'present reading
                        PRINT USING PrintUsing1$; TOTL#;
                    CASE 28, 29, 30, 31                             'time of day readings
                        PRINT USING PrintUsing2$; CVSMBF(NewData$(FileToScreen(selection)));
40                  CASE 32, 33, 34                                 'peak rate readings
                        PRINT USING PrintUsing3$; CVSMBF(NewData$(FileToScreen(selection)));
                    CASE ELSE
                        PRINT SelectedData$(i);
                END SELECT
45              margin = margin + ScreenField(selection) + 1
                IF clr = 3 THEN clr = 7 ELSE clr = 3
            END IF
        NEXT i
    RETURN
50
    PrintHeading:
        page = page + 1
        WIDTH LPRINT 80
        LPRINT CHR$(18); CHR$(12);                                  'cancel condensed, form feed
55      LPRINT TAB(21); "ACCESSplus - Automatic Meter Reading"; TAB(72); "Page"; STR$(page)
        LPRINT TAB(21); "      Copyright 1989 Badger Meter, Inc.  ";
        LPRINT TAB(21); "         Utility Products Division       ";
```

49

```
        LPRINT TAB(29); DATE$; " "; TIME$
        LPRINT
        LPRINT TAB(21); "**  Sort or List Accounts Report  **";
        LPRINT STRING$(79, 240): LPRINT
 5
        IF Alarms = 1 THEN
            LPRINT TAB(4); "1 = Low Battery        4 = Unauthorized Usage   6 = Security Alarm    "
            LPRINT TAB(4); "2 = Lead Line Tamper   5 = Potential Leak       7 = Installation Error"
            LPRINT TAB(4); "3 = Meter Module Tamper"
10      END IF
        IF CallStat = 1 THEN
            LPRINT : LPRINT TAB(4); "+ = On Schedule    R = On Retry    D = Delinquent   I = Installatio
        Error"
        END IF
15      IF Alarms = 1 OR CallStat = 1 THEN LPRINT STRING$(79, 240): LPRINT WIDTH LPRINT 133: LPRINT CHR$(15)
        tabb = Margin2: first = 0
        FOR i = 1 TO 14                          '1st line of heading
20          selection = VAL(ScreenData$(i))
            IF selection <> 0 THEN
              LPRINT TAB(tabb);
              LPRINT screen2$(selection, 1);
              tabb = tabb + ScreenField(selection) + 1
25            IF tabb < 132 THEN LPRINT " ";
            END IF
        NEXT i
        tabb = Margin2: first = 0
        FOR i = 1 TO 14                          '2nd line of heading
30          selection = VAL(ScreenData$(i))
            IF selection <> 0 THEN
              LPRINT TAB(tabb);
              LPRINT screen2$(selection, 2);
              tabb = tabb + ScreenField(selection) + 1
35            IF tabb < 132 THEN LPRINT " ";
            END IF
        NEXT i
        tabb = Margin2
        FOR i = 1 TO 14                          'underline
40          selection = VAL(ScreenData$(i))
            IF selection <> 0 THEN
              LPRINT TAB(tabb);
              LPRINT STRING$(ScreenField(selection), 196);
              tabb = tabb + ScreenField(selection) + 1
45            IF tabb < 132 THEN LPRINT " ";
            END IF
        NEXT i
        RETURN 50      PrintScreen:
            COLOR 11, 0: WIDTH 80: CLS
            COLOR 11, 0: LOCATE 1, 2: PRINT " ACCESSplus - Automatic Meter Reading "
            COLOR 14, 0: LOCATE 1, 48: PRINT " Sort or List Accounts Report "

55          COLOR 9, 0
            LOCATE 2, 1: PRINT CHR$(218); STRING$(78, 196); CHR$(191)
            FOR i = 3 TO 23: LOCATE i, 1: PRINT CHR$(179); SPACE$(78); CHR$(179); : NEXT i
```

50

```
         LOCATE 24, 1: PRINT CHR$(192); STRING$(78, 196); CHR$(217);
         COLOR 11, 0: LOCATE 25, 2: PRINT DATE$; " "; TIME$;
         COLOR 7, 9: LOCATE 25, 64: PRINT " Main Menu=     ";
         COLOR 14, 9: LOCATE 25, 75: PRINT "ESC";
5        IF comm2 = 0 THEN COLOR 20, 0: LOCATE 25, 1: PRINT CHR$(219);
      RETURN delay:
         ON TIMER(sec) GOSUB TimeUp
10       TimeUp = 0: TIMER ON
         GOSUB WaitForKey
      RETURN TimeUp:
15       TIMER OFF: TimeUp = 1
      RETURN ErrorRecovery:
         IF ERR = 57 THEN RESUME NEXT
20       ERRnum = ERR
         IF ERR = 24 OR ERR = 25 OR ERR = 27 OR ERR = 68 THEN RESUME PrinterDeviceErrors
         COLOR 12, 0: LOCATE 1, 1: PRINT "error ="; ERR: STOP: RESUME NEXT
      SYSTEM 25    PrinterDeviceErrors:
         CLOSE #3: GOSUB PrintErrBox
         IF ERRnum = 24 OR ERRnum = 25 THEN
            COLOR 15, 12: LOCATE 9, 11: PRINT "                    "; DATE$; " "; TIME$; "
            "
30          COLOR 15, 12: LOCATE 10, 11: PRINT "
            "
            COLOR 31, 12: LOCATE 11, 11: PRINT "              The printer is not ready.
            "
            COLOR 15, 12: LOCATE 12, 11: PRINT "     Press ENTER to resume printing or ESC to end.
35          "
         END IF IF ERRnum = 27 THEN
            COLOR 15, 12: LOCATE 9, 11: PRINT "                    "; DATE$; " "; TIME$; "
40          "
            COLOR 15, 12: LOCATE 10, 11: PRINT "
            "
            COLOR 31, 12: LOCATE 11, 11: PRINT "              The printer is out of paper.
            "
45          COLOR 15, 12: LOCATE 12, 11: PRINT "     Press ENTER to resume printing or ESC to end.
            "
         END IF IF ERRnum = 68 THEN
50          COLOR 15, 12: LOCATE 9, 11: PRINT "                    "; DATE$; " "; TIME$; "
            "
            COLOR 15, 12: LOCATE 10, 11: PRINT "
            "
            COLOR 31, 12: LOCATE 11, 11: PRINT "   The printer is either off or not connected properly.
55          "
            COLOR 15, 12: LOCATE 12, 11: PRINT "     Press ENTER to resume printing or ESC to end.
            "
```

51

```
        END IF

TimeUp1 = TIMER + 120
        SOUND 200, 5: SOUND 400, 2: SOUND 200, 5
 5      pprinter = 1: GOSUB WaitForKey: pprinter = 0
        IF n$ = CHR$(27) THEN GOTO ProgramEnd
        FOR i = 3 TO 23: LOCATE i, 4: PRINT SPACE$(74); : NEXT i
        TimeUp1 = 0: GOTO ResumePrint 10   PrintErrBox:
        COLOR 15, 12
        LOCATE 8, 10: PRINT CHR$(213); STRING$(59, 205); CHR$(184)
        FOR i = 9 TO 12
           LOCATE i, 10: PRINT CHR$(179); SPACE$(59); CHR$(179)
15      NEXT i
        LOCATE 13, 10: PRINT CHR$(212); STRING$(59, 205); CHR$(190)
     RETURN ReadCom:
20      IF comm1 = 1 THEN
           IF TimeEndCom1 <> 0 AND TimeEndCom1 < TIMER THEN TimeEndCom1 = 0
           IF TimeUpCom1 <> 0 AND TimeUpCom1 < TIMER THEN
              ReadingError = 1: GOSUB UpdateFile1: TimeEndCom1 = 0
           END IF
25         a$ = "": c$ = ""
           WHILE NOT EOF(1)
              a$ = INPUT$(LOC(1), #1)
              c$ = c$ + a$
           WEND
30         IF c$ <> "" AND TimeEndCom1 = 0 THEN GOSUB ProcessCom1
        END IF IF comm2 = 1 THEN
           IF TimeEndCom2 <> 0 AND TimeEndCom2 < TIMER THEN TimeEndCom2 = 0
35         IF TimeUpCom2 <> 0 AND TimeUpCom2 < TIMER THEN
              ReadingError = 1: GOSUB UpdateFile2: TimeEndCom2 = 0
           END IF
           a$ = "": c$ = ""
           WHILE NOT EOF(2)
40            a$ = INPUT$(LOC(2), #2)
              c$ = c$ + a$
           WEND
           IF c$ <> "" AND TimeEndCom2 = 0 THEN GOSUB ProcessCom2
        END IF
45      COLOR 11, 0: LOCATE 25, 2, 0: PRINT DATE$; " "; TIME$;
     RETURN WaitForReading:
        IF TimeUpCom1 <> 0 OR TimeUpCom2 <> 0 THEN
50         COLOR 14, 0: LOCATE 25, 23: PRINT "Processing call. Please wait.   ";
           DO WHILE TimeUpCom1 <> 0 OR TimeUpCom2 <> 0
              GOSUB ReadCom
           LOOP
        END IF
55   RETURN ProgramEnd:
```

52

```
        CLOSE #3: OPEN "list.dat" FOR RANDOM AS #3
           FIELD #3, 2 AS list$
           FOR i = 1 TO 14
              LSET list$ = ScreenData$(i)
5             PUT #3, i
           NEXT i
        CLOSE #3

IF TimeUpChain > TIMER + 2 THEN TimeUpChain = 0
10      DO WHILE TimeUpChain > TIMER
           GOSUB ReadCom
           IF TimeUpCom1 <> 0 OR TimeUpCom2 <> 0 THEN EXIT DO
        LOOP
        GOSUB WaitForReading
15      CLOSE #3: CLOSE #4: CLOSE #6: CHAIN "AMROO"
     END '$INCLUDE: 'readcoma'

20
```

APPENDIX B

Patent Application of Theresa Saadeh
AUTOMATIC METER READING SYSTEM WITH
MULTITASKING CONTROL

© COPYRIGHT 1986, 1989, 1990 BADGER METER INC., ALL RIGHTS RESERVED

```
'Program Name:     AMRO2.BAS
'Programmer:       T. Saadeh
'Program Function: Demand Meter Reading REM Initialize '$INCLUDE: 'amrcoma'
    DIM STATUS$(2), callback(6), MT$(6), ErrMsg$(5)
    DIM BIN.VAL$(16), HEX.VAL$(16), chr.asc(40), Meter(7)
    DIM TRANS.ID(4), TOD#(4), PR#(3), screen$(39), h(30), v(30)
    DIM ScreenData$(30), ScreenField(30), FileToScreen(30)
    DIM FileField(38), FileData$(38), NewData$(38), ErrorCode$(3)
    DIM CallFreq$(5), Alarms$(6), PrintOut(39), MeterReading#(9)

ON ERROR GOTO ErrorRecovery

REM Define program variables

'$INCLUDE: 'formata'

DATA 0,1,2,3,4,5,6,0,7,8,9,0,10,11,12,13,14,0,15,16,17,0
    DATA 18,19,20,0,21,22,23,0,24,25,26,27,0,28,29,30,0
    FOR i = 1 TO 39: READ PrintOut(i): NEXT i DATA 25,25,25,10,11,20,20,2,10,10,8,2,2,2,1,10,8,3
    DATA 10,10,8,8,8,8,3,6,6,6,7,3,5,5,5,0,2,6,1,2
    FOR i = 1 TO 38: READ FileField(i): NEXT i DATA 4,5,6,7,8,9,11,12,13,15,16,17,18,19,21,22,23
    DATA 4,5,6,8,9,10,12,13,14,15,17,18,19
    FOR i = 1 TO 30: READ h(i): NEXT i DATA 21,21,21,21,21,21,21,21,21,29,29,29,29,29,29,29,29
    DATA 60,65,65,60,65,65,64,64,64,64,59,59,59
    FOR i = 1 TO 30: READ v(i): NEXT i DATA "Daily    "
    DATA "Weekly   "
    DATA "Monthly  "
    DATA "Quarterly"
    DATA "Hourly   "
    FOR i = 1 TO 5: READ CallFreq$(i): NEXT i DATA "0000","0001","0010","0011","0100","0101","0110"
    DATA "0111","1000","1001","1010","1011","1100","1101"
```

2

```
        DATA "1110","1111"
        FOR i = 1 TO 16: READ BIN.VAL$(i): NEXT i

DATA "0","1","2","3","4","5","6","7"
5       DATA "8","9","A","B","C","D","E","F"
        FOR i = 1 TO 16: READ HEX.VAL$(i): NEXT i

DATA 6,65,128,129
        FOR i = 1 TO 4: READ TRANS.ID(i): NEXT i
10
        DATA 7,1,2,3,4,5,6,8,9,10,11,36,14,18,15,16,17
        DATA 19,21,23,20,22,24,26,27,28,29,31,32,33
        FOR i = 1 TO 30: READ FileToScreen(i): NEXT i 15      ErrorCode$(1) = "  Invalid transaction ID  "
        ErrorCode$(2) = "Account Number Not of File"
        ErrorCode$(3) = "      Invalid record       "

REM Maximum Customer Accounts
20         OPEN "r", #3, "max.dat", 8
           FIELD #3, 8 AS ma$
              GET #3, 1
              MaxAcct = CVSMBF(ma$)
           CLOSE #3
25
        ErrMsg$(1) = " maximum account # is" + STR$(MaxAcct)
        ErrMsg$(2) = " account number not on file "
        ErrMsg$(3) = " no customer phone number   "
        ErrMsg$(4) = " module not installed       "
30      ErrMsg$(5) = " ACCESSplus serial # error  "

REM Print Screen
           WIDTH 80: COLOR 11, 0: CLS
           COLOR 11, 0: LOCATE 1, 5: PRINT "Type Account Number [      ] Press ENTER "
35         COLOR 14, 0: LOCATE 1, 50: PRINT "   Call For a Demand Reading    "

COLOR 9, 0
           LOCATE 2, 3: PRINT CHR$(218); STRING$(74, 196); CHR$(191)
           FOR i = 3 TO 23: LOCATE i, 3: PRINT CHR$(179); SPACE$(74); CHR$(179); : NEXT i
40         LOCATE 24, 3: PRINT CHR$(192); STRING$(74, 196); CHR$(217);
           COLOR 11, 0: LOCATE 25, 3: PRINT DATE$; " "; TIME$;
           COLOR 7, 9: LOCATE 25, 64: PRINT " Main Menu=    ";
           COLOR 14, 9: LOCATE 25, 75: PRINT "ESC";
           IF comm2 = 0 THEN COLOR 20, 0: LOCATE 25, 1: PRINT CHR$(219);
45
        REM Define Arrow Keys
           KEY 16, CHR$(128) + CHR$(75)
           KEY 17, CHR$(128) + CHR$(77)
           ON KEY(12) GOSUB KeyLeft: ON KEY(16) GOSUB KeyLeft
50         ON KEY(13) GOSUB KeyRight: ON KEY(17) GOSUB KeyRight
           KEY(12) ON: KEY(16) ON: KEY(13) ON: KEY(17) ON REM Enter Account Number
           TimeUpChain = TIMER + 2
55         DO
              acct$ = "      ": amr.data$ = ""
              COLOR 0, 7: LOCATE 1, 26: PRINT acct$
```

3

```
              change$ = "": n$ = "": COLOR 3, 0
              count = 0: RightKey = 0: LeftKey = 0
              DO
                 WHILE n$ = ""
 5                  ACCOUNT = 1: GOSUB WaitForKey: ACCOUNT = 0
                    LOCATE 1, 50: COLOR 14, 0: PRINT "   Call For a Demand Reading   "
                    IF RightKey = 1 THEN n$ = MID$(acct$, count + 1, 1): IF n$ = CHR$(32) THEN n$ = ""
                    IF LeftKey = 1 THEN n$ = CHR$(8)
                 WEND
10
                 IF ASC(n$) = 27 THEN GOTO ProgramEnd IF ASC(n$) = 13 THEN
                    acct = VAL(acct$)
15                  IF acct = 0 THEN GOTO ProgramEnd
                    errr = 0: errr2 = 0
                    GOSUB GetAcctInfo                          'read info from disk file
                    IF errr <> 0 THEN
                       COLOR 14, 12
20                     LOCATE 1, 50: PRINT SPACE$(30)
                       LOCATE 1, 50: PRINT ErrMsg$(errr)
                       SOUND 300, 2: EXIT DO
                    END IF
                    IF comm1 = 0 AND CCM = 0 THEN
25                     GOSUB PrintMsgBox
                       COLOR 14, 12: SOUND 300, 2
                       LOCATE 17, 28: PRINT " The communications line "
                       LOCATE 18, 28: PRINT "      is not active.     "
                       EXIT DO
30                  END IF
                    GOSUB ClearScreen
                    GOSUB CallMeter                            'dial and send serial number
                    IF n$ = CHR$(27) THEN
                       GOSUB Resett
35                     GOSUB ClearScreen
                       EXIT DO
                    END IF
                    TimeUpDemand = TIMER + 13                  '10 seconds to read meter
                    demand = 1: GOSUB WaitForKey: demand = 0   'read meter
40                  IF TimeUpDemand < TIMER THEN errr2 = 1
                    IF n$ = CHR$(27) THEN
                       GOSUB Resett: GOSUB ClearScreen
                    ELSE
                       GOSUB Resett: GOSUB PrintMsgBox
45                  END IF
                    IF errr2 = 0 AND amr.data$ <> "" AND n$ <> CHR$(27) THEN
                       GOSUB ProcessData
                       IF errr <> 0 THEN
                          GOSUB PrintMsgBox
50                        OPEN "msg.dat" FOR APPEND AS #3
                             PRINT #3, DATE$; " "; TIME$; " "; amr.data$
                          CLOSE #3
                       ELSE
                          IF history = 1 THEN GOSUB PrintHistory
55            ResumePrint:
                          GOSUB ClearScreen
                          COLOR 7, 9: LOCATE 25, 64: PRINT " Main Menu=    ";
```

4

```
                COLOR 14, 9: LOCATE 25, 75: PRINT "ESC";
                GOSUB PrintToScreen
                GOSUB WriteToDisk
                IF AlarmPrint = 1 AND printer = 1 THEN GOSUB PrintAlarm
              END IF
            END IF
            amr.data$ = "": TimeUpDemand = 0
            FOR i = 1 TO 17: ScreenData$(i) = "": NEXT i      'clear screen data storage
            EXIT DO                                            'next account
          END IF IF (ASC(n$) > 47 AND ASC(n$) < 58 AND count < 6) OR (ASC(n$) = 8 AND count > 0) THEN
            IF ASC(n$) = 8 THEN
              count = count - 1
              IF count = 0 THEN change$ = "" ELSE change$ = MID$(change$, 1, count)
              c = 2
            ELSE
              count = count + 1
              change$ = change$ + n$
              c = 1
            END IF
            acct$ = change$ + MID$(acct$, count + c, 6 - count + 1)
            IF LEN(acct$) < 6 THEN
              add = 6 - LEN(acct$): acct$ = acct$ + STRING$(add, " ")
            END IF
            COLOR 0, 7: LOCATE 1, 26: PRINT acct$
          ELSE
            SOUND 100, 2
          END IF
          n$ = ""
        LOOP                                                  'next digit
        COLOR 7, 9: LOCATE 25, 64: PRINT " Main Menu=     ";
        COLOR 14, 9: LOCATE 25, 75: PRINT "ESC";
      LOOP                                                    'next account WaitForKey:
      TimeUpReading = TIMER + 1200
      LeftKey = 0: RightKey = 0: n$ = ""
      DO
        GOSUB ReadCom n$ = INKEY$
        IF ACCOUNT = 1 THEN
          IF n$ <> "" THEN RETURN
          IF LeftKey = 1 OR RightKey = 1 THEN RETURN
        END IF
        IF GoDemand = 1 AND n$ = CHR$(13) THEN RETURN
        IF delay = 0 AND n$ = CHR$(27) THEN RETURN
        IF pprinter = 0 THEN n$ = ""

IF TimeUp = 1 THEN
          IF GoDemand = 1 THEN TimeOut = 1 ELSE TimeUp = 0
          RETURN
        END IF IF demand = 1 THEN
          IF amr.data$ <> "" THEN RETURN
```

5

```
              IF TimeUpDemand < TIMER THEN RETURN
           END IF

IF TimeUpCom1 = 0 AND TimeUpCom2 = 0 THEN COLOR 3, 0: LOCATE 25, 23: PRINT SPACE$(30);
 5         IF pprinter = 1 THEN
              IF TimeUp1 <> 0 AND TimeUp1 < TIMER THEN              'sound alarm every 2 minutes
                 TimeUp1 = TIMER + 120
                 SOUND 200, 5: SOUND 400, 2: SOUND 200, 5
              END IF
10            IF n$ = CHR$(13) THEN
                 IF TimeUpCom1 <> 0 OR TimeUpCom2 <> 0 THEN         'wait till calls are done
                    COLOR 14, 0: LOCATE 25, 23                      '  processing before trying
                    PRINT "Processing Call - Please Wait"; n$ = ""  '  printer again
                 ELSE
15                  RETURN
                 END IF
              END IF
           END IF 20         IF TimeUpSend <> 0 AND GoDemand <> 0 THEN
              CountDown = 20 - INT(TIMER - TimeUpSend)
              COLOR 14, 0: LOCATE 19, 36: PRINT CountDown;
           END IF 25         IF wakeup = 1 THEN OUT address, 0                        'activate wakeup box
           IF ACCOUNT = 1 THEN LOCATE 1, 26 + count, 1, 7: FOR i = 1 TO 50: NEXT i
        LOOP
        RETURN 30      KeyLeft:
           LeftKey = 1: RETURN
        KeyRight:
           RightKey = 1: RETURN 35      GetAcctInfo:
           IF acct > MaxAcct THEN errr = 1: RETURN
           GOSUB OpenFile
           IF errr <> 0 THEN CLOSE #3: RETURN
           IF ASC(FL1$) <> 89 THEN errr = 2: CLOSE #3: RETURN
40         FOR j = 1 TO 38: NewData$(j) = FileData$(j): NEXT j
           CLOSE #3
           IF VAL(NewData$(5)) < 1 THEN errr = 3: RETURN
           tday = ASC(NewData$(37))
           tslot = ASC(MID$(NewData$(38), 1, 1)) * 16 + ASC(MID$(NewData$(38), 2, 1))
45         IF tday = 0 OR tslot = 0 THEN errr = 4
           FRED$ = "": Fr1$ = MID$(ScreenData$(10), 5, 1)
           IF Fr1$ = "a" OR Fr1$ = "A" THEN FRED$ = "H"
           IF FRED$ = "" AND Fr1$ = " " THEN
              errr = 5: CLOSE #3: RETURN
50         ELSE
              FRED$ = "F"
           END IF
        RETURN 55      ClearScreen:
           FOR i = 3 TO 23: LOCATE i, 4: PRINT SPACE$(73); : NEXT i
        RETURN
```

6

```
        CallMeter:
            REM print 1st part of account record
                COLOR 9, 0
5               LOCATE 4, 17: PRINT CHR$(213); STRING$(45, 205); CHR$(184)
                FOR i = 5 TO 9
                    LOCATE i, 17: PRINT CHR$(179); SPACE$(45); CHR$(179)
                NEXT i
                LOCATE 10, 17: PRINT CHR$(212); STRING$(45, 205); CHR$(190)
10              COLOR 11, 0
                FOR i = 3 TO 7: LOCATE 2 + i, 23: PRINT screen$(i): NEXT i
                COLOR 3, 0
                FOR i = 2 TO 6: LOCATE 3 + i, 37: PRINT NewData$(FileToScreen(i)): NEXT i
                COLOR 7, 9: LOCATE 4, 32: PRINT USING " Account ##### "; acct
15
            REM serial number
                FOR j = 1 TO 7: Meter(j) = 0: NEXT j                  'clear meter data
                Meter(1) = 128                                        'transaction identifier
                SER# = VAL(NewData$(10))
20              SER$ = LTRIM$(STR$(SER#))
                IF LEN(SER$) < 10 THEN SER$ = STRING$(10 - LEN(SER$), "0") + SER$
                Meter(2) = VAL(MID$(SER$, 1, 1)) * 16 + VAL(MID$(SER$, 2, 1))
                Meter(3) = VAL(MID$(SER$, 3, 1)) * 16 + VAL(MID$(SER$, 4, 1))
                Meter(4) = VAL(MID$(SER$, 5, 1)) * 16 + VAL(MID$(SER$, 6, 1))
25              Meter(5) = VAL(MID$(SER$, 7, 1)) * 16 + VAL(MID$(SER$, 8, 1))
                Meter(6) = VAL(MID$(SER$, 9, 1)) * 16 + VAL(MID$(SER$, 10, 1))

SUM# = 0                                              'checksum
                FOR j = 1 TO 6
30                  SUM# = SUM# + Meter(j)
                NEXT j
                Meter(7) = SUM# - (INT(SUM# / 256) * 256)

REM Dial number
35              active = 1: GOSUB PrintMsgBox: active = 0
                COLOR 0, 11
                LOCATE 16, 27: PRINT "     ** Dialing **        "
                LOCATE 18, 27: PRINT "       Please Wait        "

40              IF CCM = 0 THEN
                    phone$ = LTRIM$(STR$(VAL(NewData$(5))))
                    PRINT #1, "ATTQ1ES10=255D" + phone$ + ";" + CHR$(13); 'dial number
                    'T        - tone dial
                    'Q1       - do not return result codes
45                  'E        - echo off
                    'S10=255  - do not disconnect on carrier loss
                    'D # ;    - dial # and return to command mode
                    dial = 1: sec = 2: GOSUB delay: dial = 0
                    IF n$ = CHR$(27) THEN RETURN
50              END IF COLOR 0, 11
                LOCATE 14, 27: PRINT "* Pick up your phone      "
                LOCATE 15, 27: PRINT "  receiver and wait for   "
55              LOCATE 16, 27: PRINT "  someone to answer.      "
                LOCATE 17, 27: PRINT "* Tell the customer to stay"
                LOCATE 18, 27: PRINT "  on the phone until the   "
```

7

```
            LOCATE 19, 27: PRINT "  wake-up tone is done.    "
            LOCATE 20, 27: PRINT "* Press the ENTER key to   "
            LOCATE 21, 27: PRINT "  send wake-up tone.       "
5           LOCATE , , 0
            TimeUpSend = 0
            GoDemand = 1: TimeOut = 0: sec = 1200: GOSUB delay: GoDemand = 0
            IF n$ <> CHR$(13) THEN
              IF CCM = 1 THEN PRINT #1, "HANGUP"
10            RETURN
            END IF '----- Begin Demand Procedure -----'

15       REM Print sending data message
            COLOR 0, 11
            FOR i = 14 TO 21: LOCATE i, 27: PRINT SPACE$(26): NEXT i
            LOCATE 17, 27: PRINT "   Sending Wake-up Tone    "

20       REM Send FRED tone
            IF CCM = 1 THEN
             'CALL CCMfred(terr)
              IF terr = 1 THEN
                 COLOR 0, 11: LOCATE 19, 7
25               PRINT " Demand Reading Error "
                 LOCATE 20, 3: PRINT SPACE$(30)
                 SOUND 300, 2
                 sec = 2: GOSUB delay
              END IF
30            n$ = INKEY$: DO WHILE n$ <> "": n$ = INKEY$: LOOP: RETURN
            ELSE
              wakeup = 1: sec = 3: GOSUB delay                    'activate wakeup box
            END IF 35       REM Send Carrier
            PRINT #1, "ATA" + CHR$(13)
            offline = 1: sec = 5: GOSUB delay: offline = 0
            IF n$ = CHR$(27) THEN wakeup = 0: RETURN 40       REM Send Wakeup Frequency Indicator to Wakeup Box
            PRINT #1, FRED$
            offline = 1: sec = 3: GOSUB delay: offline = 0
            IF n$ = CHR$(27) THEN wakeup = 0: RETURN 45       REM Go Off Line
            PRINT #1, "+++";
            offline = 1: sec = 2: GOSUB delay: offline = 0
            IF n$ = CHR$(27) THEN wakeup = 0: RETURN 50       REM Turn Off Carrier and Delay While FRED Tone Is Sent
            PRINT #1, "ATC" + CHR$(13)
            sec = 10: GOSUB delay: wakeup = 0
            IF n$ = CHR$(27) THEN RETURN 55       REM Wait for operator to instruct customer to hang up phone
            COLOR 0, 11
            LOCATE 14, 27: PRINT "                            "
```

8

```
          LOCATE 15, 27: PRINT "* Tell the customer to    "
          LOCATE 16, 27: PRINT "  hang up the phone.       "
          LOCATE 17, 27: PRINT "                           "
          LOCATE 18, 27: PRINT "* Press the ENTER key      "
 5        LOCATE 19, 27: PRINT "  within      seconds to   "
          LOCATE 20, 27: PRINT "  begin sending data.      "
          LOCATE 21, 27: PRINT "                           "
          TimeUpSend = TIMER
          COLOR 14, 0: LOCATE 19, 36: PRINT "  ";
10        GoDemand = 1: TimeOut = 0: sec = 20: GOSUB delay: GoDemand = 0
          IF n$ = CHR$(27) THEN
             IF CCM = 1 THEN PRINT #1, "HANGUP"
             RETURN
          END IF
15
          COLOR 0, 11
          FOR i = 14 TO 20: LOCATE i, 27: PRINT SPACE$(26): NEXT i
          LOCATE 17, 27: PRINT "      Sending Data       "

20     REM Turn On Carrier and Go On Line
          PRINT #1, "ATC1O" + CHR$(13)
          sec = 5: GOSUB delay
          IF n$ = CHR$(27) THEN RETURN 25     REM Send Serial Number
          FOR j = 1 TO 7: PRINT #1, CHR$(Meter(j)); : NEXT j
       RETURN '$INCLUDE: 'processa.bas'
30
       delay:
          ON TIMER(sec) GOSUB TimeUp
          TimeUp = 0: TIMER ON
          GOSUB WaitForKey
35     RETURN TimeUp:
          TIMER OFF: TimeUp = 1
       RETURN
40
       ErrorRecovery:
          IF ERR = 57 THEN RESUME NEXT
          ERRnum = ERR
          IF ERR = 24 OR ERR = 25 OR ERR = 27 OR ERR = 68 THEN RESUME PrinterDeviceErrors
45        COLOR 12, 0: LOCATE 1, 1: PRINT "error ="; ERR
       STOP: RESUME NEXT PrinterDeviceErrors:
          CLOSE #3: GOSUB PrintErrBox
50        IF ERRnum = 24 OR ERRnum = 25 THEN
             COLOR 15, 12: LOCATE 9, 11: PRINT "                         "; DATE$; " "; TIME$; "  "
             COLOR 15, 12: LOCATE 10, 11: PRINT "                                                     "
             COLOR 31, 12: LOCATE 11, 11: PRINT "                    The printer is not ready.        "
55           COLOR 15, 12: LOCATE 12, 11: PRINT "                    Press ENTER to resume printing.  "
          END IF
```

```
            IF ERRnum = 27 THEN
                COLOR 15, 12: LOCATE 9, 11: PRINT "                        "; DATE$; " "; TIME$; "   "
            "
                COLOR 15, 12: LOCATE 10, 11: PRINT "                                                        "
 5              COLOR 31, 12: LOCATE 11, 11: PRINT "               The printer is out of paper.            "
                COLOR 15, 12: LOCATE 12, 11: PRINT "                 Press ENTER to resume printing.       "
            END IF IF ERRnum = 68 THEN
10              COLOR 15, 12: LOCATE 9, 11: PRINT "                        "; DATE$; " "; TIME$; "   "
            "
                COLOR 15, 12: LOCATE 10, 11: PRINT "                                                              "
                COLOR 31, 12: LOCATE 11, 11: PRINT "   The printer is either off or not connected properly.      "
                COLOR 15, 12: LOCATE 12, 11: PRINT "              Press ENTER to resume printing.                "
15          END IF TimeUp1 = TIMER + 120
            SOUND 200, 5: SOUND 400, 2: SOUND 200, 5
            pprinter = 1: GOSUB WaitForKey: pprinter = 0
20          COLOR 9, 0
            LOCATE 2, 3: PRINT CHR$(218); STRING$(74, 196); CHR$(191)
            TimeUp1 = 0
            GOTO ResumePrint 25      OpenFile:
            REM open account index file and get record number
                OPEN "r", #3, "amrlndx.dat", 2
                    FIELD #3, 2 AS filenum$
                    GET #3, acct
30                  FileNumber = CVI(filenum$)
                CLOSE #3
                IF FileNumber = 0 THEN errr = 2: RETURN REM read from assigned record number
35              OPEN "R", #3, "amrl.dat", 304                  ' open account data base
                FIELD #3, 1 AS FL1$
                Z1 = 1: Z2 = 0
                FOR i = 1 TO 38
                    Z = FileField(i)                           'length of field
40                  IF Z <> 0 THEN
                        FIELD #3, Z1 AS d$, Z2 AS d$, Z AS FileData$(i)   'D$ is a dummy field
                        IF Z1 + Z < 255 THEN Z1 = Z1 + Z ELSE Z2 = Z2 + Z
                    END IF
                NEXT i
45              GET #3, FileNumber
            RETURN Resett:
            CLOSE #3
50          resettt = 1: COLOR 0, 11
            FOR i = 14 TO 21: LOCATE i, 27: PRINT SPACE$(26): NEXT i
            LOCATE 17, 27: PRINT "      Resetting Modem       "
            CLOSE #1: comm1 = 0                                'close buffer
            delay = 1: sec = 1: GOSUB delay: delay = 0: comm1 = 1   'delay
55          OPEN "com1:300,N,8,1" FOR RANDOM AS #1              'open buffer
            PRINT #1, "ATZ" + CHR$(13);                         'reset modem
            delay = 1: sec = 1: GOSUB delay: delay = 0          'delay
```

```
                                                                    10
           PRINT #1, "ATMEQ1S0=1" + CHR$(13)                'set modem
           delay = 1: sec = 1: GOSUB delay: delay = 0       'delay
           CLOSE #1: OPEN "com1:300,N,8,1" FOR RANDOM AS #1 'clear buffer
           resettt = 0
 5      RETURN PrintMsgBox:
           COLOR 9, 0
           LOCATE 2, 3: PRINT CHR$(218); STRING$(74, 196); CHR$(191)
10         LOCATE 13, 26: PRINT CHR$(213); STRING$(27, 205); CHR$(184)
           FOR i = 14 TO 21
              LOCATE i, 26: PRINT CHR$(179); SPACE$(27); CHR$(179)
           NEXT i
           LOCATE 22, 26: PRINT CHR$(212); STRING$(27, 205); CHR$(190)
15
           IF active = 1 OR errr2 = 1 OR errr <> 0 THEN
              IF active = 1 THEN
                 COLOR 0, 3
                 FOR i = 14 TO 21: LOCATE i, 27: PRINT SPACE$(27): NEXT i
20               COLOR 7, 9
                 LOCATE 13, 31: PRINT "    Information      "
                 LOCATE 22, 34: PRINT " Hangup=ESC "
                 COLOR 14, 9: LOCATE 22, 42: PRINT "ESC"
                 COLOR 9, 0: LOCATE 25, 60: PRINT SPACE$(20);
25            END IF IF errr2 = 1 THEN
                 COLOR 14, 12: SOUND 300, 2
                 LOCATE 17, 29: PRINT " Demand Reading Error "
30            END IF IF errr <> 0 THEN
                 COLOR 14, 12: SOUND 300, 2
                 LOCATE 17, 27: PRINT ErrorCode$(errr)
35            END IF
           END IF
        RETURN PrintErrBox:
40         COLOR 15, 12
           LOCATE 8, 10: PRINT CHR$(213); STRING$(58, 205); CHR$(184)
           FOR i = 9 TO 12
              LOCATE i, 10: PRINT CHR$(179); SPACE$(58); CHR$(179)
           NEXT i
45         LOCATE 13, 10: PRINT CHR$(212); STRING$(58, 205); CHR$(190)
        RETURN PrintHistory:
           CLOSE #3: OPEN "history.dat" FOR APPEND AS #3
50            PRINT #3, "Demand Account: "; acct
              PRINT #3, amr.data$
           CLOSE #3
        RETURN 55      ReadCom:
           IF comm1 = 1 THEN
              IF TimeEndCom1 <> 0 AND TimeEndCom1 < TIMER THEN TimeEndCom1 = 0
```

```
            IF TimeUpCom1 <> 0 AND TimeUpCom1 < TIMER THEN
              ReadingError = 1: GOSUB UpdateFile1: TimeEndCom1 = 0
            END IF
            IF resettt = 0 THEN
 5            a$ = "": c$ = ""
              WHILE NOT EOF(1)
                 a$ = INPUT$(LOC(1), #1)
                 c$ = c$ + a$
              WEND
10          END IF
            IF c$ <> "" AND resettt = 0 AND dial = 0 AND offline = 0 AND TimeEndCom1 = 0 THEN
              GOSUB ProcessCom1
            END IF
          END IF
15
          IF comm2 = 1 THEN
            IF TimeEndCom2 <> 0 AND TimeEndCom2 < TIMER THEN TimeEndCom2 = 0
            IF TimeUpCom2 <> 0 AND TimeUpCom2 < TIMER THEN
              ReadingError = 1: GOSUB UpdateFile2: TimeEndCom2 = 0
20          END IF
            a$ = "": c$ = ""
            WHILE NOT EOF(2)
              a$ = INPUT$(LOC(2), #2)
              c$ = c$ + a$
25          WEND
            IF c$ <> "" AND TimeEndCom2 = 0 THEN GOSUB ProcessCom2
          END IF

COLOR 11, 0: LOCATE 25, 3, 0: PRINT DATE$; " "; TIME$;
30      RETURN

WaitForReading:
          IF TimeUpCom1 <> 0 OR TimeUpCom2 <> 0 THEN
            COLOR 14, 0: LOCATE 25, 23: PRINT "Processing call. Please wait.";
35          DO WHILE TimeUpCom1 <> 0 OR TimeUpCom2 <> 0
              GOSUB ReadCom
            LOOP
          END IF
        RETURN
40
        ProgramEnd:
          IF TimeUpChain > TIMER + 3 THEN TimeUpChain = 0
          DO WHILE TimeUpChain > TIMER
            GOSUB ReadCom
45          IF TimeUpCom1 <> 0 OR TimeUpCom2 <> 0 THEN EXIT DO
          LOOP
          GOSUB WaitForReading
          CHAIN "AMROO"
        END
50
```

What is claimed is:

1. An application program stored in an operational medium and providing a single control center computer with call handling and customer account processing capabilities, the computer having a plurality of modems for connection to telephone lines to receive meter data from automatic meter reader devices, having a microprocessor, having first program memory locations for storing an operating system program, having second program memory locations for storing the application program and having a plurality of data memory locations for storing received meter data, wherein the stored application program comprises:

groups of servicing instructions stored in the operational medium for executing respective servicing activities related to a plurality of customer accounts for customers of utility services which are metered;

communication instructions stored in the operational medium for transfer of received meter data from the modems to the memory locations for storing received meter data; and means stored in the operational medium and operable with the microprocessor and the operational system program for executing the communications instructions and portions of the groups of servicing instructions in a time-interleaved and time-controlled execution cycle in which the received meter data is transferred from the modems to the data memory locations within the execution cycle of the application program while accomplishing periodic execution of the servicing activities over a plurality of execution cycles of the application program.

2. A stored application program according to claim 1, wherein the means for executing includes polling means for periodically determining whether a data transfer operation is required from each respective modem.

3. A stored application program according to claim 1, wherein the means for executing includes means for limiting the maximum time required for performance of any of the portions of the groups of servicing instructions to less than the maximum allowable time between executions of the communication instructions.

4. A stored application program according to claim 1, wherein the modems include means for storing received meter data.

5. A stored application program according to claim 1, wherein the control center computer includes a keyboard coupled to the microprocessor for making inputs of data;

wherein the stored program further comprises keyboard servicing instructions for reading inputs from the keyboard; and wherein the means for executing includes means for detecting the presence of inputs and means for executing the keyboard servicing instructions as required to read the inputs.

6. A stored application program according to claim 1, wherein the groups of servicing instructions include instructions for storage in memory of customer account data that is related to the received meter data.

7. A stored application program according to claim 1, wherein the communication instructions include instructions which allow received meter data to accumulate until sufficient meter data is obtained to generate a report.

8. A stored application program according to claim 1, wherein the communication instructions include instructions responsive to obtaining meter data for a computer report to effect a transfer of control data through the modems to automatic meter reader devices for control thereof.

9. A stored application program according to claim 1, wherein the means for executing includes means for determining whether particular servicing activities are required and includes means for executing the groups of servicing instructions required for performance of the particular servicing activities.

10. A stored application program according to claim 1, further comprising communication port means for controlling at least one communication port for coupling the modems to the telephone lines.

11. A stored application program according to claim 1, in combination with a wake-up signal means electrically connected to the control center computer and including wake-up tone generator means for generating a wake-up tone to a respective modem for transmission to an automatic meter reader device through a telephone line to cause the automatic meter reader device to return meter data through the telephone line to the respective modem; and wherein the stored program further comprises means for control of the wake-up signal means to effect operation of the wake-up tone generator means.

12. A control center computer having a microprocessor arranged for connection to a plurality of modems, each modem receiving meter data through a telephone line from an automatic meter reader device, and having memory locations for storage of meter data, having first program memory locations for storage of an operating system program, having second program memory locations for storage of an application and having an application program stored in the second program memory locations for execution under the control of the microprocessor, wherein the application program comprises:

servicing groups of instructions for executing a plurality of servicing activities related to a plurality of customer accounts;

communication instructions for transfer of received meter data from the modems to the memory locations for storage of meter data; and program means for controlling the execution of the communications instructions and portions of the servicing groups of instructions in a time-interleaved and time-controlled execution cycle such that execution of the servicing groups of instructions is apparent to a user of the control center computer, while the reception and transfer of meter data is transparent to the user of the control center computer.

13. A control center computer according to claim 12, wherein the communication instructions are organized in communication blocks of instructions;

wherein the servicing groups of instructions are organized in blocks of instructions; and wherein the servicing blocks of instructions are executed in serial relation to execution of the communication blocks of instructions.

14. A control center computer according to claim 12, wherein the computer includes a keyboard for entry of control data; and wherein the instructions include a wait-for-key repeat loop of instructions which includes an instruction effecting repeated execution of the communication instructions and an instruction operative to exit the loop for execution of a servicing group of instructions in response to entry of control data through the keyboard.

15. A control center computer according to claim 12, wherein the communication operations are required periodically with a certain minimum time, and wherein each of the servicing groups of instructions requires less than the certain minimum time for execution.

16. A control center computer comprising:

a microprocessor;

modem means arranged for connection to at least one telephone line to receive meter data from any of a plurality of automatic meter readers;

memory locations accessible by the microprocessor for storing the received meter data; and stored application program means executable by the microprocessor, said program means further comprising:
i) communication instructions for effecting communication activities to transfer received meter data from the modem means to the memory locations,
ii) servicing instructions for executing servicing activities including maintenance of customer account records separate from the communication activities, and
iii) program means for controlling the execution of the communications instructions and servicing instructions in a time-interleaved and time-controlled execution cycle of the application program in which the received meter data is transferred from the modems to the memory locations within the execution cycle while accomplishing periodic execution of the servicing activities over a plurality of execution cycles of the application program.

17. The control center computer of claim 16 further comprising:

wake-up tone generator means for generating a wake-up tone on a telephone line coupled to the modem means for transmission to an automatic meter reader through the telephone line; and wake-up control means for control of the wake-up tone generator means; and wherein the stored program includes means for control of the control means to effect operation of the wake-up tone generator means.

18. The control center computer of claim 17, wherein the control means of the wake-up signal module includes a modem coupled to the modem means of the system; and wherein the stored program includes means for transmission of data through the modem of the control means for controlling generation of the wake-up tone.

19. A stored application program for control of a control center computer having a microprocessor arranged for connection to a plurality of modems, each modem receiving meter data through a telephone line from an automatic meter reader device, and having memory locations for storage of meter data, having a stored operating systems program, and having application program memory locations for storage of the application program, wherein the stored application program comprises:

servicing routines of instructions for executing a plurality of servicing activities related to a plurality of customer accounts;

communication instructions for transfer of received meter data from the modems to the memory locations for storage of meter data; and means for controlling the execution of the communication instructions and portions of the servicing routines in a time-interleaved and time-controlled execution cycle such that execution of the servicing routines is apparent to a user of the control center computer, while the reception and transfer of meter data is transparent to the user of the control center computer.

20. A stored program according to claim 19, wherein the means for controlling the execution includes polling means for periodically determining whether a data transfer operation is required from each respective modem.

21. A stored program according to claim 19, wherein the means for controlling the execution includes means for limiting the maximum time required for performance of any of the portions of the groups of servicing instructions to less than the maximum allowable time between executions of the communication instructions.

22. A stored program according to claim 19, wherein the modems include means for storing received meter data.

23. A stored program according to claim 19, wherein the control center computer includes a keyboard coupled to the microprocessor for making inputs of data;

wherein the stored program further comprises keyboard servicing instructions for reading inputs from the keyboard; and wherein the means for controlling the execution includes means for detecting the presence of inputs and then effects execution of the keyboard servicing instructions as required to read the inputs.

24. A stored program according to claim 19, wherein the servicing routines include instructions for storage in memory of customer account data that is related to the received meter data.

25. A stored application program according to claim 19, wherein the communication instructions includes instructions which allow received meter data to accumulate until sufficient meter data is obtained to generate a report.

26. A stored application program according to claim 19, wherein the communication instructions include instructions responsive to a report to effect a transfer of control data through the modems to automatic meter reader devices for control thereof.

27. A stored application program according to claim 19, wherein the means for controlling the execution includes means for determining whether particular servicing activities are required and means for executing the groups of servicing instructions required for performance of the particular servicing activities.

* * * * *